US012197478B1

(12) United States Patent
Mansour et al.

(10) Patent No.: US 12,197,478 B1
(45) Date of Patent: Jan. 14, 2025

(54) AUTOMATED CONTENT CREATION AND CONTENT SERVICES FOR COLLABORATION PLATFORMS

(71) Applicants: Atlassian Pty Ltd., Sydney (AU); Atlassian US, Inc., San Francisco, CA (US)

(72) Inventors: Sherif Mansour, Sydney (AU); Gaurav Awadhwal, Sydney (AU); Bradley John Rodgers, Sydney (AU); Sam Alexander Tardif, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/216,835

(22) Filed: Jun. 30, 2023

Related U.S. Application Data

(60) Provisional application No. 63/523,909, filed on Jun. 28, 2023.

(51) Int. Cl.

| | |
|---|---|
| ***G06F 17/30*** | (2006.01) |
| ***G06F 3/04812*** | (2022.01) |
| ***G06F 16/33*** | (2019.01) |
| ***G06F 16/332*** | (2019.01) |
| ***G06F 16/34*** | (2019.01) |
| *G06Q 10/10* | (2023.01) |

(52) U.S. Cl.
CPC ...... *G06F 16/3334* (2019.01); *G06F 3/04812* (2013.01); *G06F 16/3329* (2019.01); *G06F 16/345* (2019.01); *G06Q 10/103* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 8,892,524 | B1 * | 11/2014 | Lee | G06Q 10/101 707/665 |
| 11,816,096 | B2 * | 11/2023 | Mansour | G06F 16/951 |
| 11,900,068 | B1 | 2/2024 | Gray et al. | |
| 2002/0156671 | A1 * | 10/2002 | Libra | G06Q 10/063114 705/7.26 |
| 2006/0090154 | A1 | 4/2006 | Bustelo et al. | |
| 2007/0186007 | A1 * | 8/2007 | Field | H04L 67/306 709/233 |
| 2008/0134142 | A1 | 6/2008 | Nathan et al. | |
| 2009/0006982 | A1 * | 1/2009 | Curtis | G06Q 10/10 715/753 |

(Continued)

*Primary Examiner* — Hung D Le
(74) *Attorney, Agent, or Firm* — Brownstein Hyatt Farber Schreck, LLP

(57) ABSTRACT

Embodiments described herein relate to systems and methods for automatically generating content, generating API requests and/or request bodies, structuring user-generated content, and/or generating structured content in collaboration platforms, such as documentation systems, issue tracking systems, project management platforms, and other platforms. The systems and methods described use a network architecture that includes a prompt generation service and a set of one or more purpose-configured large language model instances (LLMs) and/or other trained classifiers or natural language processors used to provide generative responses for content collaboration platforms.

20 Claims, 54 Drawing Sheets

(56) References Cited

U.S. PATENT DOCUMENTS

2009/0083637 A1* 3/2009 Skakkebaek ........... G06Q 10/10 715/751
2009/0182763 A1* 7/2009 Hawking .............. H04L 65/403 707/999.102
2009/0193345 A1* 7/2009 Wensley ............. H04L 65/1094 715/756
2010/0011292 A1* 1/2010 Marinkovich ...... H04L 12/1818 715/716
2010/0235763 A1* 9/2010 Massand ............... G06F 40/166 715/753
2011/0022662 A1* 1/2011 Barber-Mingo ....... G06Q 10/06 706/47
2011/0191303 A1 8/2011 Kaufman et al.
2011/0296303 A1* 12/2011 Duquene ............... H04L 67/141 715/751
2013/0173531 A1* 7/2013 Rinearson .............. G06Q 30/02 707/608
2014/0033009 A1* 1/2014 Rein ........................ G06F 16/40 715/764
2014/0164172 A1* 6/2014 Du ...................... G06F 16/9535 705/26.7
2014/0222622 A1* 8/2014 Du ...................... G06F 16/9535 705/26.63
2015/0139610 A1* 5/2015 Syed ...................... G11B 27/34 386/241
2015/0163259 A1* 6/2015 Huang .................... G06F 3/167 709/205
2015/0242297 A1 8/2015 Johnson, Jr. et al.
2016/0019018 A1* 1/2016 Xiong ................... G06F 3/1446 345/1.3
2016/0259508 A1* 9/2016 Eccleston ............. G06F 3/0484
2017/0083871 A1* 3/2017 Chang ...................... G06F 16/93
2017/0193448 A1* 7/2017 Piyush ................ H04L 67/1044
2017/0214722 A1* 7/2017 Bhattacharjee ..... H04L 12/1813
2017/0257405 A1* 9/2017 Lo ........................ G06Q 10/101
2018/0040020 A1 2/2018 Kurian et al.
2018/0095709 A1* 4/2018 Nimri ................... G06F 3/0481
2018/0189250 A1 7/2018 Lee et al.
2018/0189282 A1 7/2018 Hartlaub et al.
2018/0191645 A1* 7/2018 Cacioppo ................ H04L 67/06
2018/0307383 A1* 10/2018 Faulkner ................ H04N 7/155
2018/0335935 A1* 11/2018 Larson ................ G06F 3/04842
2018/0336520 A1* 11/2018 Davis ................... G06Q 10/101
2019/0155870 A1* 5/2019 Prakash ................ G06F 40/103
2019/0303272 A1 10/2019 Sadykov et al.
2019/0325029 A1 10/2019 Gandhi et al.
2022/0197900 A1 6/2022 Maheshwari et al.
2022/0262405 A1* 8/2022 Conlin ................... G06Q 10/06
2022/0263877 A1* 8/2022 Conlin .................. H04L 65/765
2022/0303322 A1* 9/2022 Rangarajan ......... H04L 65/4025
2022/0415235 A1* 12/2022 Singh ..................... H04N 7/147
2023/0091949 A1* 3/2023 Erasmus ................. G06F 40/35 715/753
2023/0101588 A1* 3/2023 Dasdan ................ G06Q 10/101 715/234
2023/0145461 A1 5/2023 Templeton et al.
2023/0195689 A1* 6/2023 Alagianambi .......... G06F 16/93 707/661
2023/0367828 A1* 11/2023 Gillette .................. G06Q 50/01
2023/0385769 A1* 11/2023 Helvik ................. G06Q 10/103
2024/0005415 A1* 1/2024 Gray ...................... G06Q 50/01
2024/0078515 A1* 3/2024 Curry .................... H04L 65/403
2024/0220486 A1 7/2024 Sutrave et al.

* cited by examiner 702                              720

☒ SUMMARIZE THIS:   ▤ PROGRAM: GENERATIVE AI IN THE EDITOR

SUMMARY: "PROGRAM: GENERATIVE AI IN THE EDITOR"

LOREM IPSUM DOLOR SIT AMET, CONSECTETUR ADIPISCING ELIT,
SED DO EIUSMOD TEMPOR INCIDIDUNT UT LABORE ET DOLORE MAGNA
ALIQUA. UT ENIM AD MINIM VENIAM, QUIS NOSTRUD EXERCITATION ULLAMCO
LABORIS NISI UT ALIQUIP EX EA COMMODO CONSEQUAT. DUIS AUTE IRURE
DOLOR IN REPREHENDERIT IN VOLUPTATE VELIT ESSE CILLUM DOLORE EU
FUGIAT NULLA PARIATUR. EXCEPTEUR SINT OCCAECAT CUPIDATAT NON
PROIDENT, SUNT IN CULPA QUI OFFICIA DESERUNT MOLLIT ANIM ID EST
LABORUM...

~730

740                            [ COPY ] [ INSERT ]
                                              732

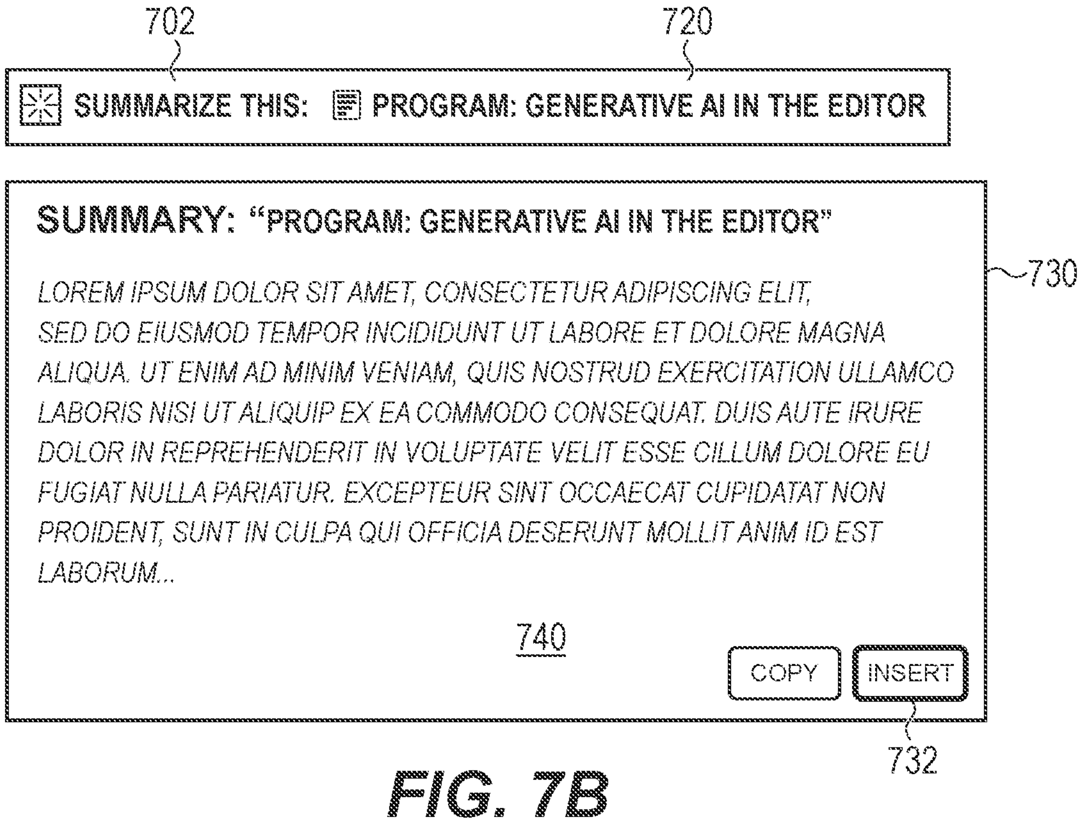

*FIG. 7B*

IT SUPPORT
SERVICE PROJECT

- QUEUES
- RAISE A REQUEST

KNOWLEDGE
- KNOWLEDGE BASE
- REPORTS

CHANNELS & PEOPLE
- CHANNELS
- CUSTOMERS

PROJECTS / IT SUPPORT / AND-231

SPILT COFFEE ON LAPTOP, NEED A NEW ONE

[ADD SUBTASK] [LINK ISSUE] [...]

USER 1 RAISED THIS REQUEST VIA PLATFORM 1

ACTIVITY — 930

[ALL] [✻ SUMMARY] [COMMENTS] [HISTORY]   [NEWEST FIRST ↓]

GENERATE A SUMMARY OF THIS SUPPORT THREAD, ALL INTERACTIONS, AND KNOWLEDGE BASE ARTICLES SENT. — 932

- @USER1 NEEDS A NEW LAPTOP DUE TO WATER DAMAGE
- HAS CLIENT MEETING ON 20 APRIL 2023.
- TROUBLESHOOTING SUGGESTIONS FROM THE FOLLOWING ARTICLES HAVE NOT HELPED:

[HOW TO RESTORE WATER DAMAGED LAPTOP] — 934
　[GUIDE TO DETACHING LAPTOP KEYBOARDS]

✻ GENERATED BY AI    [COPY]    WAS THIS HELPFUL? — 902
                       938                          936

PENDING ⌄   ⚡ACTIONS ⌄

SLAs
- 2h 52m  TIME TO FIRST RESPONSE
          4 HOURS
- 2h 52m  TIME TO RESOLUTION
          8 HOURS

DETAILS
- ASSIGNEE   USER 6
- REPORTER   USER 1
- PRIORITY   MAJOR

900b

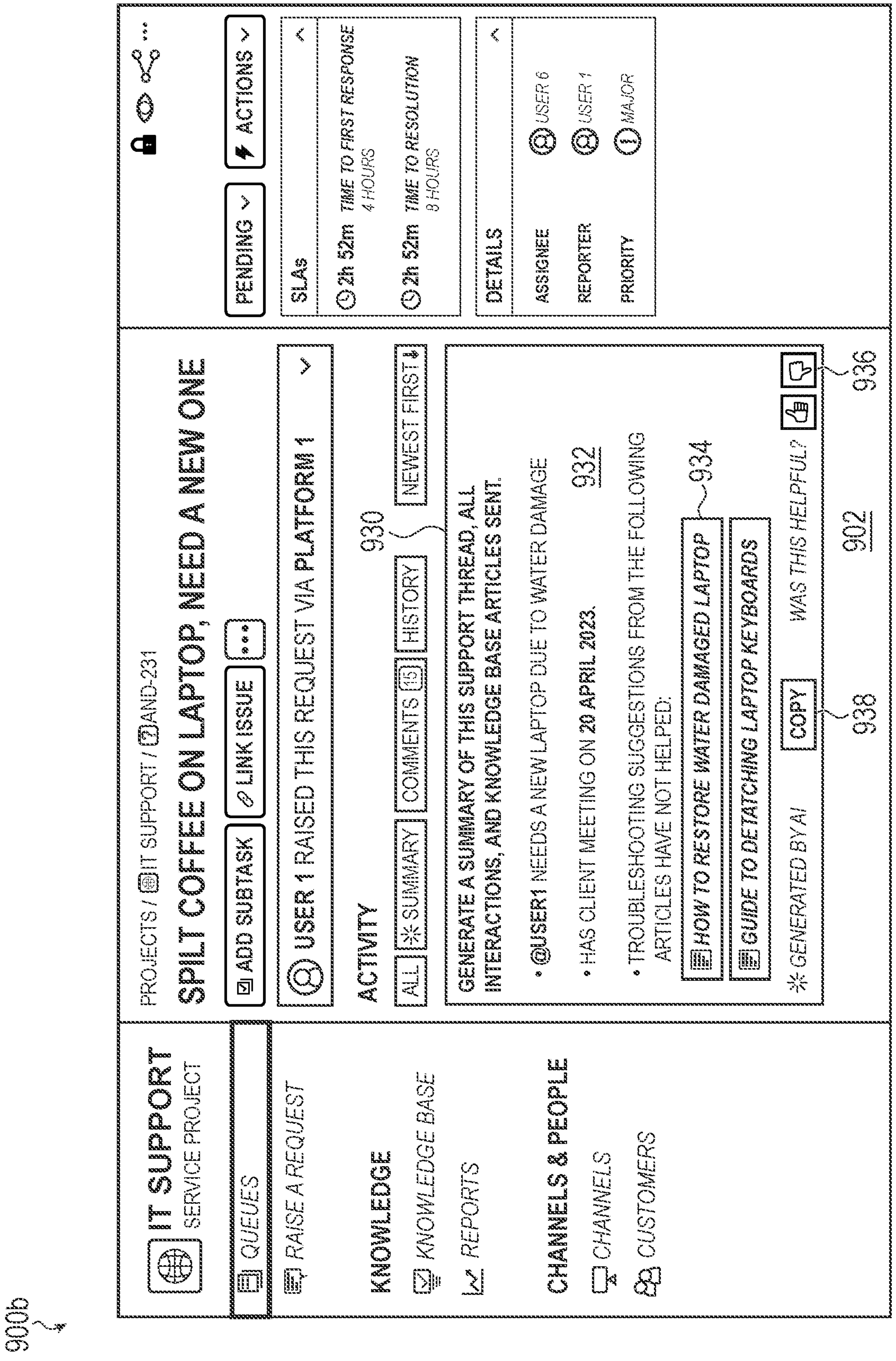

FIG. 9B https://subdomain.domain.tld/pages/viewpage.action?pageid=0123456 GO

[SPACES] [PEOPLE] [CREATE] [EDIT] [PUBLISH] [SAVE] ...

EMPLOYEE HANDBOOK / BENEFITS AND PERKS

PROJECT ABC MARKETING CAMPAIGN [SHARE] ...

CREATED BY USER 1
LAST UPDATED 4 HR. AGO • 11 MIN. READ • NEW AND POPULAR • ANALYTICS •
NO UPDATES

SUMMARY

This document contains information about testing and a marketing plan for a health monitoring app for dogs called Project ABC. The marketing plan includes a target audience, marketing strategy, and conclusion. The targeted audience includes tech-savvy dog owners, and the marketing strategy includes social media outreach, influencer marketing, paid advertising, and content marketing. The app uses machine learning algorithms to analyze various factors to provide personalized recommendations and alerts.

INTRODUCTION

Project ABC is an AI-powered health monitoring app for dogs that helps pet owners keep track of their furry friend's health and behavior. This innovative app uses advanced *machine learning algorithms* to analyze various factors, such as activity levels, food intake, and sleep patterns, to provide personalized recommendations and alerts.

TARGET AUDIENCE

Project ABC is targeted towards dog owners who want to ensure the optimal health of their pets. Our app is designed for dog owners who are tech-savvy and interested in leveraging the power of technology to better care for their pets.

1102

> TARGET PERSONA DATA

MARKETING STRATEGY

Write a comment...

... ATLASSIAN INTELLIGENCE ✕ — 1110

*IT LOOKS LIKE YOU'RE VIEWING THIS PAGE FOR THE FIRST TIME. HERE'S A LITTLE MORE CONTEXT*

PAGE OVERVIEW — 1112

This is a marketing plan for Project ABC, an AI-powered health monitoring app for dogs. The marketing plan prioritizes social media, influencer marketing, and paid advertising to reach tech-savvy dog owners who want to use technology to better care for their pets.

PROGRAM MANAGER TAKEAWAYS: — 1114

1. The 3 marketing approaches will need team alignment on timeline and deliverables 2. Graphic designers for marketing assets will need to align on visual patterns

KEY DECISIONS: — 1116

The marketing strategy will take a multi-channel approach

*HERE'S AN OVERVIEW OF HOW PEOPLE ARE PERCEIVING AND TALKING* — 1118

WORKSPACE 1

SUBJECT 1
-DOCUMENT 1
-DOCUMENT 2

SUBJECT 2
-DOCUMENT 3
-DOCUMENT 4

WORKSPACE 2

WORKSPACE 3

1104

1106

1100

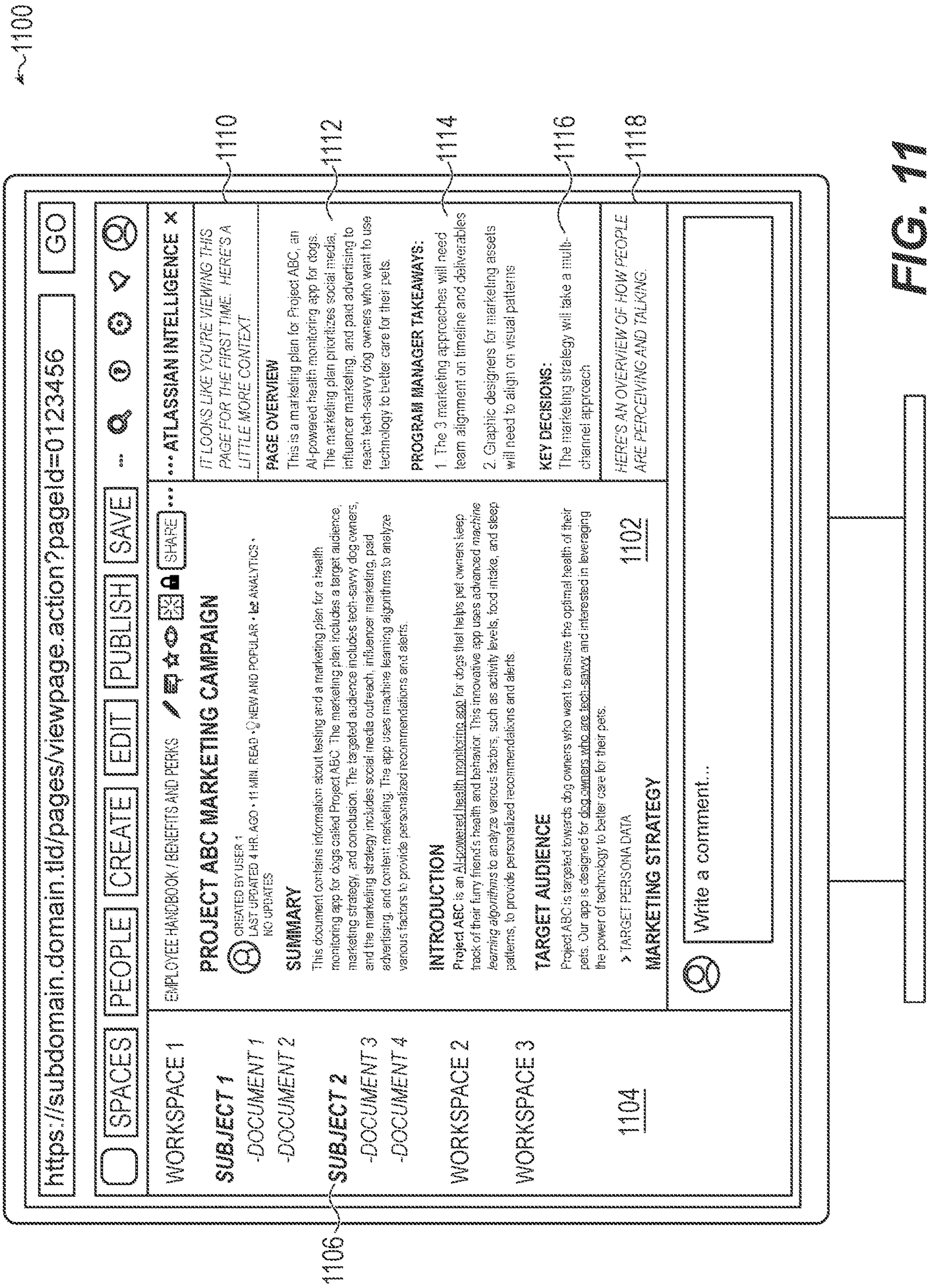

FIND ACTION ITEMS | PROGRAM: GENERATIVE AI IN THE EDITOR
1226  1222
1224
1230

SEARCH OR PASTE A LINK

🔍 FIND RECENT LINKS OR PASTE A NEW LINK — 1232

DISPLAY TEXT (OPTIONAL)

TEXT TO DISPLAY — 1232

RECENTLY VIEWED

📄 PROGRAM: GENERATIVE AI IN THE EDITOR
CONFLUENCE CLOUD • VIEWED 37 MINUTES AGO

📄 GEN AI WEEKLY SYNCS NOTES
CONFLUENCE CLOUD • VIEWED 42 MINUTES AGO — 1232

📄 CONFLUENCE AI PROGRESS REVIEW WITH WM4A
CONFLUENCE AI • VIEWED ABOUT 1 HOUR AGO

📄 DOCUMENT 1
USER 1 • VIEWED ABOUT 1 HOUR AGO

📄 GEN AI SERVICE QUESTION DUMP
USER 1 • VIEWED ABOUT 3 HOURS AGO

CANCEL  INSERT

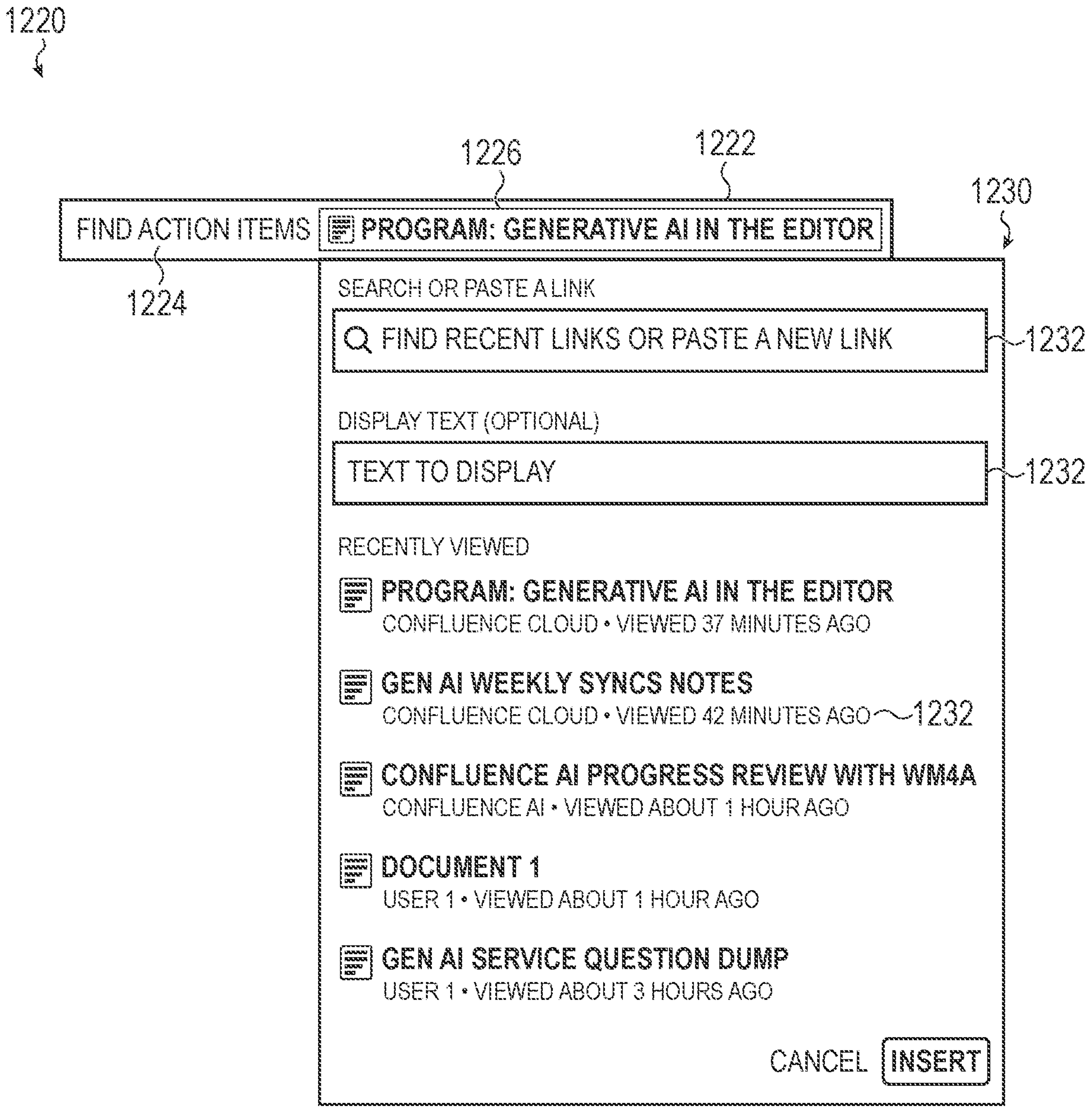

INTRODUCING AI: DEV DOCUMENTATION: FULL WIDTH PROMPT FOR EAP AND BEYOND

ACTION ITEMS
- ☐ CONFIRM THE DECISION ON AI MODAL WIDTH WITH THE TEAM.
- ☐ EXPLORE ALTERNATE BEHAVIOR FOR AI MODAL WIDTH WITH DESIGN AND ENGINEERING.
- ☐ SOLVE ISSUES RELATED TO AI MODAL WIDTH POST EAP.

⎫
⎬ 1250
⎭

1202

CONTEXT

FOR EAP WE MADE A DECISION THAT THE AI MODAL WIDTH WOULD:
- NESTLE THE EDITOR FOR CONTEXT THAT IS NOT IN A BREAKOUT
  - SEE DECISION 12 APRIL [☑ DECISION LOG: EDITOR INTRODUCING AI]
- NESTLE THE BREAKOUT FOR CONTENT THAT IS IN A BREAKOUT. [PENDING CONFIRMATION]
  - MY ASSUMPTION IS THAT THIS WAS CONFIRMED AS PART OF [⊙ ED-17970: AI EXPERIENCE IN WIDE PAGE LAYOUT DOESN'T ALIGN TO THE TEXT] [DONE] - I COULDN'T FIND A RECORD
  - SO I HAVE PINGED [@BOB JONES].

THIS DECISION WAS AIMED AT MINIMISING THE SCOPE FOR EAP - AS ALTERNATE BEHAVIOR HAS A RANGE OF UX COMPLEXITIES THAT SHOULD HAVE DESIGN ALIGNMENT.

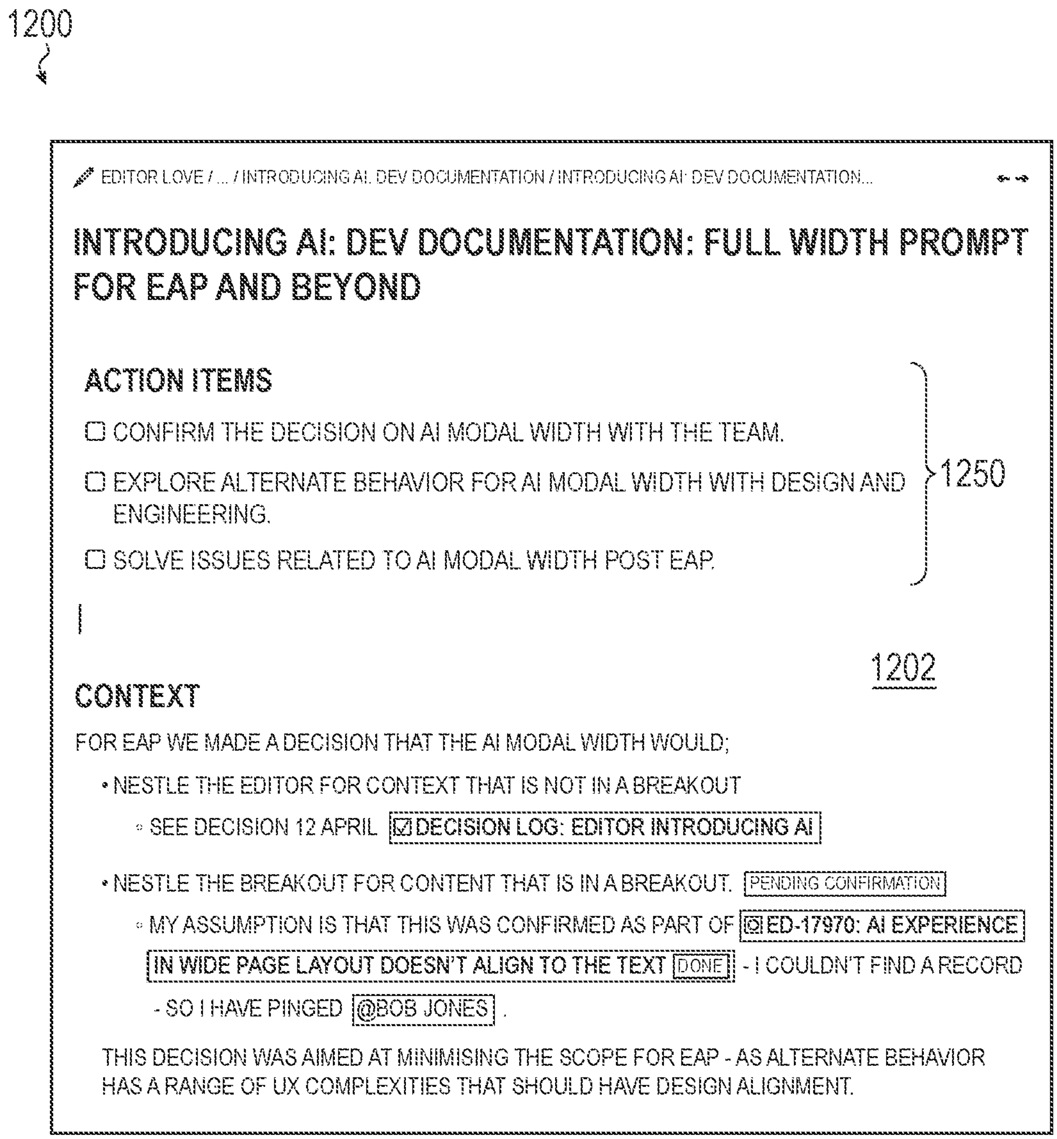

THIS DECISION WAS AIMED AT MINIMISING THE SCOPE FOR EAP - AS ALTERNATE BEHAVIOR HAS A RANGE OF UX COMPLEXITIES THAT SHOULD HAVE DESIGN ALIGNMENT.

1302

DISCLAIMER

FROM DISCUSSION ON THE CURRENT BEHAVIOR BOTH DESIGN AND ENGINEERING WERE KEEN TO EXPLORE ALTERNATE BEHAVIOR.

1304

HAVING MORE ADVANCED BEHAVIOR DOES NOT HAVE MUCH ADDITIONAL TECHNICAL COMPLEXITY - AND THERE IS NO TECHNICAL BLOCKER TO IMPLEMENTING MORE ADVANCED POSITIONING.

OUR MAIN DRIVE ON DESCOPING MORE ADVANCED RULES IS IT LIKELY REQUIRES SIGNIFICANT INVESTMENT IN UNDERSTANDING VARIOUS EDITOR STATES, AND DESIGN WORK TO COME WITH A PATTERN THAT COVERS THE 90% OF CASES.

START DRAFTING
SUMMARIZE
SUGGEST A TITLE
1322 — FIND ACTION ITEMS
SHORTEN
IMPROVE WRITING
1370 — FIX SPELLING & GRAMMAR
CHANGE TONE TO CASUAL
CHANGE TONE TO EDUCATIONAL
CHANGE TONE TO EMPATHETIC
CHANGE TONE TO NEUTRAL
CHANGE TONE TO PROFESSIONAL

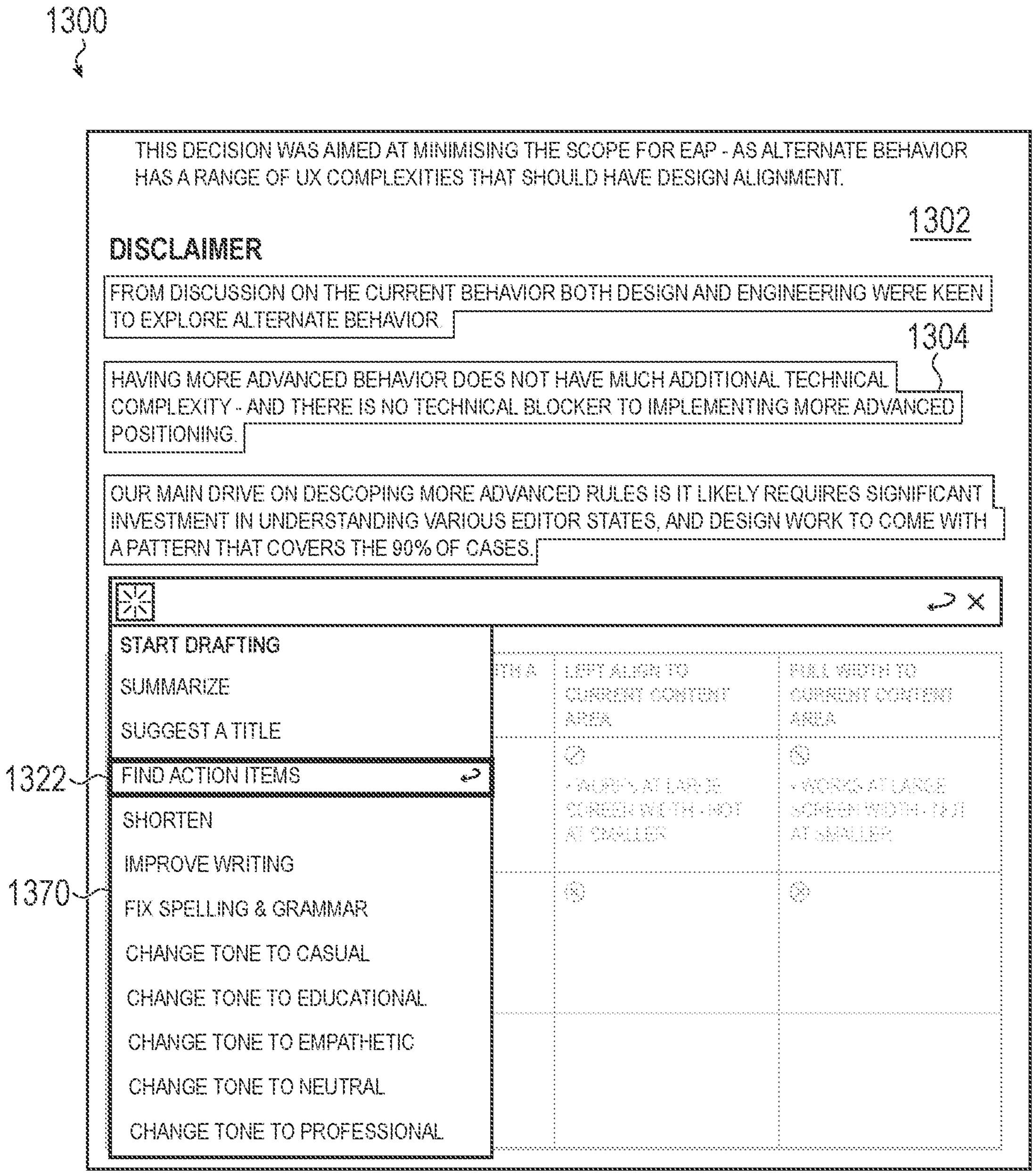

BANCLY ENGINEERING / Q2 PROJECTS

HERCULES PROJECT PLAN

CREATED BY USER 1
LAST UPDATED ABOUT 12 MINUTES AGO BY USER 2

1502

BACKGROUND   1523   1506

FairyDust

1522 — ⊞ FAIRYDUST [PROJECT]   ✏ — 1536

1524 — FAIRYDUST IS A PROJECT FOR OUR NEW PAYMENTS DESIGN SYSTEM. THE SYSTEM IS MADE UP OF A REUSABLE PATTERNS AND TOOLING TO ENABLE OUR ONLINE TRANSACTION TEAMS TO MOVE FASTER.   1520

RELATED WORK

1526 — 📄 FAIRYDUST DESIGN LIBRARY
FIGMA

⊕ IMPROVE ONLINE TRANSACTIONS CSAT BY 3%
ATLAS GOAL

▭ DROP BEARS TEAM BACKLOG
TRELLO BOARD

WORKED ON BY

1528 — [⊞ TRANSACTIONS TEAM] [⊞ TEAM B] [@ USER 1]

(⊙⊙⊙) AND 10 OTHERS VERIFIED THIS.   ⋯   👍 👎

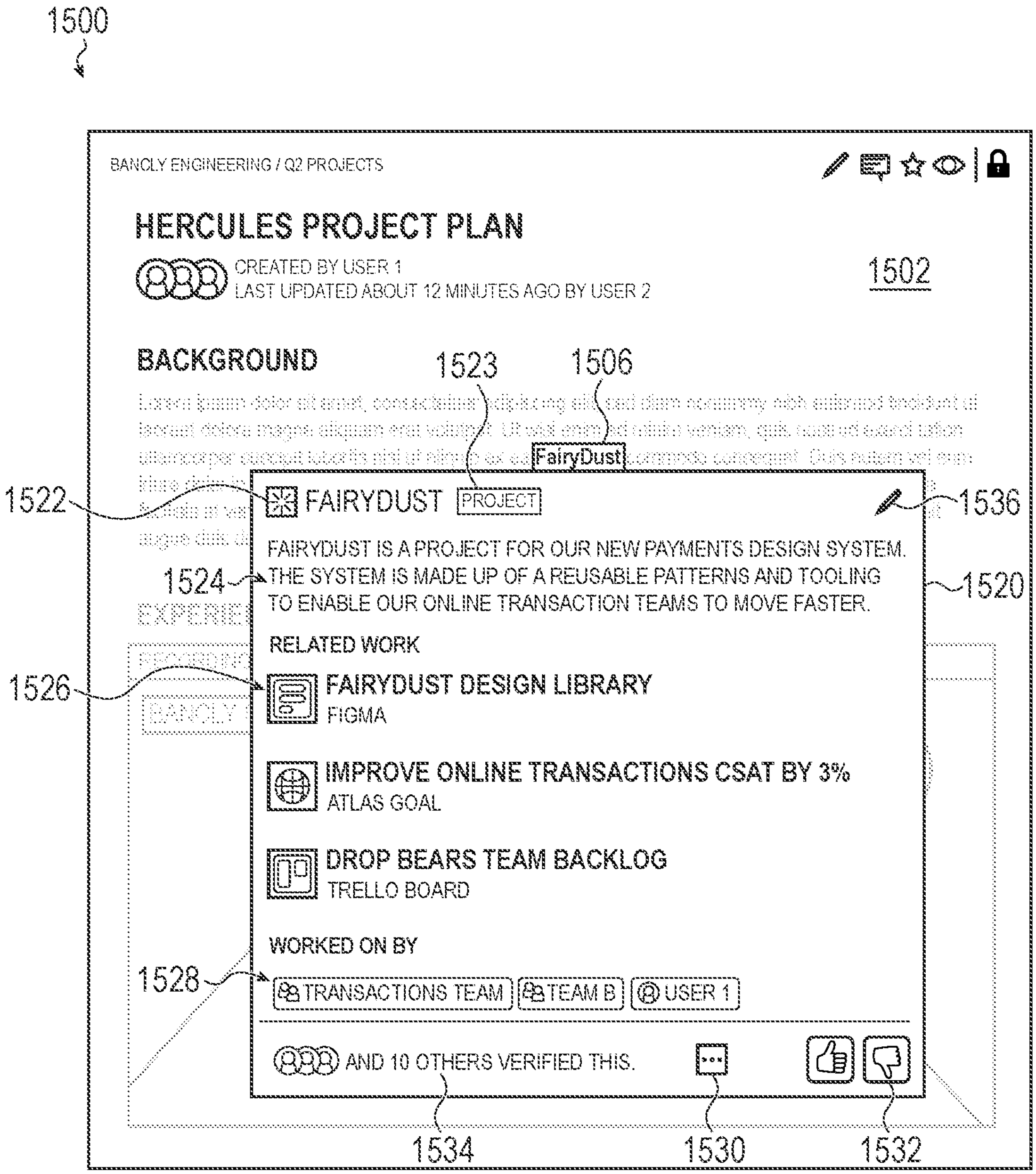

*FIG. 15B*

| | | | | | | |
|---|---|---|---|---|---|---|
| TYPE | KEY | SUMMARY | ASSIGNEE | REPORTER | P | STATUS | RESOLUTION |
| | BERRY-496 | [FRONTEND] MEATBALL MENU ON CUSTOMER... | @UNASSIGNED | @MARK W. | ⚑ | TO DO ⌄ | UNRESOLVED MAY |
| | GORDIAN-1562 | INCREMENT 19 DEMO | @SUSAN H. | @SUSAN H. | = | IN PROGRESS ⌄ | UNRESOLVED MAY |
| | JGQL-1413 | [PIR-15233] HIGH PRIORITY ACTION... | @UNASSIGNED | @ROBERT S. | = | TO DO ⌄ | UNRESOLVED MAY |
| | JGQL-1412 | [PIR-15233] MEDIUM PRIORITY ACTION... | @UNASSIGNED | @ROBERT S. | = | TO DO ⌄ | UNRESOLVED MAY |
| | JGQL-1115 | [WRITE] ROLLOUT DOWNGRADE TASK | @UNASSIGNED | @STEVE B. | = | TO DO ⌄ | UNRESOLVED MAY |
| | JGQL-1114 | [WRITE] ADD DOWN-GRADE TASK FOR... | @UNASSIGNED | @STEVE B. | = | TO DO ⌄ | UNRESOLVED MAY |
| | JGQL-1113 | SPIKE ON DOWN-GRADE TASK FOR... | @UNASSIGNED | @STEVE B. | = | TO DO ⌄ | UNRESOLVED MAY |

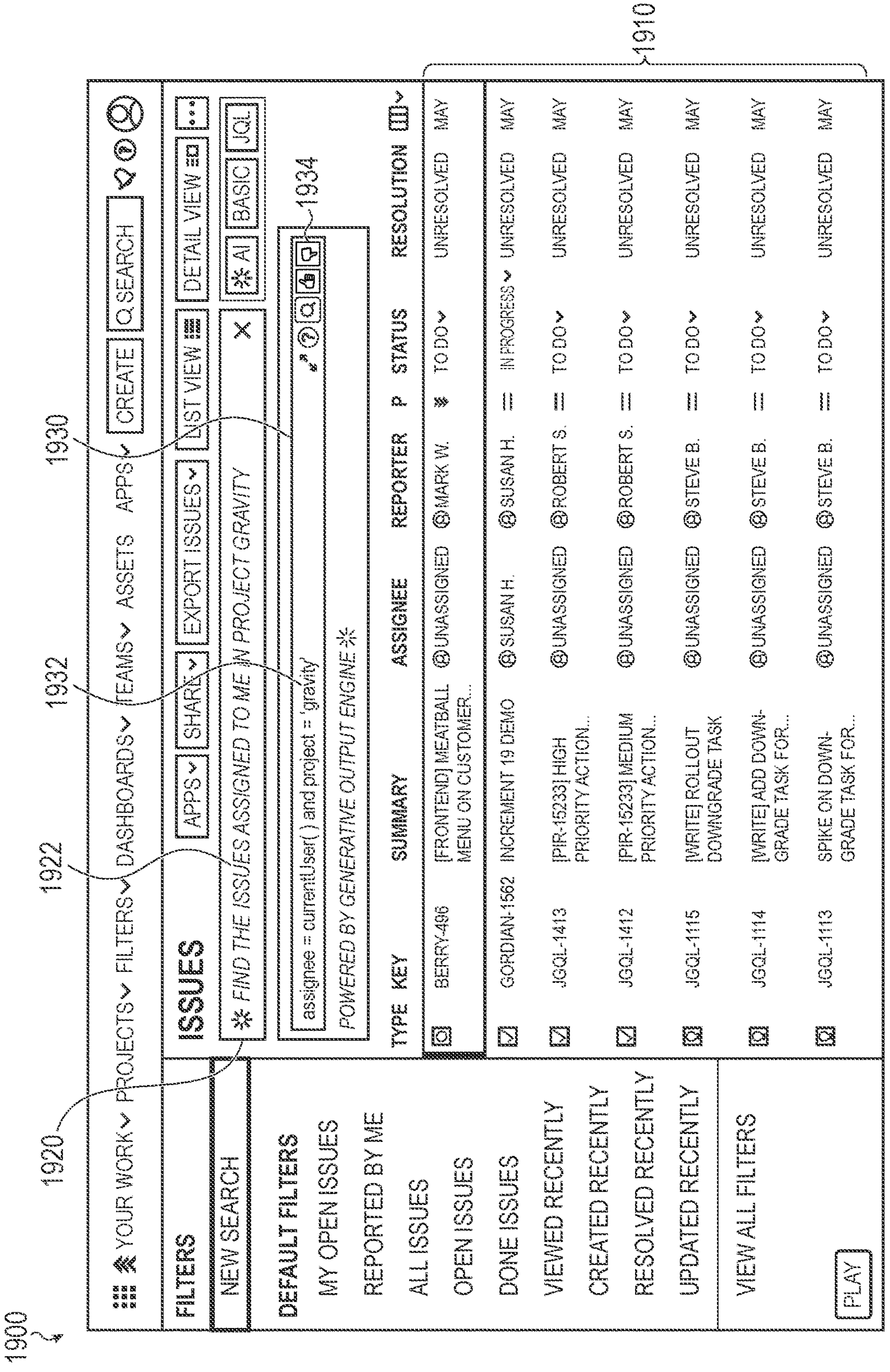

EXAMPLE PROMPT ADDENDUM EDIT •••

```
Today's date is ${currentDate}.

Here is a list lt JQL functions that are available for you to use when responding
with JQL. It is in CSV format. Please do not use any JQL approved, approver,
aqlFunction, breached, cascadeOption, closedSprints , completed, componentsLeadByUser,
currentLogin , currentUser, earliestUnrelated.

You are forbidden from using the "issueFunction" JQL field.

Here are some examples of how a prompt can be translated to JQL:
Prompt: Find my tasks in projects that I have permission to edit
JOL: assignee= currentUser() and type= task and project IN
projectsWhereUserHasPeraission("edit issues")

Prompt: The parent issue is GPT-1337
JQL: parent = "GPT-1337"

Prompt: Find issues c reated on January 3 2023
JOL: created >= "2023-01-03" and created < "2023-01-84"

Prompt: Find issues updated since yesterday
JQL: updated >= startOfDay(-1)

Prompt : Find issues due after next week
JOL : due > endOfWeek(1)

Prompt: Find issues resolved last aonth
JOL: resolved >= startOfMonth(-1) and resolved < startOfMonth()

Prompt : Components lead by me with 11ediu11 priority or greater
JQL: component IN componentsLeadByUser() and priority >= "medium"

Prompt : Show me issues with the ice leopard label
JQL: labels = "ice-leopard"

Prompt : Show ae issues missing labels green robot and friendly dream
JOL : labels NOT IN ("green-robot". "friendly-dream")

Here are soae examples of how the "WAS" operator can be used in JQL:
Prompt : Which issues were not triaged by me last month
JQL · status WAS NOT "triaged" DURING (startOfMonth(-1), endOfMonth(-1))
BY currentUser()

Prompt: Part of Epics I recently viewed
JOL: "Epic Link" IN issueHistory()

Prompt: Issues linked to Epics I'm currently watching
JQL: "Epic Link" IN watchedIssues()
```

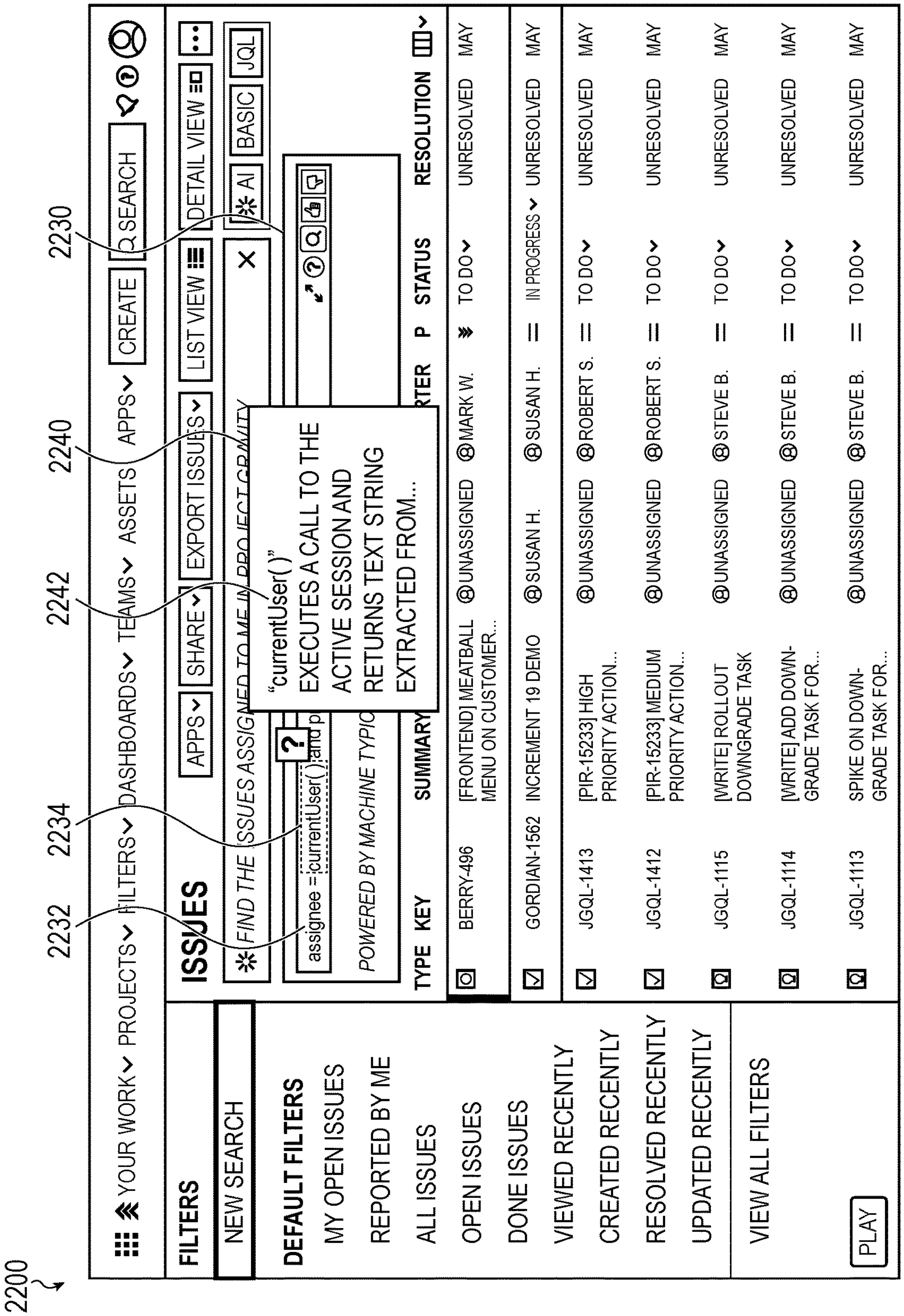

FIG. 22

| | FILTERS | ISSUES | | | APPS ⌄ | SHARE ⌄ | EXPORT ISSUES ⌄ | | APPS ⌄ | CREATE | | |
|---|---|---|---|---|---|---|---|---|---|---|---|---|

≪ YOUR WORK ⌄  PROJECTS ⌄  FILTERS ⌄  DASHBOARDS ⌄  TEAMS ⌄  ASSETS  APPS ⌄  CREATE  Q SEARCH  ♡ ⊙

FILTERS

NEW SEARCH — 2232, 2234

DEFAULT FILTERS
- MY OPEN ISSUES
- REPORTED BY ME
- ALL ISSUES
- OPEN ISSUES
- DONE ISSUES
- VIEWED RECENTLY
- CREATED RECENTLY
- RESOLVED RECENTLY
- UPDATED RECENTLY

VIEW ALL FILTERS

PLAY

ISSUES — 2230

✱ FIND THE ISSUES ASSIGNED TO ME IN PROJECT GRAVITY

`assignee = jcurrentUser() and p`  ✱  AI  BASIC  JQL

LIST VIEW ▦  DETAIL VIEW ▭

POWERED BY MACHINE TYPIC... — 2242

"currentUser()"
EXECUTES A CALL TO THE
ACTIVE SESSION AND
RETURNS TEXT STRING
EXTRACTED FROM... — 2240

| TYPE | KEY | SUMMARY | RTER | P | STATUS | RESOLUTION |
|---|---|---|---|---|---|---|
| ◉ | BERRY-496 | [FRONTEND] MEATBALL MENU ON CUSTOMER... | @MARK W. | ≫ | TO DO ⌄ | UNRESOLVED MAY |
| ☑ | GORDIAN-1562 | INCREMENT 19 DEMO | @SUSAN H. | = | IN PROGRESS ⌄ | UNRESOLVED MAY |
| ☑ | JGQL-1413 | [PIR-15233] HIGH PRIORITY ACTION... | @ROBERT S. | = | TO DO ⌄ | UNRESOLVED MAY |
| ☑ | JGQL-1412 | [PIR-15233] MEDIUM PRIORITY ACTION... | @ROBERT S. | = | TO DO ⌄ | UNRESOLVED MAY |
| ☑ | JGQL-1115 | [WRITE] ROLLOUT DOWNGRADE TASK | @STEVE B. | = | TO DO ⌄ | UNRESOLVED MAY |
| ☑ | JGQL-1114 | [WRITE] ADD DOWN-GRADE TASK FOR... | @STEVE B. | = | TO DO ⌄ | UNRESOLVED MAY |
| ☑ | JGQL-1113 | SPIKE ON DOWN-GRADE TASK FOR... | @STEVE B. | = | TO DO ⌄ | UNRESOLVED MAY |

2200

2700

2710

```
Generate the name of a Task card that's relevant to the following board and list.
  The board's name is: ${boardName}.
  The list's name is: ${listName}.
  The list already has the following cards: ${cardNames}.
  The format of your response should be a valid JSON document that looks like ...
  {"cardName": "Generated Card Name"}
```

```
I have a Task card titled: '${cardTitle}'. The card belongs to a list named: '${ltstName}'
and the card's board is titled: '${boardName}'.
    I want you to write a description for this Task card. Do not tell me where this card is
located. Do not tell me what this card's title is. Do not tell me this card's list name or
board h tle.
    The format of your response should be a valid JSON document that looks like...
{"description": "Generated Card Oescription"}
```

USER 1 Jul 8th at 3:21 AM
!disturbed I have changed my phone and need to install DUO on the new one. Can you resend me the activation message. —— 2902

*10 replies*

ASSIST [APP] 1 month ago
👋 Hi! I'm your virtual agent, here to help with your IT questions or requests.

ASSIST [APP] 1 month ago
It sounds like you want to enroll a new device/ Yubikey for Duo. Is that correct? —— 2912

[@USER1] selected "Yes" —— 2920

ASSIST [APP] 1 month ago
Are you trying to enroll a Yubikey or a new device for DUO? —— 2914

If you are trying to enroll for Sharework/Solium, Workday or Bitbucket, pick the other option below.

[@USER1] selected "New Device" —— 2922

ASSIST [APP] 1 month ago
Do you have another authentication method in Duo (e.g., Yubikey, old phone, Touch ID)?

[@USER1] selected "Yes"

ASSIST [APP] 1 month ago
Great! Please check this article on *how to add a new phone or tablet to Duo*.

Did this resolve your issue?

[@USER1] selected "Yes"

ASSIST [APP] 1 month ago
Great! Before you go, can I ask how you would rate the support you received today? —— 2930

[@USER1] selected "☆☆☆☆☆"

2910 (bracket around replies)

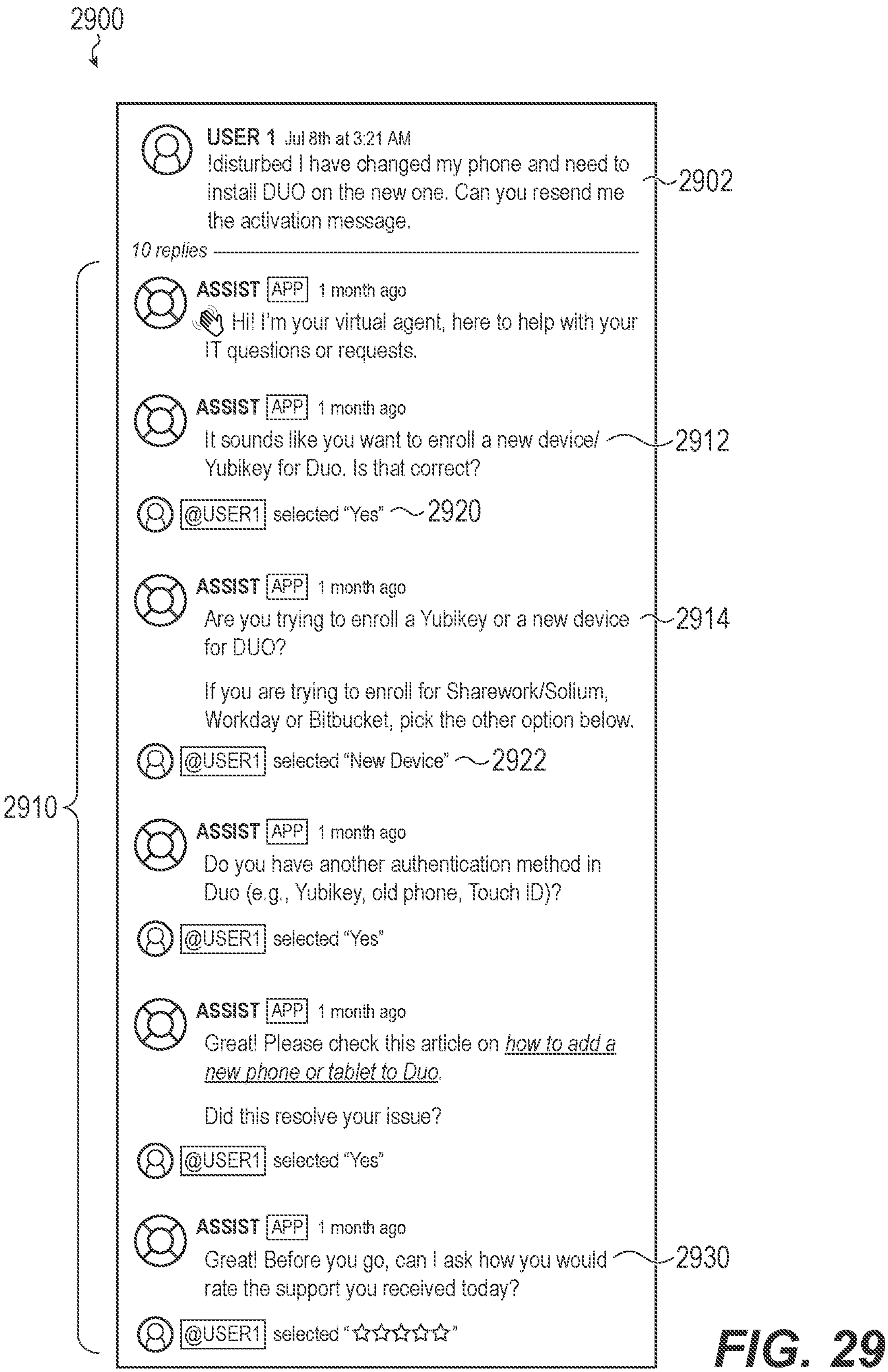

Kingfish AI APP 3 minutes ago
Step 3 - Detailed Article Scan

Summary of relevant source content used in answer:

Source #1: *Notification System notifications are not included in the...* ~3142

Notification System notifications are not included in the Master Workbox. Master and Notification System need to fully trust each other in order for Notification System notifications to be shown in the Master Workbox. You can edit your existing Application Link by going to Master Admin > Application Links and configure your Application Link with Notification System to include some kind of authentication. ~3144

Source #2: *(Archived) Not Received Email Notifications in...* ~3140

User does not receive email notification for issue updates. User does not receive email notification for certain project updates. User does not receive email notification when an issue is Resolved. User does not receive email notification for all project updates. Use the Notification System Notification Helper. The Notification System Helper can help you diagnose why a user isn't receiving email notifications when they should be, or why a user is receiving email notifications when they shouldn't be. This tool is only available to the Notification System administrators. To diagnose why a user is or is not receiving notifications for an issue: View the Issue in Notification System. Click Admin > Notification Helper. Enter the username of the user. Click Submit.

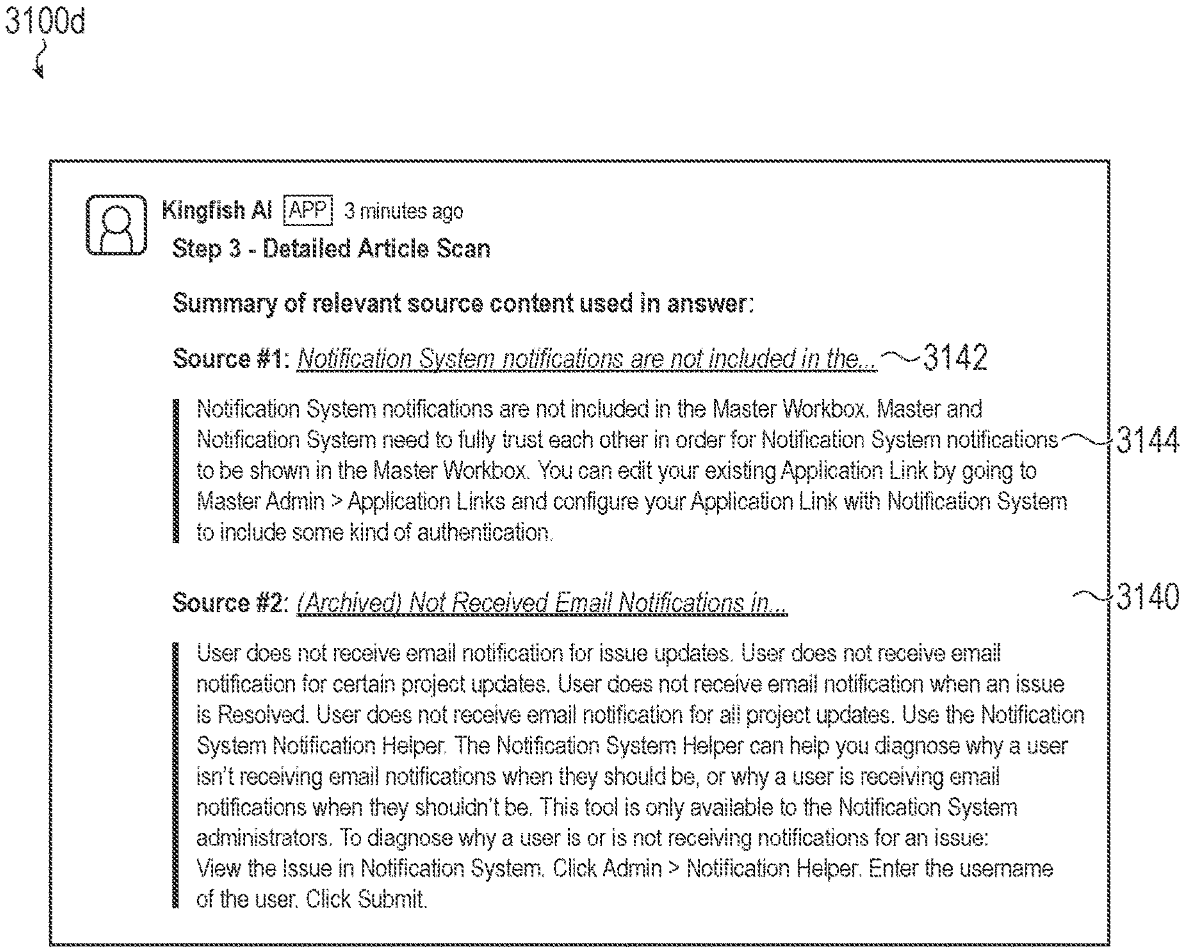

Kingfish AI [APP] 3 minutes ago
Step 4 - Suggested Answer

Hello,

Thank you for reaching out to Company Support. I'm sorry to hear that your developer is not receiving notifications from Notification System. I'll be happy to help you with this.

To diagnose why a user is or is not receiving notifications for an issue, you can use the Notification System Notification Helper. This tool is only available to Notification System administrators. Here are the steps to diagnose the issue:

1. View the issue in Notification System.
2. Click Admin > Notification Helper.
3. Enter the username of the user.
4. Click Submit.

This will help you diagnose why the user is not receiving email notifications when they should be, or why the user is receiving email notifications when they shouldn't be.

If the above steps do not help, please check if the user has opted out of any notifications related to the changes they make. This will override other notifications settings. To check this, please follow these steps:

1. Go to the user's profile.
2. Check if the "Own Changes" option is set to "Notify Me". If not, please set it to "Notify Me."

3150

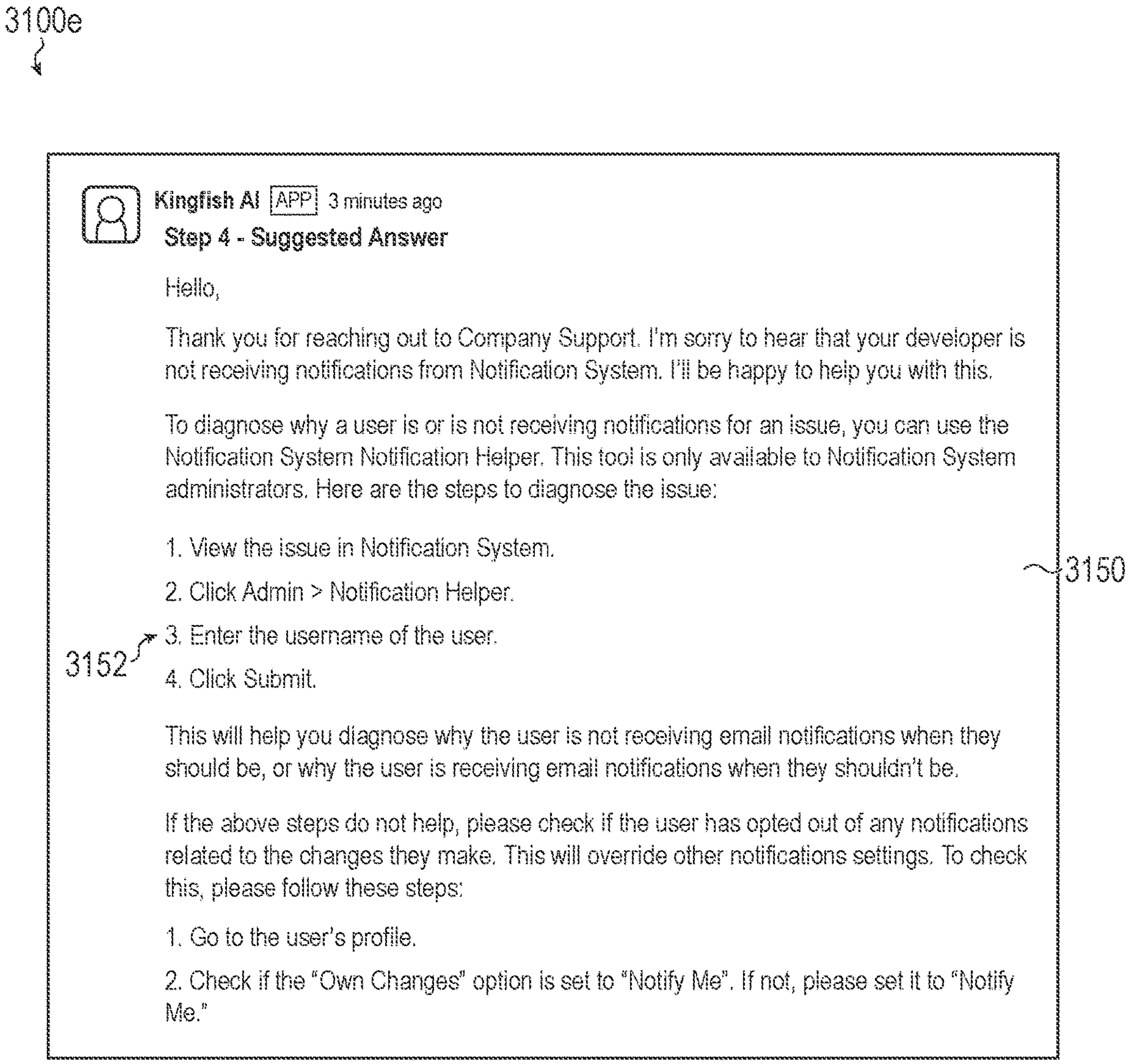

*FIG. 31E*

AUTOMATED CONTENT CREATION AND CONTENT SERVICES FOR COLLABORATION PLATFORMS

CROSS-REFERENCE TO RELATED APPLICATION(S)

This application is a nonprovisional patent application of and claims the benefit of U.S. Provisional Patent Application No. 63/523,909, filed Jun. 28, 2023 and titled "Automated Content Creation for Collaboration Platforms," the disclosure of which is hereby incorporated herein by reference in its entirety.

TECHNICAL FIELD

Embodiments described herein relate to multitenant services of collaborative work environments and, in particular, to systems and methods for automated content creation and organization in collaborative work environments.

BACKGROUND

An organization can establish a collaborative work environment by self-hosting, or providing its employees with access to, a suite of discrete software platforms or services to facilitate cooperation and completion of work. In many cases, the organization may also define policies outlining best practices for interacting with, and organizing data within, each software platform of the suite of software platforms.

Often internal best practice policies require employees to thoroughly document completion of tasks, assignment of work, decision points, and so on. Such policies additionally often require employees to structure and format documentation in particulars ways, to copy data or status information between multiple platforms at specific times, or to perform other rigidly defined, policy-driven, tasks. These requirements are both time and resource consuming for employees, reducing overall team and individual productivity.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 7A-7B depict another example result of invocation of an editor assistant service that can be used create or modify content in an editor region of a graphical user interface.

FIGS. 9A-9B depict an editor assistant service invoked to provide a summary of comments, events, or other entries associated with an object of a collaboration platform.

FIG. 11 depicts another example of use of a generative output engine with a collaboration platform.

FIGS. 12A-12D depict an example result of invocation of an editor assistant service that can be used to generate a list of tasks or action items in an editor region of a graphical user interface.

FIGS. 13A-13B depict an example result of invocation of an editor assistant service that can be used perform generative commands in an editor region of a graphical user interface.

FIGS. 15A-15B depict an example supplemental content window, which may be displayed in response to a user selection of control in a graphical user interface as described herein.

FIGS. 19A-19B depict a list of issues displayed in an issue listing region of a graphical user interface.

FIG. 19C depicts an example prompt that can be used to produce a particular schema response.

FIGS. 21-22 depict example visualization tools and user interface elements for mapping a source of a query term or clause of a generative structured query.

FIGS. 27A-27B depict example prompts that include predetermined query prompt text that can be used to generate a new task card that is in accordance with the respective task stack or column.

FIG. 29 depicts a graphical user interface rendering an example exchange between a client messaging interface and a provider messaging interface, the provider messenger interface operated by an automated chat service.

FIGS. 31A-31E depict an example graphical user interface that includes an initial user-generated request message including a natural language user input provided to a chat interface of a messaging platform and generative responses provided via the messaging platform.

The use of the same or similar reference numerals in different figures indicates similar, related, or identical items.

Figure 1:
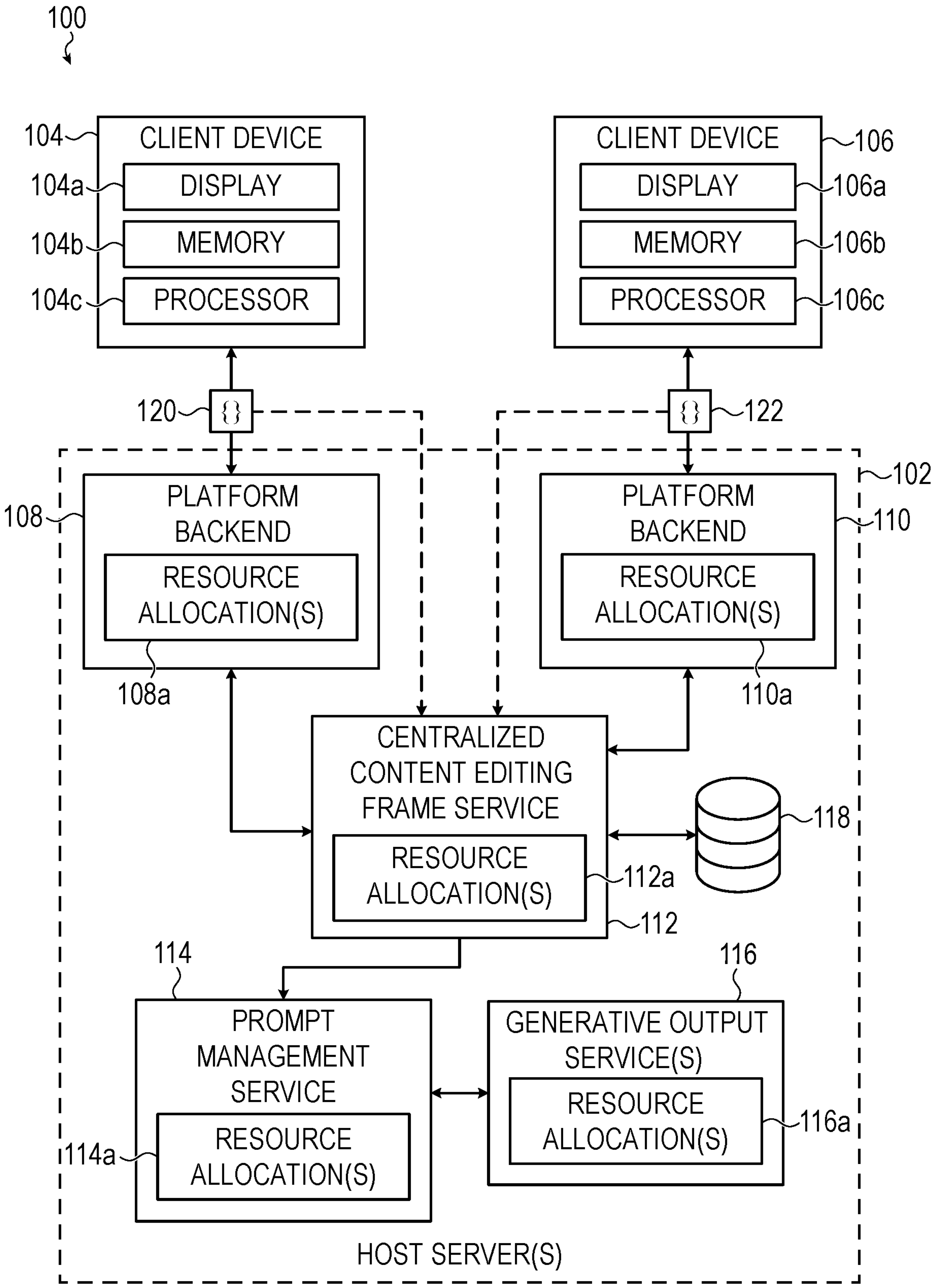
FIG. 1 depicts a simplified diagram of a system, such as described herein that can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for automatically generating content, generating API requests and/or request bodies, structuring user-generated content, and/or generating structured content in collaboration platforms, such as documentation systems, issue tracking systems, project management platforms, and the like.

Automatically generated content can supplement, summarize, format, and/or structure existing tenant-owned user-generated content created by a user while operating a software platform, such as described herein. In one embodiment, user-generated content can be supplemented by an automatically generated summary. The generated summary may be prepended to the content such that when the content is rendered for other users, the summary appears first. In other cases, the summary may be appended to an end of the document. In yet other examples, the generated summary may be transmitted to another application, messaging system, or notification system. For example, a generated document summary can be attached to an email, a notification, a chat or ITSM support message, or the like, in lieu of being attached or associated with the content it summarizes.

In another example, user-generated content can be supplemented by automatic insertion of format markers or style classes (e.g., markdown tags, CSS classes, and the like) into the user-generated content itself. In other examples, user-generated content can be rewritten and/or restructured to include more detail, to remove unnecessary detail, and/or to adopt a more neutral or positive tone. These examples are not exhaustive.

In yet other examples, multiple disparate user-generated content items, stored in different systems or in different locations, can be collapsed together into a single summary or list of summaries.

In addition to embodiments in which automatically generated content is generated in respect of existing user-generated content (and/or appended thereto), automatically generated content as described herein can also be used to supplement API requests and/or responses generated within a multiplatform collaboration environment. For example, in some embodiments, API request bodies can be generated automatically leveraging systems described herein. The API request bodies can be appended to an API request provided as input to any suitable API of any suitable system. In many cases, an API with a generated body can include user-specific, API-specific, and/or tenant-specific authentication tokens that can be presented to the API for authentication and authorization purposes.

The request bodies, in these embodiments, can be structured so as to elicit particular responses from one or more software platforms' API endpoints. For example, a documentation platform may include an API endpoint that causes the documentation platform to create a new document from a specified template. Specifically, in these theses examples, a request to this endpoint can be generated, in whole or in part, automatically. In other cases, an API request body can be modified or supplemented by automatically generated output, as described herein.

For example, an issue tracking system may present an API endpoint that causes creation of new issues in a particular project. In this example, string or other typed data such as a new issue titles, new issue state, new issue description, and/or new issue assignee fields can be automatically generated and inserted into appropriate fields of a JSON-formatted request body. Submitting the request, as modified/supplemented by automatically generated content, to the API endpoint can result in creation of an appropriate number of new issues.

In another example, a trouble ticket system (e.g., an information technology service management or "ITSM" system) may include an interface for a service agent to chat with or exchange information with a customer experiencing a problem. In some cases, automatically generated content can be displayed to the customer, whereas in other cases, automatically generated content can be displayed to the service agent.

For example, in the first case, automatically generated content can summarize and/or link to one or more documents that outline troubleshooting steps for common problems. In these examples, the customer experiencing an issue can receive through the chat interface, one or more suggestions that (1) summarize steps outlined in comprehensive documentation, (2) link to a relevant portion of comprehensive documentation, or (3) prompt the customer to provide more information. In the second case, a service agent can be assisted by automatically generated content that (1) summarizes steps outlined in comprehensive documentation and/or one or more internal documentation tools or platforms, (2) link to relevant portions of comprehensive help documentation, or (3) prompt the service agent to request more information from the customer. In some cases, generated content can include questions that may help to further narrowly characterize the customer's problem. More generally, automatically generated content can assist either or both service agents and customers in ITSM environments.

The foregoing embodiments are not exhaustive of the manners by which automatically generated content can be used in multi-platform computing environments, such as those that include more than one collaboration tool.

More generally and broadly, embodiments described herein include systems configured to automatically generate content within environments defined by software platforms. The content can be directly consumed by users of those software platforms or indirectly consumed by users of those software platforms (e.g., formatting of existing content, causing existing systems to perform particular tasks or sequences of tasks, orchestrate complex requests to aggregate information across multiple documents or platforms, and so on) or can integrate two or more software platforms together (e.g., reformatting or recasting user generated content from one platform into a form or format suitable for input to another platform).

Scalable Network Architecture for Automatic Content Generation

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding.

In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples).

In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input.

For example, the user may engage with a button in a UI that causes a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service.

The preconditioning service can, without limitation: append additional context to the user's raw input; may insert the user's raw input into a template prompt selected from a set of prompts; replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). Generally, an LLM is a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, “lexical elements” may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. Generally, an LLM may be trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of “can a computer” invites completion, but also represents an initial phrase that can begin a near limitless number of probabilistically reasonable next words, phrases, punctuation and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be “can a computer supplied with a 30 W power supply consume 60 W of power?” A large number of possible correct phrasings of a continuation of this example prompt exist, but the number is significantly smaller than the preceding example, and a suitable continuation may be selected or generated using a number of techniques. In many cases, a continuation of an input prompt may be referred to more generally as “generated text” or “generated output” provided by a generative output engine as described herein.

Generally, many written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation.

In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt.

For example, a prompt of “what is the syntax for a while loop in C and how does it work” may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string “this document corresponds to project ID 123456, status of which is pending.” In this example, a suitable LLM prompt may be provided that causes the LLM to determine an association between the documentation platform and a project management platform based on the reference to “project ID 123456.”

In response to this recognized context, the LLM can wrap the substring “project ID 123456” in anchor tags with an embedded URL in HTML-compliant syntax that links directly to project 123456 in the project management platform, such as: “<a href='https://example link/123456>project 123456</a>”.

In addition, the LLM may be configured to replace the substring “pending” with a real-time updating token associated with an API call to the project management system. In this manner, this manner, the LLM converts a static string within the document management system into richer content that facilitates convenient and automatic cross-linking between software products, which may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilities bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of different attention mechanisms, including self-attention mechanisms, may be suitable.

In sum, in response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations.

In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoint, such as for configuration or for receiving input prompts. The generative output application can be further configured to provide generated text output to one or more subscribers or API clients. Many suitable interfaces can be configured to provide input to and to received output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:

```
{
  “prompt” : “Generate five words of placeholder text in the English language.”,
  “API_KEY: “hx-Y5u4zx3kaF67AzkXK1hC”,
  “user_token”: “PkcLe7Co2G-50AoIVojGJ”
}
```

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:

```
{
  “response” : “Hello world text goes here.”,
  “generation_time_ms” : 2
}
```

In some embodiments, a prompt provided as input to a generative output engine can be engineered from user input. For example, in some cases, a user input can be inserted into an engineered template prompt that itself is stored in a database. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output engine as described herein.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning—which may be referred to as a "preconditioning software instance" or "prompt preconditioning software instance"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences.

For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on.

For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated to the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may be "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:

```
{
    "raw_prompt" : summarize the edits to this page made by my team since I last visited this page",
    "modified_prompt" : "Generate a summary of each paragraph tagged with an editId attribute matching editId=1, editId=51, editId=165, editId=99 within the following HTML-formatted content: [HTML-formatted content of the page]."
}
```

Similarly, the preconditioning service may utilize a project graph, issue graph, or other data structure that is generated using edges or relationships between system object that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:

```
{
    "snippet123_table_from_tasks" : "The table should be formatted as a three-column table with multiple rows. The leftmost column should be titled 'Title' and the corresponding content of each row of this column should be the title attribute of a task. _The middle column should be titled 'Created Date' and the corresponding content of each row of this column should be the creation date of the task. _The rightmost column should be titled 'Status' and the corresponding content of each row of this column should be the status attribute of the selected task."
}
```

The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:

{
"modified_prompt" : "Find all tasks assigned to User 1234 dating from Jan 01, 2023 - Jan 14, 2023 (inclusive). _Create a table in which each found task corresponds to a respective row of that table. _The table should be formatted as a markdown table, in plain text, with a three columns. _The leftmost column should be titled 'Title' and the corresponding content of each row of this column should be the title attribute of a respective task. _The middle column should be titled 'Created Date' and the corresponding content of each row of this column should be the creation date of the respective task. The rightmost column should be titled 'Status' and the corresponding content of each row of this column should be the status attribute of the respective task."
}

The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents.

In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output engine may be rejected and/or a new prompt may be generated specifically including an exclusion request such as "Exclude and ignore all content at XYZ.url"

In yet other examples, a prompt engineering service may be configured to classify a user input into one of a number of classes of request. Different classes of request may be associated with different permissions handling techniques. For example a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein.

More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused to leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems.

For example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems.

For example, a documentation system can leverage a generative output engine to, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers."

In general, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service.

As with preceding examples, the organization can create and/or purchase user accounts for its employees, so that certain selected employees have access to one or more of issue tracking functionality, documentation functionality, and code repository functionality.

In this example and others, it may be possible to leverage multiple collaboration tools to advance individual projects or goals. For example, for a single software development project, a software development team may use (1) a code repository to store project code, executables, and/or static assets, (2) a documentation service to maintain documentation related to the software development project, (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations. To counteract these effects, many organizations define internal policies that employees are required to follow to maintain data freshness across the various platforms used by an organization.

For example, when a developer submits a new pull request to a repository service, that developer may also be required by the organization to (1) update a description of the pull request in a documentation service, (2) change a project status in a project management application, and/or (3) close a ticket in a ticketing or issue tracking system relating to the pull request. In many cases, updating and interacting with multiple platforms on a regular and repeating basis is both frustrating and time consuming for both individuals and organizations, especially if the completion of work of one user is dependent upon completion of work of another user.

Some solutions to these and related problems often introduce further issues and complexity. For example, many software platforms include an in-built automation engine that can expedite performance of work within that software platform. In many cases, however, users of a software platform with an in-built automation engine may not be familiar with the features of the automation engine, nor may those users understand how to access, much less efficiently utilize, that automation engine. For example, in many cases, accessing in-built automation engines of a software platform requires diving deep into a settings or options menu, which may be difficult to find.

Other solutions involve an inter-platform bridge software that allows data from one platform to be accessed by another platform. Typically, such bridging software is referred to as an "integration" between platforms. An integration between different platforms may allow content, features, and/or functionality of one platform to be used in another platform.

For example, a multiplatform service provider may host an issue tracking system and a documentation system. The provider may also supply an integration that allows issue tracking information and data objects to be shown, accessed, and/or displayed from within the documentation system. In this example, the integration itself needs to be separately maintained in order to be compliant with an organization's data sharing and/or permissions policies. More specifically, an integration must ensure that authenticated users of the documentation system that view a page that references information stored by the issue tracking system are also authorized to view that information by the issue tracking system.

Phrased in a more general way, an architecture that includes one or more integrations between tenancies of different software platforms requires multiple permissions requests that may be forwarded to different systems, each of which may exhibit different latencies, and have different response formats, and so on. More broadly, some system architectures with integrations between software platforms necessarily require numerous network calls and requests, occupying bandwidth and computational resources at both software platforms and at the integration itself, to simply share and request information and service requests for information by and between the different software platforms. This architectural complexity necessitates careful management to prevent inadvertent information disclosure.

Furthermore, the foregoing problem(s) with maintaining integrations' compliance with an organization's policies and organization-owned content access policies may be exacerbated as a provider's platform suite grows. For example, a provider that maintains three separate platforms may choose to provide three separate integrations interconnecting all three platforms; (e.g., 3 choose 2). In this example, the provider is also tasked with maintaining policy compliance associated with those three platforms and three integrations. If the provider on-boards yet another platform, a total of six integrations may be required (e.g., 4 choose 2). If the provider on-boards a fifth platform, a total of ten integrations may be required (e.g., 5 choose 2). Generally, the difficulties of maintaining integrations between different software platforms (in a permissions policy compliant manner) scales exponentially with the number of platforms provided.

Further to the inadvertent disclosure risk and maintenance obligations associated with inter-platform integrations, each integration is still only configured for information sharing, and not automation of tasks. Although context switching to copy data between two integrated platforms may be reduced, the quantity of tasks required of individual users may not be substantially reduced.

Further solutions involve creating and deploying dedicated automation platforms that may be configured to operate with one, and/or perform automations of, or more platforms of a multiplatform system. These, however, much like automation engines in-built to individual platforms, may be difficult to use, access, or understand. Similarly, much like integrations described above, dedicated automation platforms require separate maintenance and employee training, in addition to licensing costs and physical or virtual infrastructure allocations to support the automation platform (s).

In still further other circumstances, many automations may take longer for a user to create than the time saved by automating that particular task. In these examples, individual users may avoid defining automations altogether, despite that, in aggregate, automation of a given task may save an organization substantial time and cost.

These foregoing and other embodiments are discussed below with reference to FIGS. 1-34. The detailed description given herein with respect to these figures is for explanation only and should not be construed as limiting.

User Input Resulting in Generative Output

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms maybe instantiated over physical resources provided by the set of host servers 102. Once instantiated, the first platform backend 108 and the second platform backend 110 can each communicably couple to a centralized content editing frame service 112 (also referred to more simply as an "editor" or an "editor service").

The centralized content editing frame service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized content editing frame service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized content editing frame service 112 that can be called by each respective frontend whenever it is required to present the user of that respective frontend with an interface to edit text.

Figure 2A:
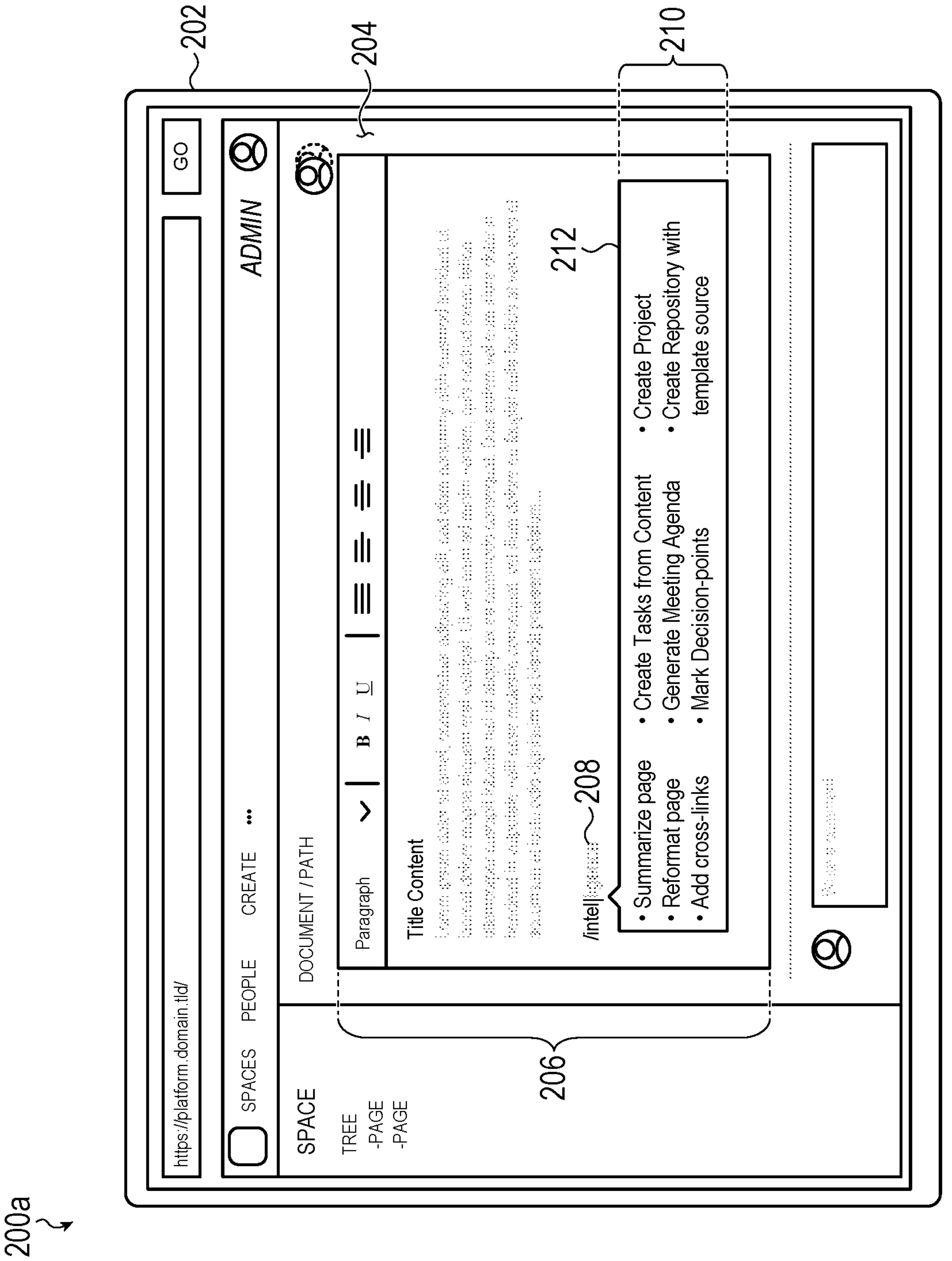
FIG. 2A depicts an example user interface of a documentation platform rendering a frame to receive user input from a user by leveraging a centralized editor service.

For example, the documentation platform's frontend may call upon the centralized content editing frame service 112 to render, or assist with rendering, a user input interface element to receive user text input when a user of the documentation platform requests to edit a document stored by the documentation platform backend (see, e.g., FIG. 2A).

Figure 2B:
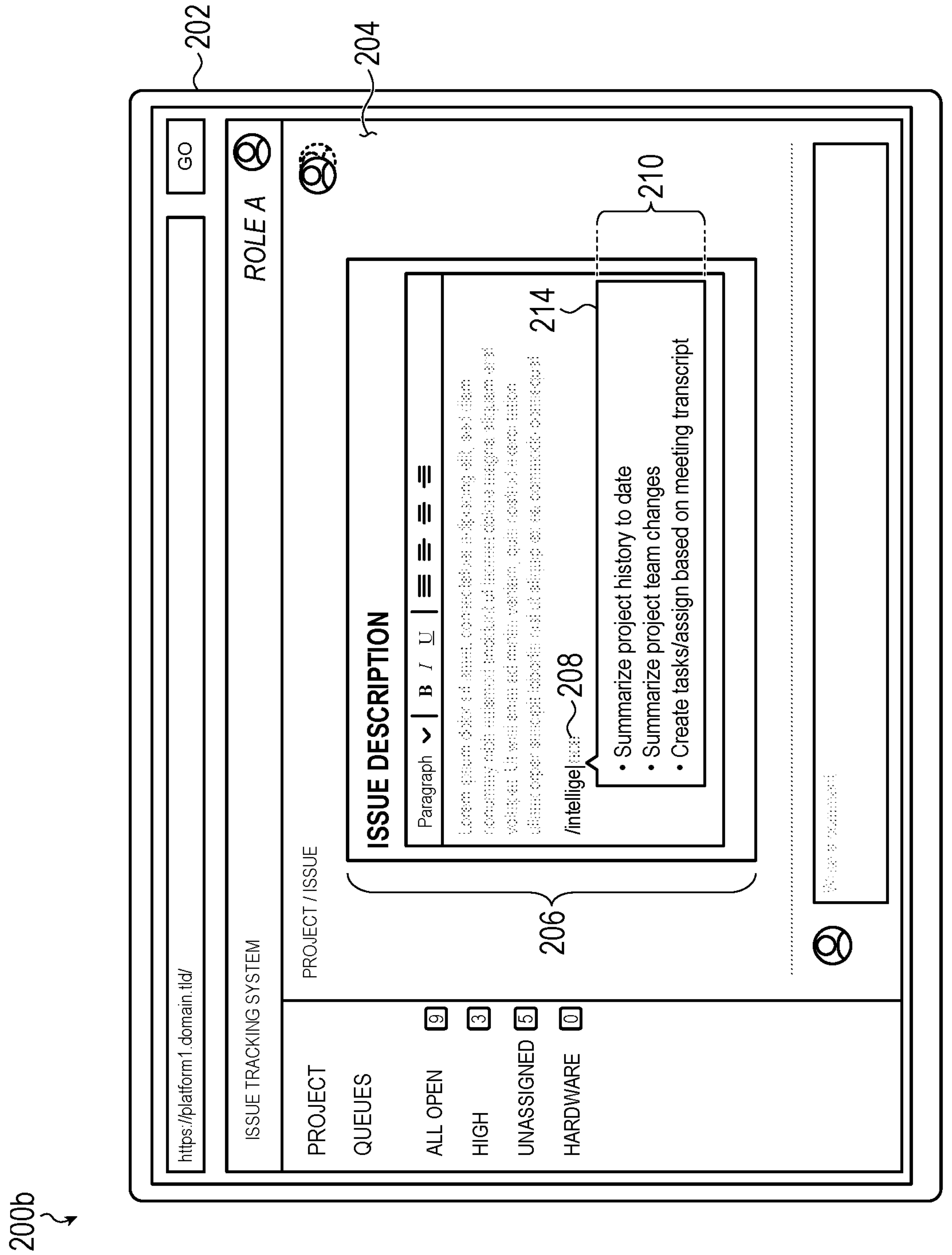
FIG. 2B depicts another example user interface of a documentation platform rendering a frame to receive user input from a user by leveraging a centralized editor service.

Similarly, the issue tracking platform's frontend may call upon the centralized content editing frame service 112 to render, or assist with rendering, a user input interface element to receive user text input when a user of the documentation platform opens a new issue (also referred to as a ticket), and begins typing an issue description (see e.g., FIG. 2B).

In these examples, the centralized content editing frame service 112 can parse text input provided by users of the documentation platform frontend and/or the issue tracking platform backend, monitoring for command and control keywords, phrases, trigger characters, and so on. In many cases, for example, the centralized content editing frame service 112 can implement a slash command service that can be used by a user of either platform frontend to issue commands to the backend of the other system.

For example, the user of the documentation platform frontend can input a slash command to the content editing frame, rendered in the documentation platform frontend supported by the centralized content editing frame service 112, in order to type a prompt including an instruction to create a new issue or a set of new issues in the issue tracking platform. Similarly, the user of the issue tracking platform can leverage slash command syntax, enabled by the centralized content editing frame service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; the a person of skill in the art may readily appreciate that content editing elements can include and/or may be implemented to include many features, which may vary from embodiment to embodiment. For simplicity of description the embodiments that follow reference a centralized content editing frame service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized content editing frame service 112 can be extended to include additional features and functionality-such as a slash command and control feature-which, in turn, can automatically be leveraged by any further platform that incorporates a content editing frame, and/or otherwise integrates with the centralized content editing frame service 112 itself. In this example, slash commands facilitated by the editor service can be used to receive prompt instructions from users of either frontend. These prompts can be provided as input to a prompt engineering/prompt preconditioning service (such as the prompt management service 114) that, in turn, provides a modified user prompt as input to a generative engine service 116.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

In addition, a centralized content editing frame service 112 can be configured to provide suggested prompts to a user as the user types. For example, as a user begins typing a slash command in a frontend of some platform that has integrated with a centralized content editing frame service 112 as described herein, the centralized content editing frame service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the centralized content editing frame service 112 can be configured to suggest one or more prompts that can be provided as input to a generative output engine as described herein to perform a useful task, such as summarizing content rendered within the centralized content editing frame service 112, reformatting content rendered within the centralized content editing frame service 112, inserting cross-links within the centralized content editing frame service 112, and so on.

The ordering of the suggestion list and/or the content of the suggestion list may vary from user to user, user role to user role, and embodiment to embodiment. For example, when interacting with a documentation system, a user having a role of "developer" may be presented with prompts associated with tasks related to an issue tracking system and/or a code repository system.

Alternatively, when interacting with the same documentation system, a user having a role of "human resources professional" may be presented with prompts associated with manipulating or summarizing information presented in a directory system or a benefits system, instead of the issue tracking system or the code repository system.

More generally, in some embodiments described herein, a centralized content editing frame service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized content editing frame service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein reference systems and methods for sharing user interface elements rendered by a centralized content editing frame service 112 and features thereof (such as a slash command processor), between different software platforms in an authenticated and secure manner. For simplicity of description, the embodiments that follow reference a configuration in which a centralized content editing frame service is configured to implement a slash command feature—including slash command suggestions—but it may be appreciated that this is merely one example and other configurations and constructions are possible.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104*a*-104*c*, respectively.

As with many embodiments described herein, the first platform frontend can be configured to communicate with the first platform backend 108 and/or the centralized content editing frame service 112. Information can be transacted by and between the frontend, the first platform backend 108 and the centralized content editing frame service 112 in any suitable manner or form or format. In many embodiments, as noted above, the client device 104 and in particular the first platform frontend can be configured to send an authentication token 120 along with each request transmitted to any of the first platform backend 108 or the centralized content editing frame service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106*a*-106*c*, respectively.

As with many embodiments described herein, the second platform frontend can be configured to communicate with the second platform backend 110 and/or the centralized content editing frame service 112. Information can be transacted by and between the frontend, the second platform backend 110 and the centralized content editing frame service 112 in any suitable manner or form or format. In many embodiments, as noted above, the client device 106 and in particular the second platform frontend can be configured to send an authentication token 122 along with each request transmitted to any of the second platform backend 110 or the centralized content editing frame service 112.

As a result of these constructions, the centralized content editing frame service 112 can provide uniform feature sets to users of either the client device 104 or the client device 106. For example, the centralized content editing frame service 112 can implement a slash command processor to receive prompt input and/or preconfigured prompt selection provided by a user of the client device 104 to the first platform and/or to receive input provided by a different user of the client device 106 to the second platform.

As noted above, the centralized content editing frame service 112 ensures that common features, such as slash command handling, are available to frontends of different platforms. One such class of features provided by the centralized content editing frame service 112 invokes output of a generative output engine of a service such as the generative engine service 116.

For example, as noted above, the generative engine service 116 can be used to generate content, supplement content, and/or generate API requests or API request bodies that cause one or both of the first platform backend 108 or the second platform backend 110 to perform a task. In some cases, an API request generated at least in part by the generative engine service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized content editing frame service 112. The user input may include a prompt to be continued by the generative engine service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative engine service 116 as an input. More particularly, the prompt management service 114 is configured to structure an API request to the generative engine service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative engine service 116 should process the request; an output format or encryption identifier; and so on. One example of such an API request is a POST request to a Restful API endpoint served by the generative engine service 116. In other cases, the prompt management service 114 may transmit data and/or communicate data to the generative engine service 116 in another manner (e.g., referencing a text file at a shared file location, the text file including a prompt, referencing a prompt identifier, referencing a callback that can serve a prompt to the generative engine service 116, initiating a stream comprising a prompt, referencing an index in a queue including multiple prompts, and so on; many configurations are possible).

In response to receiving a modified prompt as input, the generative engine service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative engine service 116 can be provided to the centralized content editing frame service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative engine service 116, this is merely one example and that in other cases the generative engine service 116 can be communicably coupled to any of the client device 106, the client device 104, the first platform backend 108, the second platform backend 110, the centralized content editing frame service 112, or the prompt management service 114.

In some cases, output of the generative engine service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative engine service 116 to the frontend (e.g., rendered on the client device 104, as one example) so that a user of the client device 104 can approve the content before it is prepended to the document. In another example, output of the generative engine service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative engine service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative engine service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to $ {user} with a due date in the next 2 days." In this example, the token/field/variable $ {user} can be replaced with a user identifier corresponding to the user currently operating a client device.

This insertion of an unambiguous user identifier can be performed by the client device, the platform backend, the centralized content editing frame service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative engine service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "$ {user prompt}. Provide output of any table in the form of a tab delimited table formatted according to the markdown specification." In this example, the variable $ {user prompt} may be replaced with the user prompt such that the entire prompt received by the generative engine service 116 can include the user prompt and the example sentence describing how a table should be formatted.

In yet other embodiments, a suggestion may be generated by the generative engine service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative engine service 116 may generate a set of JSON objects that, when received by the Kanban platform, are rendered as a set of cards in a Kanban board, each card including a different title and description corresponding to different tasks that may be associated with steps for creating a new iced cream flavor. In this manner, the user can quickly be presented with an example set of initial tasks for a new project.

In yet other examples, suggestions can be configured to select or modify prompts that cause the generative engine service 116 to interact with multiple systems. For example, a suggestion in a documentation system may be to create a new document content section that summarizes a history of agent interactions in an ITSM system. In some cases, the generative engine service 116 can be called more than once (and/or it may be configured to generate its own follow-up prompts or prompt templates which can be populated with appropriate information and re-submitted to the generative engine service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108*a*.

Similarly, the second platform backend 110 may be instantiated over the resource allocations 110*a* (including processors, memory, storage, network communications systems, and so on). Likewise, the centralized content editing frame service 112 is supported by a processor and memory and network connection (and/or database connections) collectively represented for simplicity as the resource allocations 112*a*.

The prompt management service 114 can be supported by its own resources including processors, memory, network connections, displays (optionally), and the like represented in the figure as the resource allocations 114*a*.

In many cases, the generative engine service 116 may be an external system, instantiated over external and/or third-party hardware which may include processors, network connections, memory, databases, and the like. In some embodiments, the generative engine service 116 may be instantiated over physical hardware associated with the host servers 102. Regardless of the physical location at which (and/or the physical hardware over which) the generative engine service 116 is instantiated, the underlying physical hardware including processors, memory, storage, network connections, and the like are represented in the figure as the resource allocations 116*a*.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative engine service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Further to these foregoing embodiments, it may be appreciated that a user can provide input to a frontend of a system in a number of suitable ways, including by providing input as described above to a frame rendered with support of a centralized content editing frame service.

For example, FIGS. 2A-2B each depict example frontend interfaces that can interact with a system as described herein to receive prompts from a user that can be provided as input to a generative output engine as described herein.

In particular, FIG. 2A may represent a user interface of a documentation platform rendering a frame to receive user input from a user by leveraging a centralized editor service. The user interface 200*a* can be rendered by a client device 202 which may be a personal electronic device such as a laptop, desktop computer, tablet and the like. The client device 202 can include a display with an active display area 204 in which a user interface can be rendered. The user interface can be rendered by operation of an instance of a frontend application associated with a backend application that collectively define a software platform as described herein.

More particularly, as described above in reference to FIG. 1, a platform can be defined by communicably intercoupling one or more frontend instances with one or more backend instances. The backend instance of software can be instantiated over server hardware such as a processor, memory, storage, and network communications. The frontend application can be instantiated over physical hardware of a client device in network communication with the backend application instance. The frontend application can be a native application, a browser application, or other application type instantiated over hardware directly or indirectly, such as within an operating system environment.

FIG. 2A depicts the active display area 204 rendering a graphical user interface associated with a frontend of an example documentation system. The documentation system can communicably couple to a centralized content editing frame service to render an editor region 206 that can receive user input. The user input may be text, media, graphics, or the like.

In some cases, the user input may be provided when the frontend is operated in a command receptive mode. The command receptive mode can be triggered by the user typing a special character (e.g., a slash) or by the user pressing a button to indicate an intent to type a command. In the illustrated example, a user of the client device 202 has typed a forward slash followed by a partial input 208 of the word "intelligence." However, nearly any term or phrase or key symbol may be used.

Upon receiving and recognizing the slash command start, the frontend and/or the backend may cause to be rendered an overlay interface 210 that provides one or more suggestions to the user, each of which may be associated with a particular preconfigured prompt, templatized prompt, engineer templatized prompts, or other command and control affordances that may be interacted with by the user. For example, each suggestion rendered in the overlay interface 210 may be associated to particular prompt or sequence of prompts that may be provided to a generative output engine as described above.

Similarly, FIG. 2B may represent a user interface of an issue tracking system. As with the embodiment shown in FIG. 2A, the issue tracking system of FIG. 2B includes a user interface 200*b* rendered by a client device 202 on a display thereof. The display leverages an active display area 204 to render an editor region 206 that is configured to receive user input to describe a particular issue tracked by the issue tracking system. In this example, as with the preceding example, the user may type into the editor region 206 a partial input 208 that triggers rendering of an overlay interface 210 that provides different suggestions to the user, each of which may be associated with a particular prompt or function enabled by interaction with a trained LLM such as may be provided by a generative output engine as described herein.

These foregoing embodiments depicted in FIGS. 2A-2B and the various alternatives thereof and variations thereto are presented, generally, for purposes of explanation, and to facilitate an understanding of various configurations and constructions of a system and related user interfaces and methods of interacting with those interfaces, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that a common editor frame is only one method of providing input to, and receiving output from, a generative output engine as described herein.

Figure 3A:
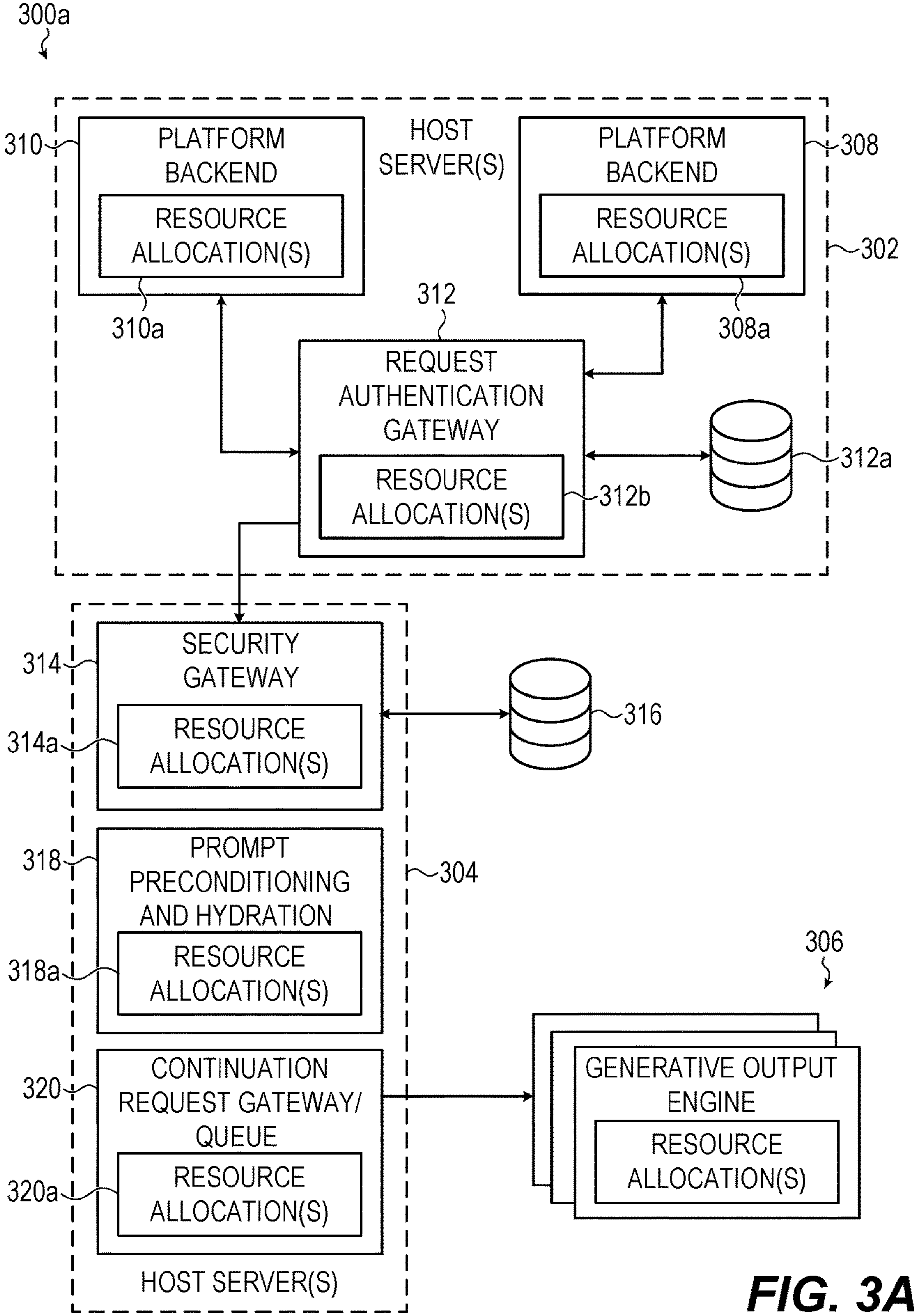
FIG. 3A depicts a simplified diagram of a system, such as described herein that can include and/or may receive input from a generative output engine.
Figure 3B:
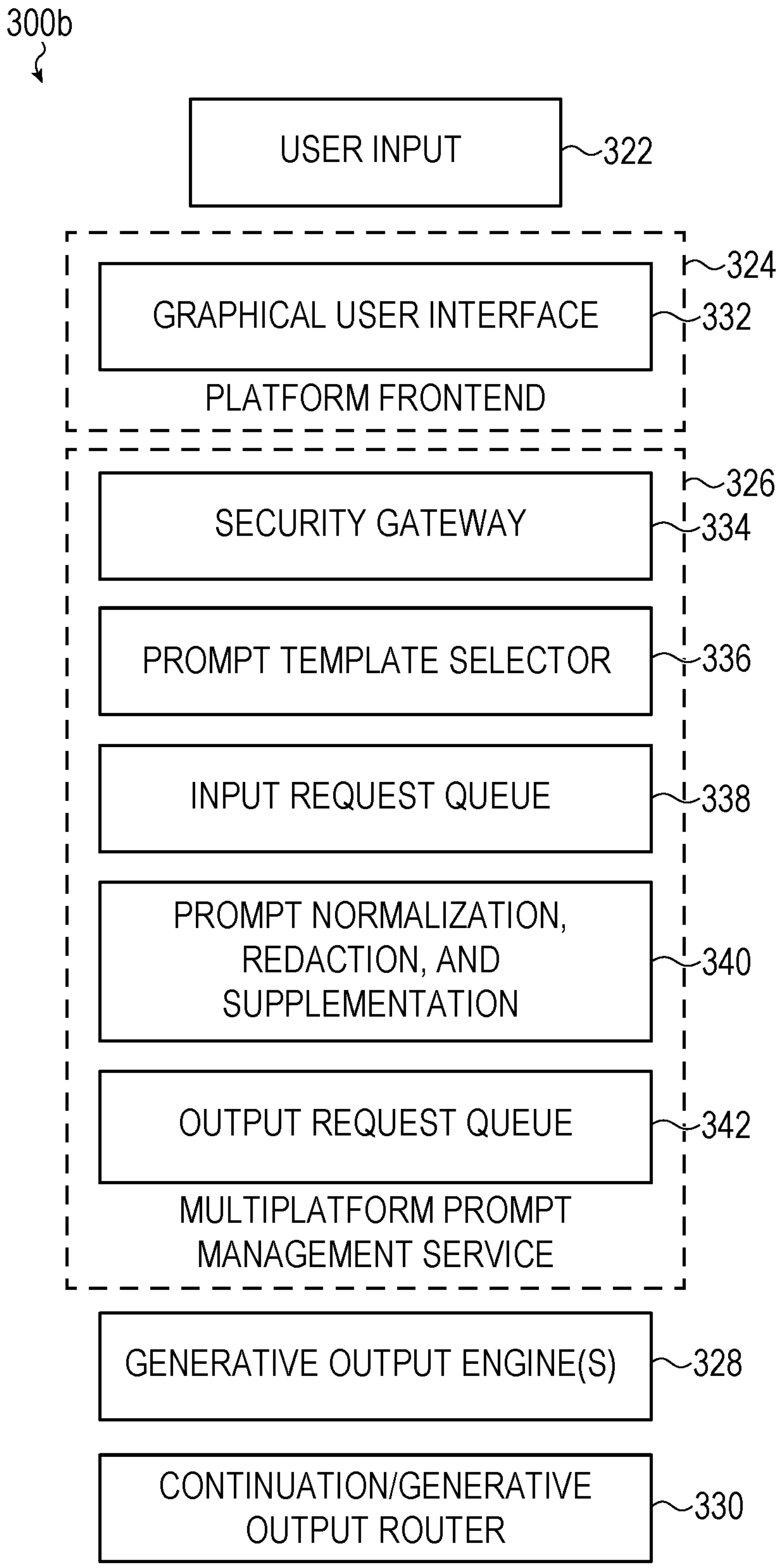
FIG. 3B depicts a functional system diagram of a system that can be used to implement a multiplatform prompt management service.

FIGS. 3A-3B depicts system diagrams and network/communication architectures that may support a system as described herein. Referring to FIG. 3A, the system 300*a* includes a first set of host servers 302 associated with one or more software platform backends. These software platform backends can be communicably coupled to a second set of host servers 304 purpose configured to process requests and responses to and from one or more generative output engines 306.

Specifically, the first set of host servers 302 (which, as described above can include processors, memory, storage, network communications, and any other suitable physical hardware cooperating to instantiate software) can allocate certain resources to instantiate a first and second platform backend, such as a first platform backend 308 and a second platform backend 310. Each of these respective backends can be instantiated by cooperation of processing and memory resources associated to each respective backend. As illustrated, such dedicated resources are identified as the resource allocations 308*a* and the resource allocations 310*a*.

Each of these platform backends can be communicably coupled to an authentication gateway 312 configured to verify, by querying a permissions table, directory service, or other authentication system (represented by the database 312*a*) whether a particular request for generative output from a particular user is authorized. Specifically, the second platform backend 310 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 312 can deny the request for insufficient permissions. This example is merely one and is not intended to be limiting; many possible authorization and authentication operations can be performed by the authentication gateway 312. The authentication gateway 312 may be supported by physical hardware resources, such as a processor and memory, represented by the resource allocations 312*b*.

Once the authentication gateway 312 determines that a request from a user of either platform is authorized to access data or resources implicated in service that request, the request may be passed to a security gateway 314, which may be a software instance supported by physical hardware identified in FIG. 3A as the resource allocations 314*a*. The security gateway 314 may be configured to determine whether the request itself conforms to one or more policies or rules (data and/or executable representations of which may be stored in a database 316) established by the organization. For example, the organization may prohibit executing prompts for offensive content, value-incompatible content, personally identifying information, health information, trade secret information, unreleased product information, secret project information, and the like. In other cases, a request may be denied by the security gateway 314 if the prompt requests beyond a threshold quantity of data.

Once a particular user-initiated prompt has been sufficiently authorized and cleared against organization-specific generative output rules, the request/prompt can be passed to a preconditioning and hydration service 318 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 318 can be a software instance supported by physical hardware represented by the resource allocations 318*a*. In some implementations, the hydration service 318 may also be used to rehydrate personally identifiable information (PII) or other potentially sensitive data that has been extracted from a request or data exchange in the system.

One a prompt has been modified, replaced, or hydrated by the preconditioning and hydration service 318, it may be passed to an output gateway 320 (also referred to as a continuation gateway or an output queue). The output gateway 320 may be responsible for enqueuing and/or ordering different requests from different users or different software platforms based on priority, time order, or other metrics. The output gateway 320 can also serve to meter requests to the generative output engines 306.

FIG. 3B depicts a functional system diagram of the system 300*a* depicted in FIG. 3A. In particular, the system 300*b* is configured to operate as a multiplatform prompt management service supporting and ordering requests from multiple users across multiple platforms. In particular, a user input 322 may be received at a platform frontend 324. The platform frontend 324 passes the input to a prompt management service 326 that formalizes a prompt suitable for input to a generative output engine 328, which in turn can provide its output to an output router 330 that may direct generative output to a suitable destination. For example, the output router 330 may execute API requests generated by the generative output engine 328, may submit text responses back to the platform frontend 324, may wrap a text output of the generative output engine 328 in an API request to update a backend of the platform associated with the platform frontend 324, or may perform other operations.

Specifically, the user input 322 (which may be an engagement with a button, typed text input, spoken input, chat box input, and the like) can be provided to a graphical user interface 332 of the platform frontend 324. The graphical user interface 332 can be communicably coupled to a security gateway 334 of the prompt management service 326 that may be configured to determine whether the user input 322 is authorized to execute and/or complies with organization-specific rules.

The security gateway 334 may provide output to a prompt selector 336 which can be configured to select a prompt template from a database of preconfigured prompts, templatized prompts, or engineered templatized prompts. Once the raw user input is transformed into a string prompt, the prompt may be provided as input to a request queue 338 that orders different user request for input from the generative output engine 328. Output of the request queue 338 can be provided as input to a prompt hydrator 340 configured to populate template fields, add context identifiers, supplement the prompt, and perform other normalization operations described herein. In other cases, the prompt hydrator 340 can be configured to segment a single prompt into multiple discrete requests, which may be interdependent or may be independent.

Thereafter, the modified prompt(s) can be provided as input to an output queue at 342 that may serve to meter inputs provided to the generative output engine 328.

These foregoing embodiments depicted in FIG. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 4A:
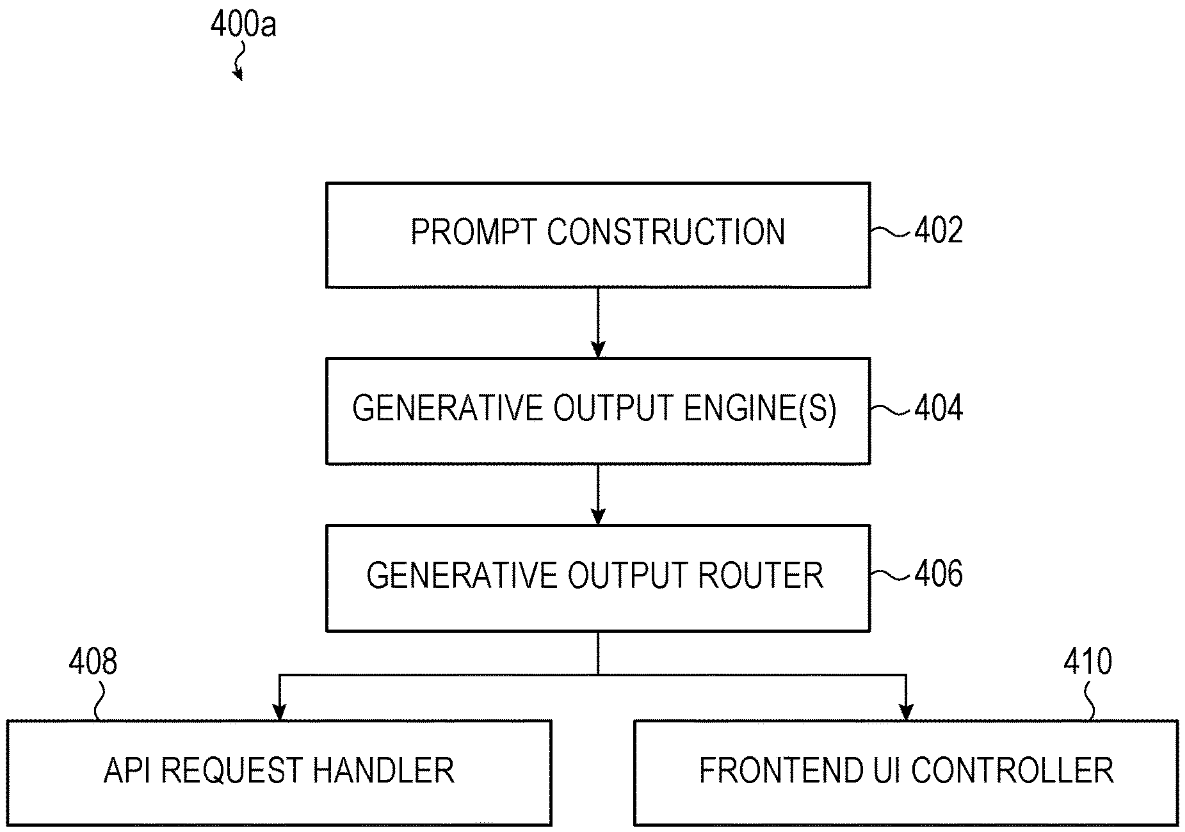
FIG. 4A depicts a simplified system diagram and data processing pipeline.

For example, although many constructions are possible, FIG. 4A depicts a simplified system diagram and data processing pipeline as described herein. The system 400*a* receives user input, and constructs a prompt therefrom at operation 402. After constructing a suitable prompt, and populating template fields, selecting appropriate instructions and examples for an LLM to continue, the modified constructed prompt is provided as input to a generative output engine 404. A continuation from the generative output engine 404 is provided as input to a router 406 configured to classify the output of the generative output engine 404 as being directed to one or more destinations. For example, the router 406 may determine that a particular generative output is an API request that should be executed against a particular API (e.g., such as an API of a system or platform as described herein). In this example, the router 406 may direct the output to an API request handler 408. In another example, the router 406 may determine that the generative output may be suitably directed to a graphical user interface/frontend. For example, a generative output may include suggestions to be shown to a user below a user's partial input, such as shown in FIGS. 2A-2B.

Figure 4B:
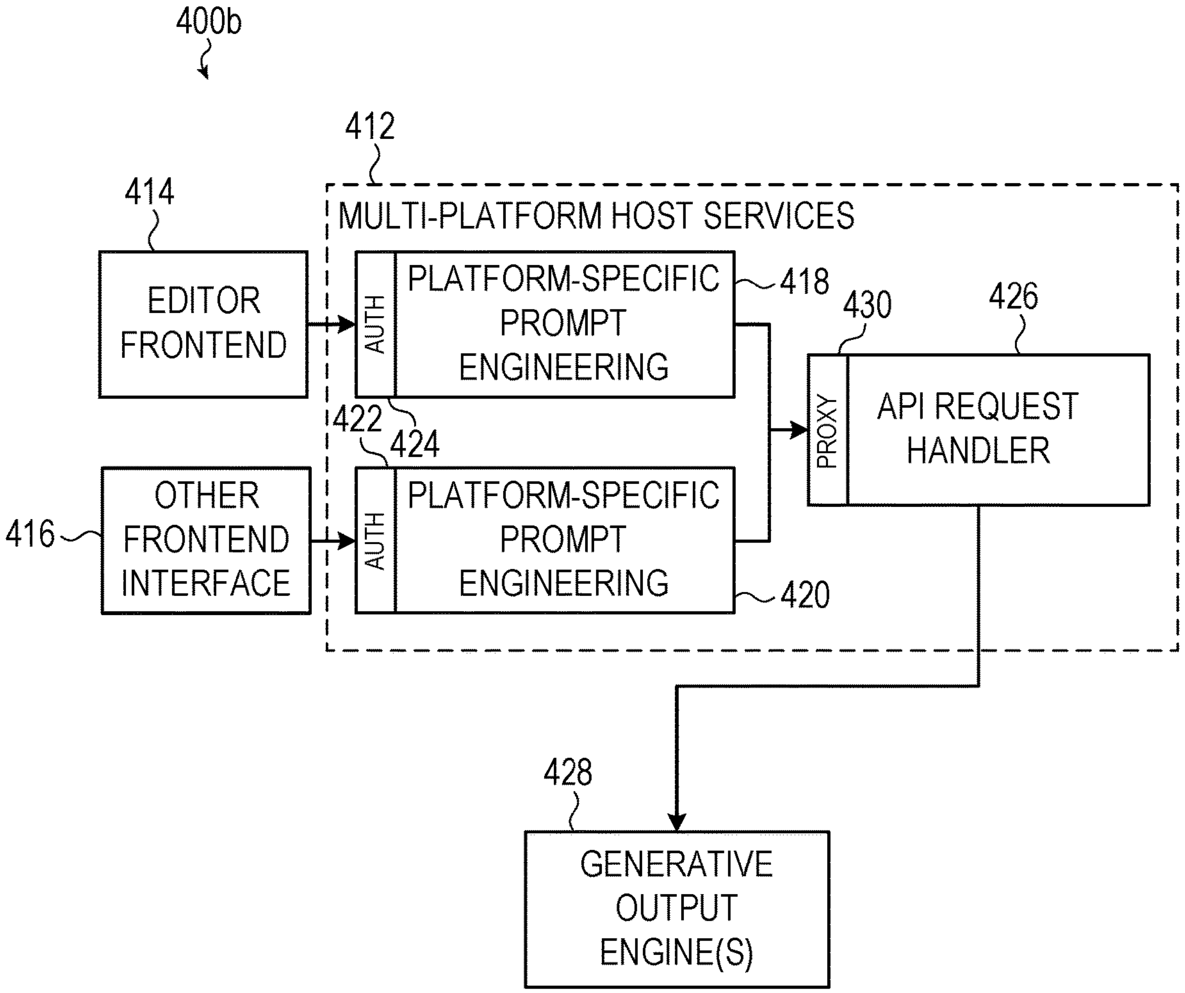
FIG. 4B depicts a system providing multiplatform prompt management as a service.

Another example architecture is shown in FIG. 4B, illustrating a system providing prompt management, and in particular multiplatform prompt management as a service. The system 400*b* is instantiated over cloud resources, which may be provisioned from a pool of resources in one or more locations (e.g., datacenters). In the illustrated embodiment, the provisioned resources are identified as the multi-platform host services 412.

The multi-platform host services 412 can receive input from one or more users in a variety of ways. For example, some users may provide input via an editor region 414 of a frontend, such as described above. Other users may provide input by engaging with other user interface elements 416 unrelated to common or shared features across multiple platforms. Specifically, the second user may provide input to the multi-platform host services 412 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 412 can include multiple software instances or microservices each configured to receive user inputs and/or proposed prompts and configured to provide, as output, an engineered prompt. In many cases, these instances—shown in the figure as the platform-specific prompt engineering services 418, 420—can be configured to wrap proposed prompts within engineered prompts retrieved from a database such as described above.

In many cases, the platform-specific prompt engineering services 418, 420 can be each configured to authenticate requests received from various sources. In other cases, requests from editor regions or other user interface elements of particular frontends can be first received by one or more authenticator instances, such as the authentication instances 422, 424. In other cases, a single centralized authentication service can provide authentication as a service to each request before it is forwarded to the platform-specific prompt engineering services 418, 420.

Once a prompt has been engineered/supplemented by one of the platform-specific prompt engineering services 418, 420, it may be passed to a request queue/API request handler 426 configured to generate an API request directed to a generative output engine 430 including appropriate API tokens and the engineered prompt as a portion of the body of the API request. In some cases, a service proxy 430 can interpose the platform-specific prompt engineering services 418, 420 and the request queue/API request handler 426, so as to further modify or validate prompts prior to wrapping those prompts in an API call to the generative output engine 428 by the request queue/API request handler 426 although this is not required of all embodiments.

These foregoing embodiments depicted in FIG. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output once a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Documentation Platforms & Shared Editors

FIGS. 5-11 are directed to example graphical user interfaces that demonstrate functionality of an editor and content viewer of a collaboration platform, as described herein. As described previously, a collaboration platform may include or be integrated with a content-creation and modification service that can be used to create, edit, or adapt content for use with the collaboration system. The content-creation and modification service may be operably coupled to or include a language model platform, as described herein, which may be used to automatically generate content in response to text-based prompts. As described in more detail below, the content creation and modification service may be used to (1) summarize existing user-generated content. (2) automatically edit or modify existing-user generated content to adjust for content length, content tone, or other content qualities, and (3) generate new user-generated content based on user-provided prompt or input. The content creation and modification service may also be adapted to pull content from other platforms, utilize user graphs, utilize project graphs, or utilize other cross-platform data in order to perform the various functions described herein.

As described herein, a collaboration platform or service may include an editor that is configured to receive user input and generate user-generated content that is saved as a content item. The terms "collaboration platform" or "collaboration service" may be used to refer to a documentation platform or service configured to manage electronic documents or pages created by the system users, an issue tracking platform or service that is configured to manage or track issues or tickets in accordance with an issue or ticket workflow, a source-code management platform or service that is configured to manage source code and other aspects of a software product, a manufacturing resource planning platform or service configured to manage inventory, purchases, sales activity or other aspects of a company or enterprise. The examples provided herein are described with respect to an editor that is integrated with the collaboration platform. In some instances, the functionality described herein may be adapted to multiple platforms or adapted for cross-platform use through the use of a common or unitary editor service. For example, the functionality described in each example is provided with respect to a particular collaboration platform, but the same or similar functionality can be extended to other platforms by using the same editor service. Also, as described above a set of host services or platforms may be accessed through a common gateway or using a common authentication scheme, which may allow a user to transition between platforms and access platform-specific content without having to enter user credentials for each platform.

Figure 5:
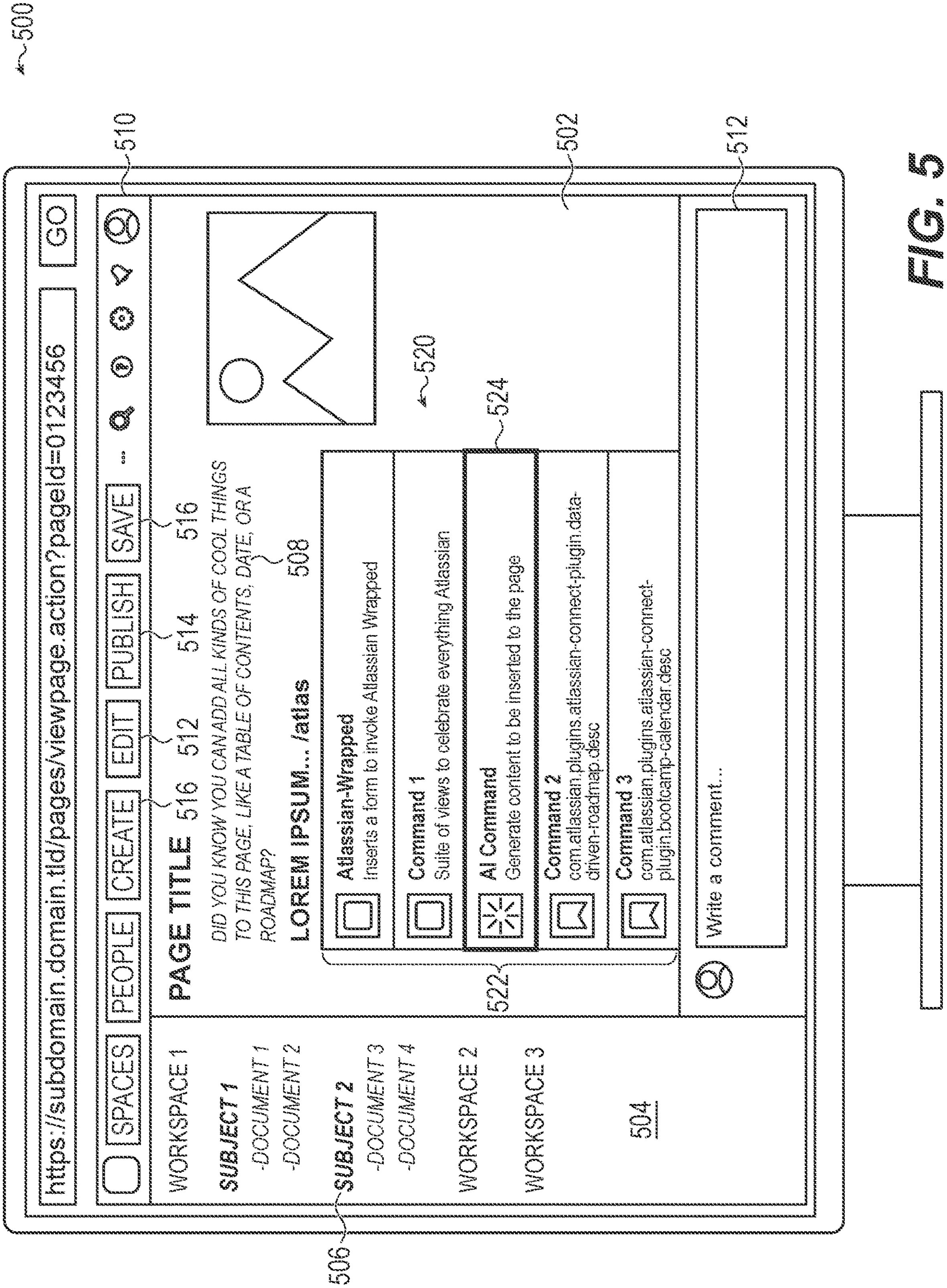
FIG. 5 depicts an example graphical user interface of a frontend of a collaboration platform.

FIG. 5 depicts an example graphical user interface of a frontend of a collaboration platform. The graphical user interface 500 may be provided by a client application operating on a client device that is operably coupled to a backend of the collaboration platform using a computer network. The client application may be a dedicated client application or may be a browser application that accesses the backend of the collaboration platform using a web-based protocol. As described herein, the client application may operate a frontend of the collaboration platform and is operably coupled to a backend of the collaboration platform operating on a server. The following example includes a content creation and modification service that is integrated with the client application or is invoked using the client application in order to provide the functionality described herein. In the following example, the collaboration platform is a documentation platform configured to manage content items like user-generated pages or electronic documents.

As shown in FIG. 5, the graphical user interface 500 includes an editor region 502 that includes user-generated content of the content item. The user-generated content may include text, images, audio and video clips, and other multi-media content. The user may transition the graphical user interface 500 into an editor mode by selecting the edit control 512 on the control bar 510. In the editor mode, the region 502 operates as an editor region and receives user input including text input from a keyboard, object insertions for images and other media, creation of embedded content, comments, labels, tags, and other electronic content. The user may transition the graphical user interface 500 into a content viewer mode by selecting the publish control 514 on the control bar 510. User selection of the publish control 514 may cause the content of the page or electronic document to be saved on the collaboration platform backend and the page or electronic document may be accessible to other users of the system having been authenticated and having a permissions profile that is consistent with a permissions profile of the page or electronic document. The user-generated content may be saved in accordance with a platform-specific markup language schema. An example of a platform-specific markup language schema is an Atlassian Document Format (ADF). The term platform-specific schema may be used to refer to a schema that is generally used with a particular platform but may also be used on other platforms having a similar rendering engine or editor functionality and may not be restricted to solely one platform.

As shown in the example of FIG. 5, the graphical user interface 500 includes an editor region 502 that is configured to interpret text commands when designated by a special character or set of characters. In the present example, when a designated character (e.g., a forward slash) is entered, the editor invokes a content creation and modification service, also referred to herein as an "editor assistant service," "prompt constructor," or "prompt management service." As described previously, the prompt constructor may interface with a generative output engine in order to provide suggested content or modifications that can be implemented directly in the editor or other aspects of the graphical user interface. In the present example, the designated character causes display of a command selection interface window 520 positioned at least partially over the editor region 502. The command selection interface window 520 is a floating window interface element or object and may overlap or overlay user generated content 508 of the electronic document or page. The command selection interface window 520 includes a set of command controls 522 (also referred to herein as "content-assistant controls" or simply "controls"). Each of the command controls 522 may correspond to a respective content modification action that can be performed by the editor assistant service. Content modification actions include actions that can be performed by the editor assistant service or prompt constructor including, for example, content summary actions, content creation actions, tone or voice modification actions, length modification actions, brainstorm actions, decision summary actions, task or action item actions, and other example actions consistent with the examples described herein.

In response to a user selection of a particular command control 524, a sequence of user-interface actions may be initiated, which may guide the user in providing user input for the corresponding content modification action. FIGS. 6A-7B depict example user-interface functionality that may be initiated through the selection of a particular command control 524. While the following examples are described as being triggered or initiated through a command selecting interface window 520 and selection of a particular command control 524, in other implementations, the same or similar functionality may result from a single selection of a control within the graphical user interface or may be automatically triggered as a result of a command 522 entered following the designated character 508.

The graphical user interface 500 of the present example may correspond to the frontend of a documentation platform, which may be configured to manage or host user-generated electronic documents or pages. As shown in the example of FIG. 5, the graphical user interface 500 includes various features to facilitate the editing and viewing of electronic documents or pages. Specifically, as shown in FIG. 5, the graphical user interface includes a navigational region 504 that includes a hierarchical navigational tree of elements 506, also referred to herein as a hierarchical navigational tree, a navigational tree, a page tree, or other similar term. Each element of the hierarchical navigational tree is selectable to cause display of corresponding page or document content of the page or document associated with the selected element. The hierarchical navigational tree of elements 506 may indicate parent-child relationships between documents or pages in a document space. Each document space may have a unique or distinct set of documents or pages, each related to each other, as indicated by indentations or other visual indicia in the hierarchical navigational tree of elements 506. The navigational region 504 may also include other selectable elements including, for example, calendar elements, blog entry elements, analytics, document space home page elements, and other items that are selectable to cause corresponding content to be displayed in the editor region/content region 502.

The graphical user interface 500 also includes a control bar 510, which may be used to provide other functionality for the frontend application. For example, the control bar 510 may include various controls 516 for changing document spaces ("SPACES"), viewing document spaces associated with particular users ("PEOPLE"), creating new documents or pages ("CREATE") or other similar controls. In the example of FIG. 5, the control bar 510 also includes an edit control 512 causes the region 502 to transition from a viewer or content region to an editor or editor region. In a typical implementation, the user must be an authenticated user having a permissions profile that is consistent with an edit permission associated with the respective electronic document or page. If the user is not authenticated or is authenticated and does not have a permissions profile that allows edit permissions with respect to the currently displayed electronic document or page, the edit control 512 is rendered inoperable or, in some cases, display of the edit control 512 is suppressed from the graphical user interface 500. In response to the edit control 512 being selected by an authenticated user having the appropriate permissions, the region 502 transitions to an editor region, which is configured to receive user input including, for example, text input provided by a keyboard, images, video or audio clips, links, selectable link objects, and other content that is generated by the user or otherwise provided by the user, which may be considered user-generated content with respect to document editing activities. The content may be saved periodically and/or may be saved in response to a save control 516 on the graphical user interface. The control bar 510 also includes a publish control 514 that is selectable to cause the document content to be saved and published on the documentation platform. As discussed previously, a published document or page may be viewable by other authenticated system users having a permissions profile consistent with at least a view permission associated with the respective document or page.

The graphical user interface 500 may also have other regions or fields that are configured to receive user-generated content. For example, the graphical user interface 500 may include a comments region 512 in which users may add comments, which may be viewed in conjunction with the corresponding document or page. Comments may be entered by system users who may not otherwise have edit permissions with respect to the respective document or page. Similarly, the graphical user interface 500 may allow for in-line comments, which may be inserted within the document content, as viewed in the region 502 and may be expanded in a region at the periphery of the region 502 or in a separate in-line comment region. The functionality described herein with respect to the editor or an editor region may also be applied to these other regions and other types of user-generated content and the examples provided herein are not limited to a document editor or document content creation or modification functionality.

FIGS. 6A-8 depict example excerpts of a graphical user interface of a collaboration platform. Specifically, the sequence of figures depict example functionality that may be accomplished using an editor assistant service or prompt constructor in conjunction with a generative output engine. The following examples may occur in the context of a frontend of a collaboration platform, similar to the example of FIG. 5. A depiction of duplicative functionality has been omitted from some of the figures to reduce redundancy.

Figure 6A:
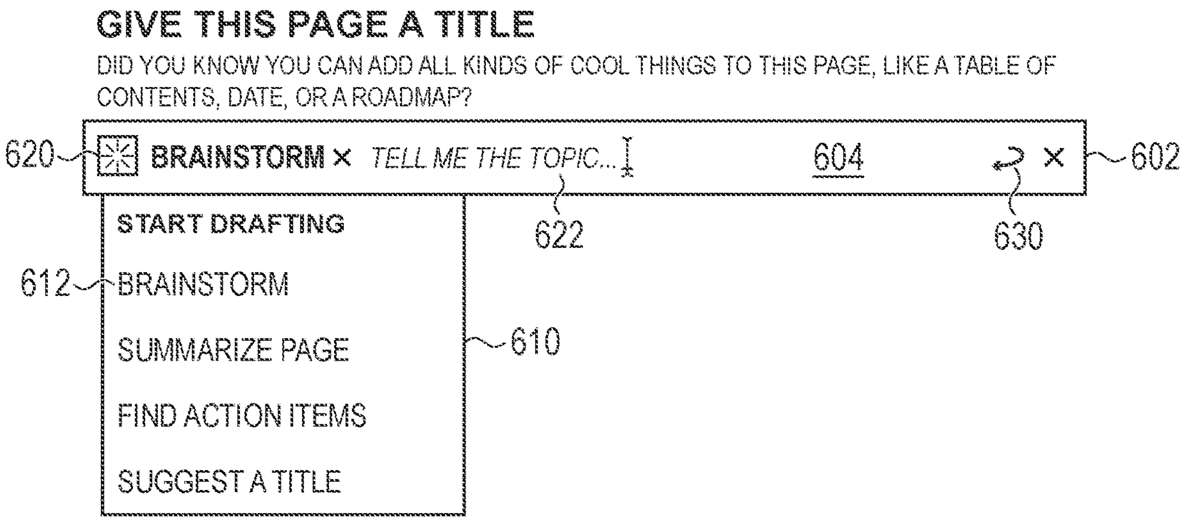
FIGS. 6A-6B depicts an example result of invocation of an editor assistant service that can be used create or modify content in an editor region of a graphical user interface.

FIG. 6A depicts an example result of invocation of the editor assistant service that can be used create or modify content in an editor region of a graphical user interface. The editor assistant service may be invoked using a designated character or character sequence (e.g., a slash command of FIG. 5) or make be invoked using another control or user interface element. As shown in FIG. 6A, the editor assistant service may cause display of a command prompt interface 602, which may replace an in-line command character or character sequence entered into the editor region.

As shown in FIG. 6A, the command prompt interface 602 includes a user input region 604 which is configured to receive user input. The user input region 604 may receive user-entered text, which may specify a content modification action, prompt text, or source of content to be analyzed or modified. In the example of FIG. 6A, the user input is facilitated by a series of menus and selectable elements that help guide the user in constructing the user-prompt input. For example, as shown in FIG. 6A, a command selection interface window 610 may be displayed including a list of command controls 612, also referred to herein as content-assistant controls. Each command control 612, or at least some of the command controls, are associated with a content modification action, which may be partially described or indicated in the respective command controls 612. Example content modification actions include, but are not limited to, a brainstorm action, a summarize content action, find action item action, suggest a title action, change tone action, content length modification action, improve writing, summarize topics, identify action items or tasks, identify decisions, or perform other actions.

In response to a user selection of a command control 612, user input is provided in the user input region 604 of the command prompt interface 602. In some cases, selection of the command control 612 causes text to be automatically entered into the user input region 604. In the example of FIG. 6A, selection of the command control 612 causes a graphical object 620 to be entered into the user input region 604. The graphical object 620 may represent a placeholder for a larger text string or command that may be expanded when the prompt is generated for the generative output engine. In some cases, the graphical object 620 may serve as a label or identifier used to select predefined query prompt text when generating the prompt for the generative output engine. In general, the predefined query prompt text is configured to implement or trigger the corresponding content modification action when provided to the generative output engine. For example, a selection of the "brainstorm" command control may insert a corresponding graphical object 620 in the user input region 604, which may be used to select predefined query prompt text associated with a brainstorm content modification action.

Figure 7A:
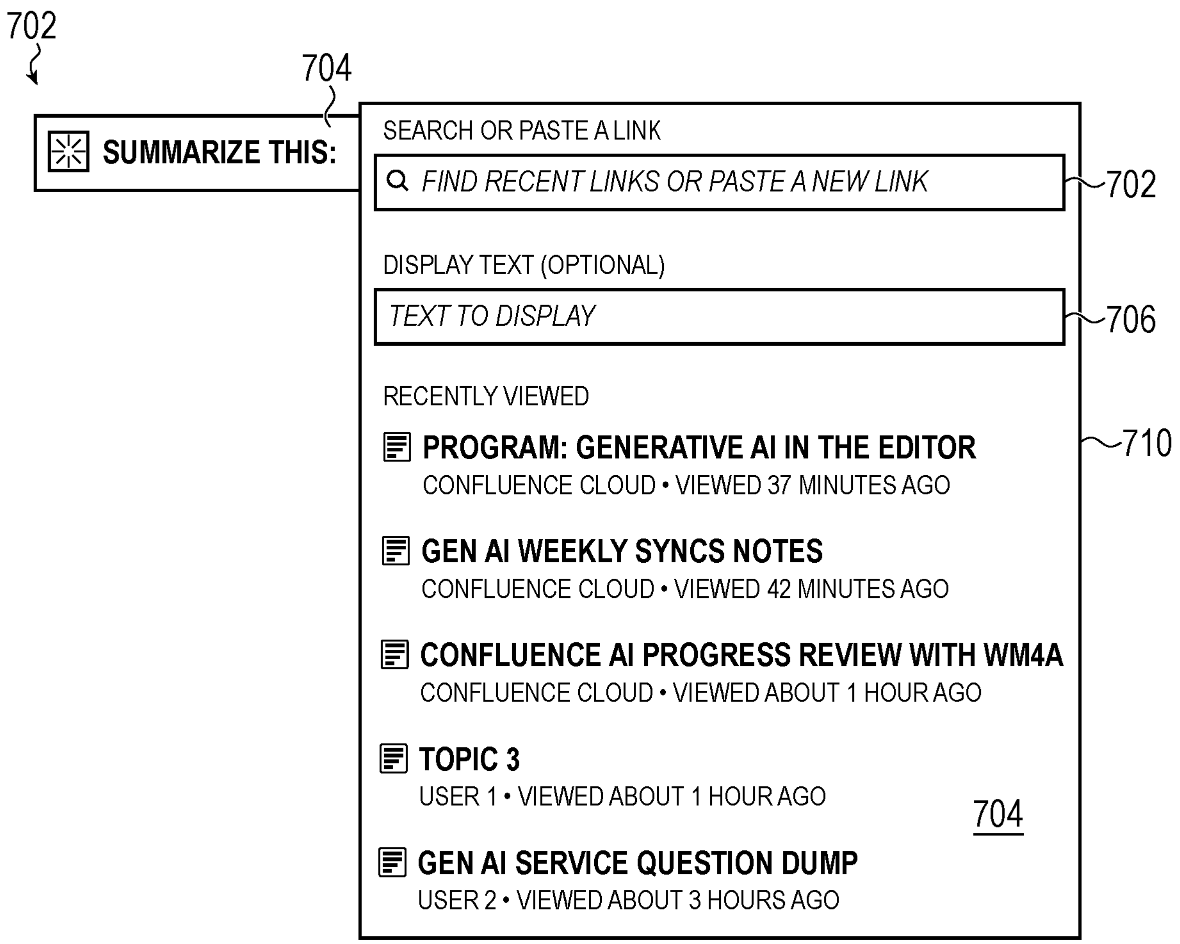

In addition to insertion of graphical object 620 or other auto-populated user input as a result of a user selection of the command control 612, the user may provide further user input that may be used to supplement or replace the action indicated by the graphical object 620. For example, the additional user input may specify a format for the output or a further instruction (e.g., insert in table, sorted alphabetically). In the present example, the additional user input provides a topic for the brainstorm action to be performed. The additional user input may also specify an object to be acted on or to be a subject of the action. The additional user input may include a text string to be analyzed or a pointer or link to content to be used as part of the proposed action. FIG. 7A, for example, depicts an interface for creating a link object by selecting from a list of content items identified using a search tool. The additional user input may also include selected text within the graphical user interface, which may be provided by the user through a cursor drag gesture, but may not be expressly copied or identified within the user input region 604 of the command prompt interface 602. Examples of selected text being used for a proposed action is provided in FIGS. 10A-10B, described in more detail below.

In response to a user input indicating the completion of the user prompt input entered into the input region 604, a prompt is generated and provided to a generative output engine. For example, as shown in FIG. 6A, the user may indicate that the user prompt input is complete by selecting the return control 630 or by pressing the "return" key on a keyboard. In response to the completion command, a prompt may be generated including predefined query prompt text and at least a portion of the user prompt input provided to the input region 604 or the command prompt interface 602. In general, the predefined query prompt text may be selected or generated in accordance with the proposed action (e.g., the selected command control or other indication of a content modification action). The predefined query prompt text may include a request, example formatting or schema examples, example input-output pairs, instructions regarding what not to include in a response, or context for the requested action. Various examples of predefined query prompt text are provided throughout the specification.

The generated prompt may then be provided to an external (or integrated) generative output engine. The prompt may be provided as part of an API call, which may include the transmission of the prompt in a JSON object, text file, or other structured data format. In response, the generative output engine may provide a generative output or generative response, which is used to generate content for insertion into the electronic document or page.

As with other embodiments described herein, the user prompt input can be modified, corrected, supplemented and/or inserted into an engineered prompt as described above. Any suitable system or instance can operate to determine whether modification to the user prompt input is required.

Figure 6B:
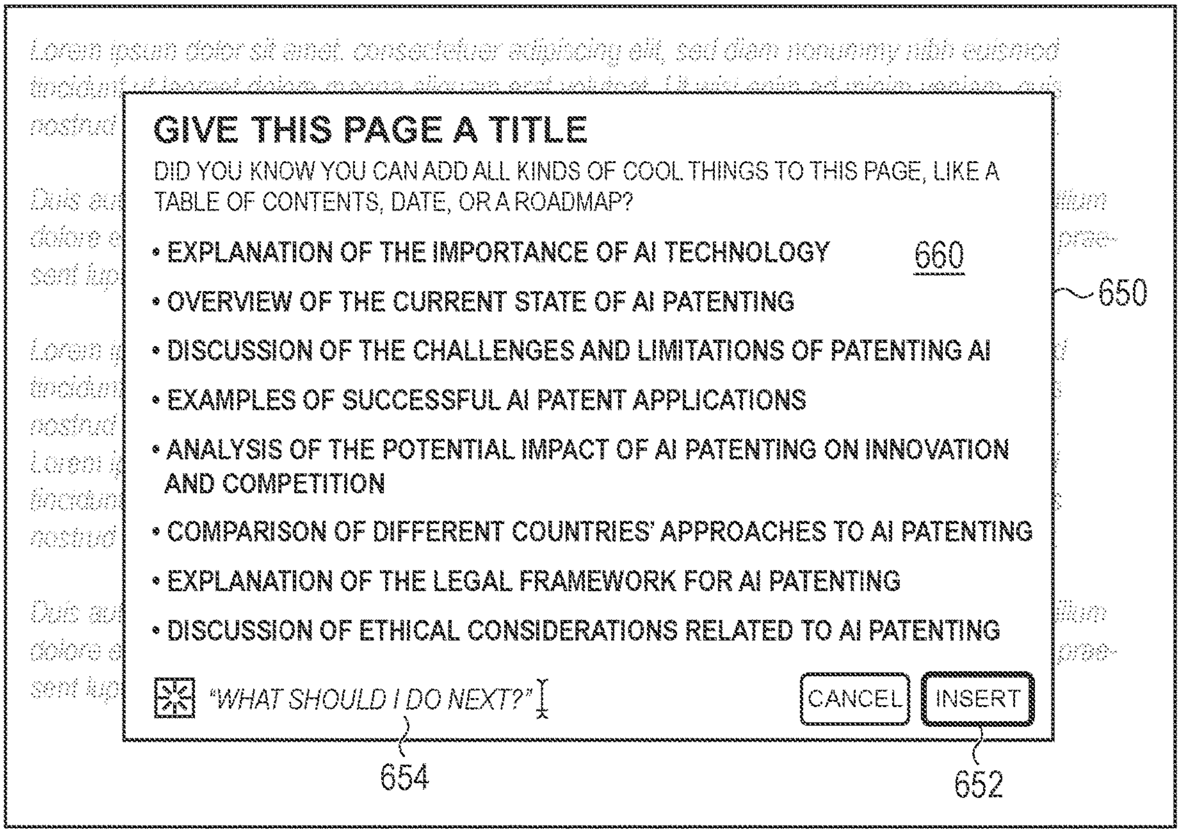

FIG. 6B depicts an example generative response 660 that is displayed in a preview window 650. In the present example, the generative response 660 includes a list of brainstorming topics or items that are generated in response to the "brainstorming" action and a proposed topic provided in the command prompt interface 602. The user may edit or delete portions of the content displayed in the preview window 650 and, using controls 652, may insert the content into the current electronic document via the editor region, underlying the preview window 650. In some cases, the controls 652 include controls for inserting the content into a user-selected document, insert the content into a newly created document, copy the content to a clipboard, or direct the content into another aspect of the collaboration platform.

The generative response 660 may be used as a basis for further prompts and further generative responses. For example, as shown in FIG. 6B, the preview window 650 may include an input region 654 that is configured to receive additional user commands or instructions for further refining the generative response 600. For example, the user may provide an instruction to summarize the response, expand on a subtopic, or otherwise use the generative response 600 as input to a further prompt to be sent to a generative output engine. As a result, at least a portion of the generative response 600 may be used as part of a subsequent prompt resulting in a modified or second generative response. This can be continued until the response provided in the preview window 650 accomplishes the desired task.

As described previously, link objects may be created and provided to the command prompt interface in order to indicate which content is to be subject to the content modification action or other processing by the generative output engine. FIGS. 7A-7B depict an example user interface that guides the user through a link object creation for use with a command prompt interface. The user interface of FIGS. 7A-7B can be used to select content items within the same collaboration platform, a separated distinct collaboration platform, or a third-party content provider.

As shown in FIG. 7A, a command prompt interface 702 may be displayed overlaying a portion of an editor region, similar to the examples discussed above, the command prompt interface 702 includes a user input region 704 and may have similar functionality as described above with respect to the previous examples. A user may create a link object for use by the editor assistant service by selecting a control or typing a designated character or command into the user input region 704. In response to a user input, the system may cause display of an object selection interface 710. The object selection interface 710 includes an input region 702 for receiving user search terms or other input that may be used to identify content items. The object selection interface 710 also includes a results region 704, which may display a list of selectable elements, each element associated with a content item that was identified using user input provided to the input region 702. In some cases, the results region 704 displays recently selected, recently viewed content items, or another curated list of content items predicted to be relevant to the object link creation process. The object selection interface 710 also includes other regions 706 and controls that may be used to configure how the object is to be displayed or used. For example, the link object may be renamed or the region 706 may be used to designate a particular portion or aspect of the object to be used for the linked content. In some implementations, multiple tabs or other selectable area may be used to toggle between different content providers. The list of content providers may be determined by a registry of validated content providers that have registered with the service and are able to provide access to remotely hosted content items based on a user credential, token, or other authenticating element, which may be authenticated in advance of the object search process using a single-sign-on or other authentication scheme. In response to a user selection of a particular element displayed in the results region 704, a link object may be created and positioned within the user input region 704.

FIG. 7B depicts a command prompt interface 702 having a link object 720 positioned in the user input region 704. In the present example, the link object 720 includes a link or path designating a location or endpoint at which the electronic document can be accessed. The link object 720 includes a graphical element or icon that represents the type of object that is linked and a text descriptor, which may be obtained from the linked object or may be expressly entered using the object selection interface 710 of FIG. 7A.

In response to a user input indicating that the prompt is complete, the editor assistant service or related service may access the linked content item using the path of the link object 720 and obtain content from the linked content item. In some cases, text is extracted from the linked content item. In other cases, formatting, markup tags, and non-text objects are also obtained from the linked content item. The remote content item may be an electronic document, page, issue, or other digital object accessible via a link or path. In some cases, the content item is another page or electronic document that is native to the current collaboration platform or may even be associated with the current document space. Some or all of the extracted content may be used in the prompt, which is ultimately provided to the generative output engine.

As shown in FIG. 7B, in response to a prompt, including the content extracted from the linked content item, is used to generate a generative response using the generative output engine, consistent with many of the examples described herein. The generative response 740 is displayed in the preview window 730 and may be inserted in the current document, copied to a clipboard, or inserted into other content using one or more controls (e.g., control 732).

Figure 8:
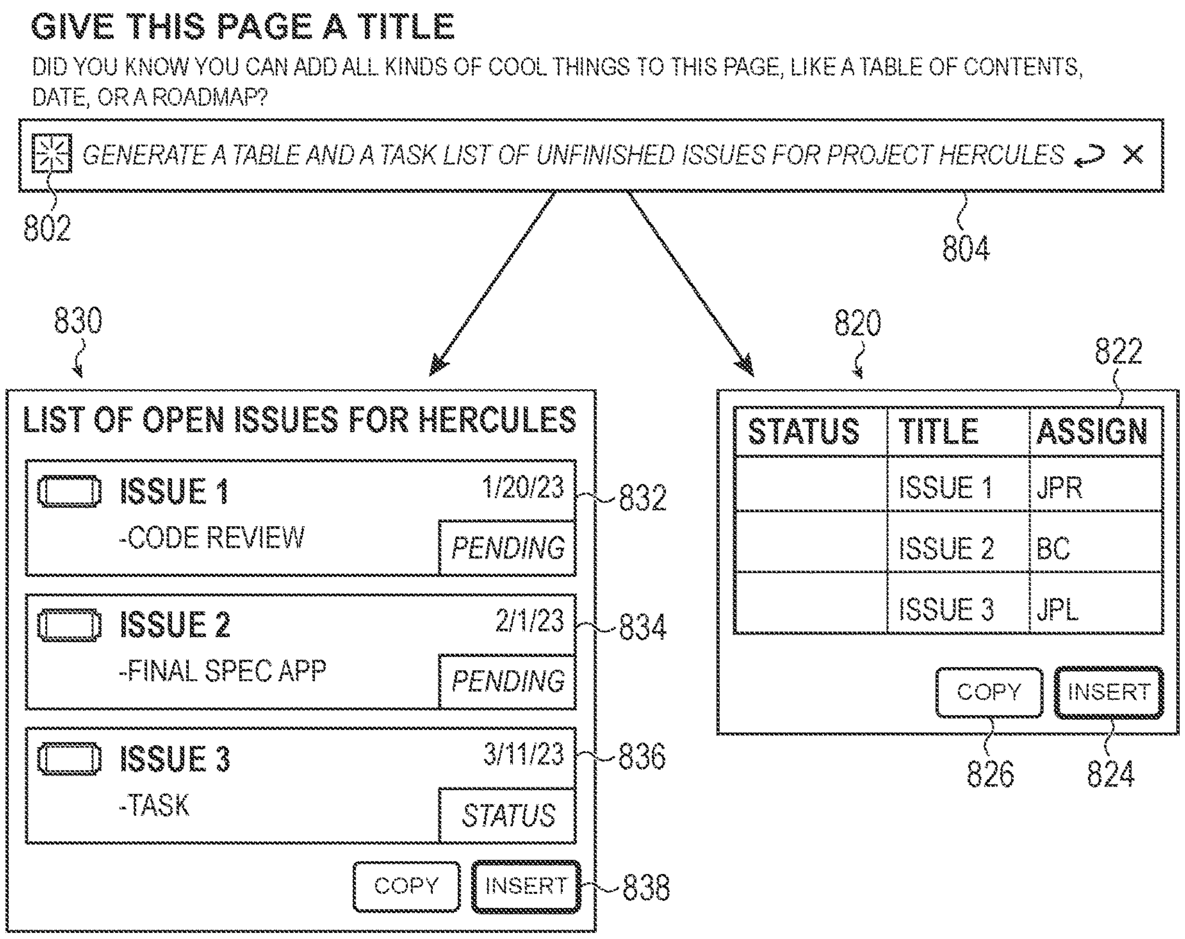
FIG. 8 depicts another example of an editor assistant service and command prompt interface in an editor of a collaboration platform.

FIG. 8 depicts another example use of an editor assistant service and command prompt interface in an editor of a collaboration platform. Similar to other user interface examples, the editor and surrounding context has been omitted from the example in order to reduce redundancy. Also similar to previous examples, and omitted to reduce redundancy, a command prompt interface 802 may be created using a command line input or other similar technique to invoke or initiate the editor assistant service. Also similar to previous examples, the user input provided to the user input region 804 is used to generate a prompt, which is transmitted to and processed by a generative output engine. In this example, the response or generative output includes formatting instructions for the text, which may include instructions to create a table, bulleted list, or other specifically formatted content. The response or generative output may also include embedded commands or calls to retrieve content for the generative action. Furthermore, the example of FIG. 8 illustrates how processing can be performed on the user input provide to the command prompt interface 802 in order to generate the prompt for processing by the generative output engine.

In the example of FIG. 8, the user input provided to the command prompt interface 802 includes reference to a project name ("Project Hercules"). The editor assistant service or other similar service may process the user input before or while generating the prompt for processing by the generative output engine. For example, the editor assistant service may parse the input text to screen for proper names, key words, and other grammatical content that indicates the user input is referencing a particular user, object, or grouping of objects. Triggering words or phrases may include "my," "project." "team," "standup," "weekly meeting." "recent," "last week" or the use of capitalized or proper nouns. In this example, the editor assistant service parses the user input and recognizes the term "Hercules," which is a proper noun and used in conjunction with a triggering word "project." In response, the editor assistant service may substitute the text of the user input with a link or identifier to a platform that is predicted to contain content related to the named project. In this example, the editor assistant service identifies an external issue tracking platform (example other collaboration platform), which includes issues and other content associated with the named project. When constructing the prompt, the system may either provide a link (if the content is able to be accessed by the generative output engine) or may retrieve content from the source and add the retrieved content to the prompt for processing. As shown in the example of FIG. 8, both the generated table of preview window 820 and the list of selectable object links of window 830 relate to content (e.g., issues) that are hosted on or provided by the issue tracking platform or system.

As mentioned previously, the prompt that is generated in response to the command prompt interface 802 may include links to respective content or may include content that has been extracted and inserted into the prompt. In another example, the prompt may include an embedded command or API call to the other platform or system hosting the data. The embedded command or API call may be processed by the generative output engine or may be processed in advance of providing the prompt to the generative output engine.

An embedded command can be explicit or implicit. For example, an explicit command may be a HTTP request, TCP request, and the like. In other cases, an explicit command may be a command word or phrase associated with a specific action in the target platform. In other cases, a command may be implicit. An implicit command may be a word or phrase that is associated with a particular operation in the target platform, such as "create new document in document platform" or "create new task in task platform." These commands may be executed prior to and/or in parallel with remaining portions of prompts provided as input to a generative output engine. In other cases, an embedded call may be expressly performed before any call to a generative output engine is made. For example, an explicit or implicit command may be a field identifier, such as "${task(id=123).name.asString()}" that requires a request to retrieve a name attribute of a specified task, cast as a string. This command may be executed before, and the response from it may be replaced within, a prompt submitted to a generative output engine.

As shown in FIG. 8, the generative response may be formatted in accordance with predefined text of the prompt. In the example depicted in the preview window 820, the generative output is formatted in a table format that may be in an editor-specific format or object type. Further, the content inserted in the table 822 may be content generated by the generative output engine using data extracted from the issue tracking platform or other platform associated with the named project in the user input. The generative output engine may provide the formatting or may provide the response in a format that can be interpreted by and converted using the editor assistant service. In one example, the predefined prompt query text includes example input output pairs that instruct the generative output engine to provide the response or output in accordance with a particular schema. For example, the predefined prompt query text may request the content in a comma or other character delineated format. In some cases, the predefined prompt query text requests that the output be formatted in a markdown format. The output formatted in accordance with the requested schema may then be transformed or converted into a format or schema consistent with the editor of the current collaboration platform.

In the example depicted in the preview window 830, the generative output may be displayed as a list of selectable object links 832, 834, 836, each selectable object link having content extracted from the respective source platform (e.g., the issue tracking platform). Additionally, the selectable object links 832, 834, 836 may include content generated by the generative output engine. For example, the generative output engine may be used to generate a title, summary, or bulleted action for each selectable object links. The selectable object links may also include embedded content (e.g., graphics or other content) obtained from the respective source platform and each object link may be selectable to cause redirection to the respective item or object on the respective source platform.

Similar to the table example, the generative output engine may be instructed on the editor-specific format or schema used to define the selectable object links in the editor of the current collaboration platform. In other implementations, the editor assistant service may transform or convert the generative response into the editor-specific format or schema in response to the generative output engine providing the content in accordance with a schema instructed in the predefined query prompt text.

Similar to the previous examples, each of the preview windows 820 and 830 may include controls for inserting the response content into the editor, copying the content into a clipboard, or directing the content to another aspect of the system. Specifically, preview window 820 includes copy control 826 and insert control 824 and preview window 830 includes a similar copy control 840 and insert control 838. Further, similar to previous examples, the content may be edited within the preview windows 820, 830 prior to being inserted or copied. Also, similar to previous examples, the content provided in the preview windows may be used to construct additional prompts for further processing by the generative output engine.

Figure 9A:
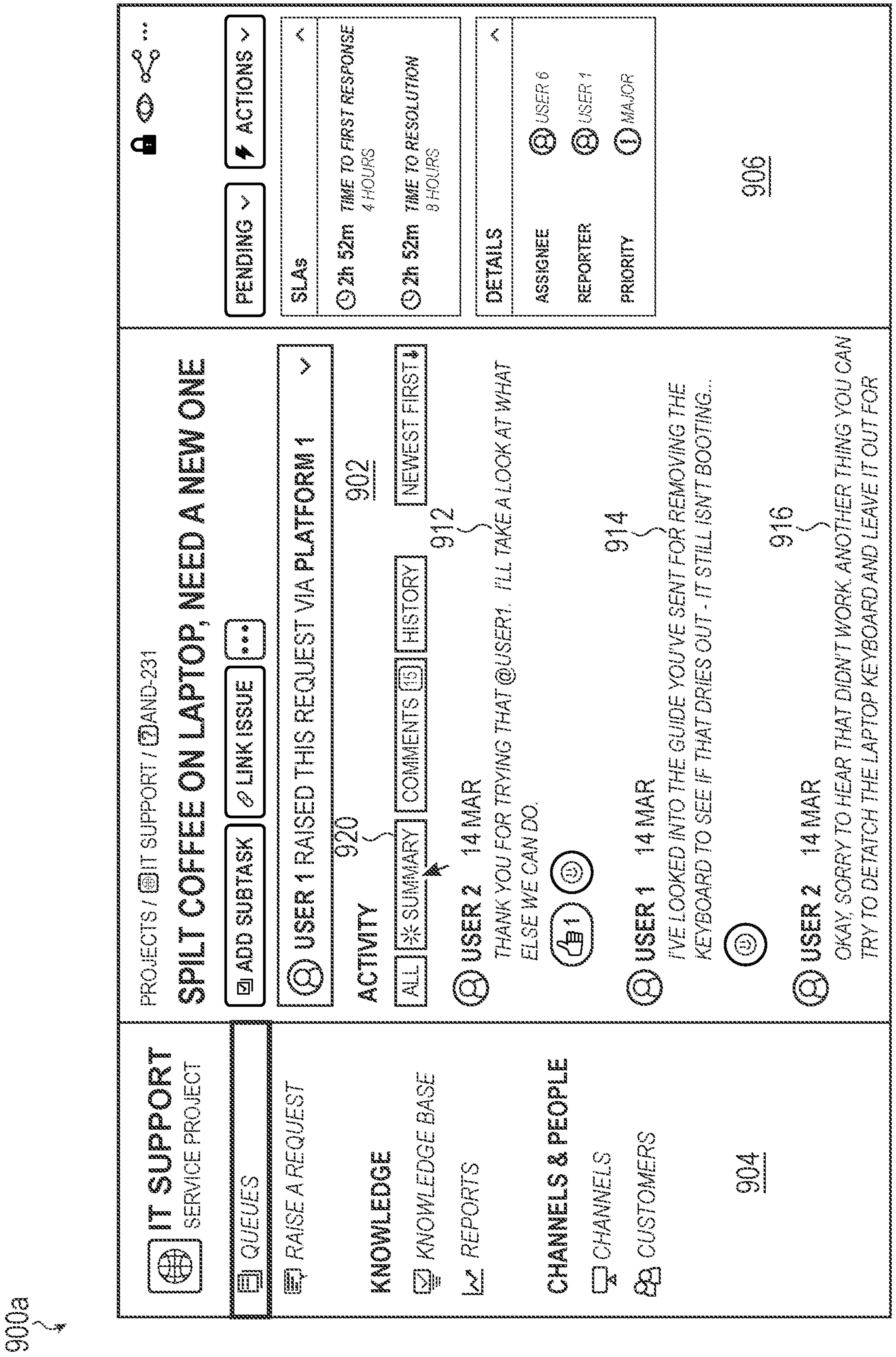

FIGS. 9A-9B depict additional examples in which an editor assistant service may be used to transform content or provide other generative output using content that is not necessarily contained in a single or continuous region. Specifically, as shown in the graphical user interfaces 900*a*, 900*b*, an editor assistant service may be used to summarize a series of user comments, event entries, or other discrete items associated with a system object. This functionality may help a user more easily digest a large amount of content that may extend beyond a single screen or view of the graphical user interface. The summary may also omit non-substantive content, repeat entries, and other content that may be distracting or difficult to review quickly. These examples also illustrate how an editor assistant service may be invoked through a dedicated control 920 provided by the graphical user interface.

The example graphical user interfaces 900*a*, 900*b* of FIGS. 9A-9B are an example issue view of an issue tracking platform or system. As shown in the illustrated examples, the graphical user interfaces 900*a*, 900*b* include multiple regions. Specifically, the graphical user interfaces 900*a*, 900*b* include a navigational region 904, an issue summary or quick-view region 906 and a main region 902. In some implementations, the main region 902 may be a single continuous editor region. However, in the present example, the main region 902 includes a series or set of distinct entries, which may each included an individual editor region or may simply include text in a series of discrete event or comment objects.

With reference to the graphical user interface 900*a* of FIG. 9A, in response to a user selection of the control 920, the editor assistant service may be invoked to provide a summary of the comments, events, or other entries associated with the current object. Similar to the previous examples, selection of the control 920 may cause the editor assistant service to extract content from each of the entries and insert the extracted content into a prompt. The prompt may also include predefined query prompt text that includes instructions or examples for providing a summary of the entries. The prompt is provided to a generative output engine, which produces a generative output or response.

An example prompt provided as input may be:

```
{
    "input_prompt": "List all changes to this document since I last visited.",
    "prompt_with_embedded_command" : "${SELECT description FROM TABLE edit_log WHERE date_added < User123.ThisPage.LastVisit }"
}
```

In some cases, the pseudo-query language translation of the input prompt may be, itself, a generative output of a generative output engine. In these examples, a first request may be submitted to a generative output engine such as:

```
{
    "input_prompt": "List all changes to this document since I last visited.",
    "modified_prompt " : "Convert the following phrase [list all changes to this document since I last visited] into a Query Language query against a table named 'edit_log' with columns: id, description, date, user.id. Consider 'this document' to be Page123 or by the variable name ThisPage, which is an attribute of the user User123."
}
```

In response to receiving this modified prompt, the generative output engine may generate the previous example pseudo-query language query.

FIG. 9B depicts the graphical user interface 900*b* subsequent to the selection of the control 920 of FIG. 9A. In the graphical user interface 900*b*, a preview window 930 is displayed overlaying the main region 902. The preview window 930 includes an output response 932 provided by the generative output engine. The output response 932 includes a summary of the extracted content and may be a curated list and summary of the key events or comments that were provide in the prompt. The current example depicts the summary as a bulleted list. In other implementations, the summary may be provided in a narrative or paragraph format. The preview window 930 also includes a list of link objects 934, which may have been identified by the generative output engine or may have been gathered by the editor assistant service. Similar to previous examples, the link objects 934 may be selectable link objects that contain content extracted from the respective linked content and/or may include content generated by the generative output engine. The link objects 934 may also include embedded content and are selectable to cause redirection to the respective content item hosted by the respective platform or system.

Similar to previous examples, the preview window 930 also includes controls 938 for copying or directing the content. The example preview window 930 also includes feedback control 936, which may be used to indicate whether the articles or the summary are accurate or helpful. Selection of a positive or negative feedback may influence the creation of subsequent prompts. For example, if a threshold number or relative percentage of negative feedback results are received, the predefined prompt query text may be supplemented or modified to provoke a different response from the generative output engine. This may be performed automatically and without significant intervention from a system administrator. In some cases, the feedback is collected and used for system analytics or performance measurements.

Figure 10A:
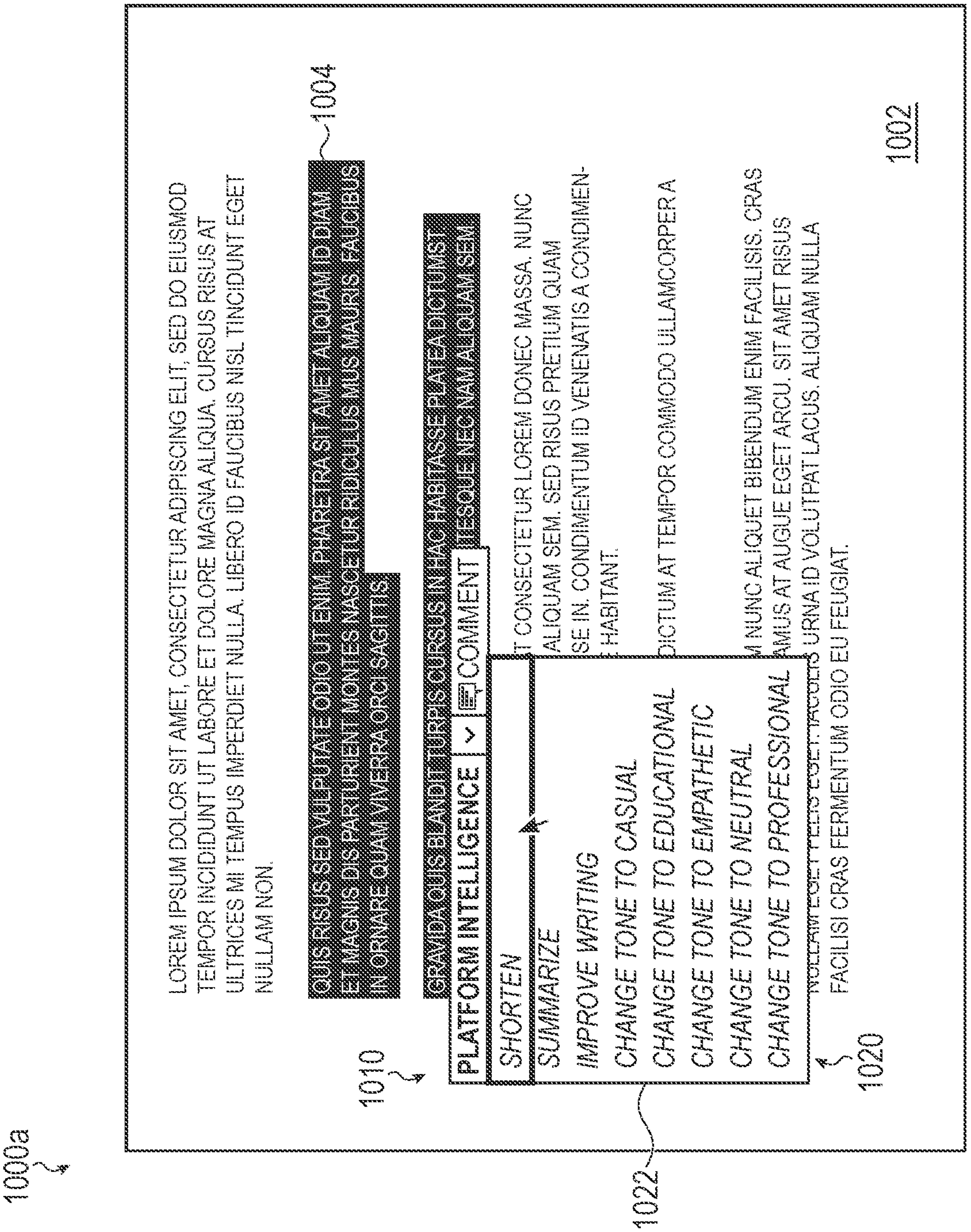
FIGS. 10A-10B depicts an editor assistant service causing display of a command selection interface window including a list of command controls.
Figure 10B:
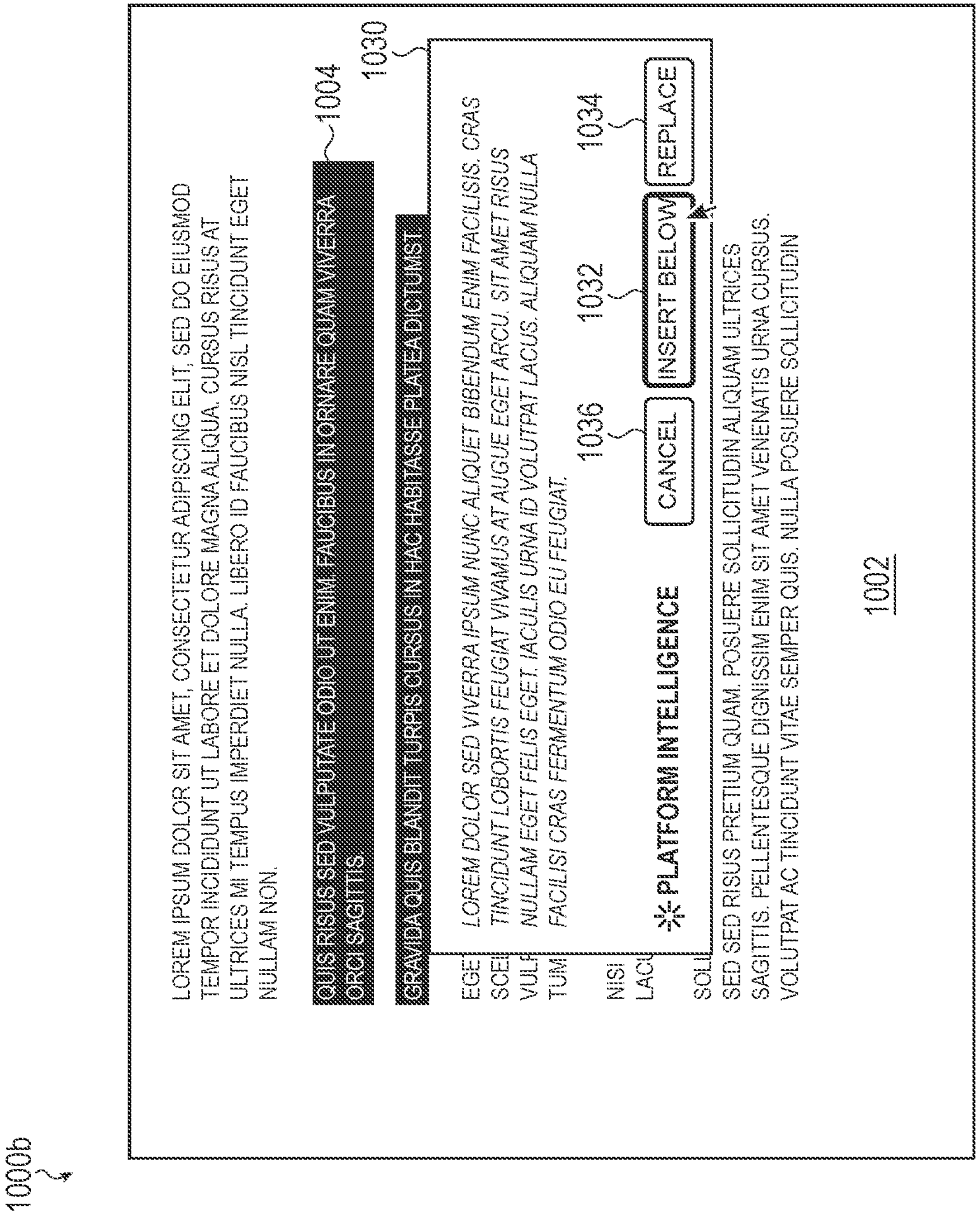

FIGS. 10A-10B depict further examples of use of an editor assistant service with a collaboration platform. In particular, the examples of FIGS. 10A-010B depict an editor assistant service that is able to operate on a snippet or portion of user-selected content within an electronic document. The example graphical user interfaces 1000*a* and 1000*b* of FIGS. 10A and 10B represent a portion of an editor or content region 1002 of a graphical user interface similar to the examples provided above with respect to FIGS. 5 and 9A-9B. A description of the various aspects of an editor region and content region are not repeated here to reduce redundancy.

As shown in FIG. 10A, a user may select a portion of content 1004 of an electronic document or page using a cursor drag or gesture input to the graphical user interface 1000*a*. As shown in FIGS. 10A-10B, the selected portion 1004 of the electronic document may be displayed in highlight or using some other visually distinguishing graphical effect. In response to an input (e.g., a pause, hover, right-hand mouse button selection), a control 1010 may be displayed with an option for invoking the editor assistant service. Alternatively, the graphical user interface 1000*a* may include a dedicated control (similar to the control 920 of FIG. 9A) which is selectable to cause invocation of the editor assistant service. As shown in FIG. 10A, the editor assistant service may cause display of a command selection interface window 1020 may be displayed including a list of command controls 1022. Similar to the examples described above, the command controls 1022 may each correspond to a different content modification or content generation action, which includes, but is not limited to, a summarize action, writing improvement suggestion action, a change tone action (e.g., change tone to casual, change tone to educational, change tone to empathetic, change tone to neutral, change tone to professional), create a list of action items, summarize decisions, suggest a title or heading, or other potential actions.

As discussed previously, in response to a user selection of a particular command control 1022, the system may generate a prompt including predefined prompt query text that corresponds to the selected command control. In some cases, the system may include predefined prompt templates or excerpts that are used to generate the custom prompt. In this example, all or at least a portion of the selected content is also added to the prompt. In some cases, the selected portion of the document is modified or adapted before it is added to the prompt. For example, non-standard characters, formatting tags, and multi-media content may be removed before inserting the selection in the prompt. In other cases, non-standard characters, formatting tags, and even images or other multi-media content may be included in the prompt or modified to conform with a format compatible with the generative output engine. Similar to previous examples, the prompt may be provided to the generative output engine, which produces a generative output or generative response based on the prompt.

As shown in FIG. 10B, the generative output or response is displayed in a preview window 1030 which overlaps or is otherwise displayed over the content of the editor or content region 1002. The generative output or response may be formatted in accordance with a schema corresponding to the selected portion 1004 including editor-specific markup tags, text arrangement, non-textual elements, and other content present in the selected portion 1004. Similar to the previous examples, the preview window 1030 may include multiple controls 1032, 1034, 1036 for inserting or otherwise directing the response into electronic content. Specifically, the preview window 1030 includes a control 1032 for inserting the response content below the selected portion 1004, a control 1034 for replacing the selected portion 1004 with the response content, and a cancel control 1036. Other controls may include copying to a clipboard, inserting the response content into another document or other electronic content, or other actions. The response content of the preview window 1030 may also be user editable, as described previously. The preview window 1030 may also include controls or fields for using the response content in a prompt for further processing by the generative output engine.

FIG. 11 depicts another example of use of a generative output engine with a collaboration platform. In the current example, the collaboration platform is a documentation platform with a frontend operating on a client device. The frontend of the documentation platform causes display of a graphical user interface 1100 on the display of a client device. This particular graphical user interface 1100 includes a multiple panel or multiple region graphical user interface, similar to the example described above with respect to FIG. 5. Similar to previous examples, the graphical user interface 1100 includes a main panel 1102, which may be operated as a content viewing or content reading panel and transitioned to a content editor panel. Also similar to previous examples, the graphical user interface includes a navigational panel 1104 that includes selectable navigational elements. In particular, the navigational panel 1104 includes a hierarchical navigational element tree 1106 of elements in which each element is selectable to cause display of the respective content of a corresponding content item (electronic document or page) within the main panel 1102. Similar to other examples described herein, the navigational panel 1104 may include other navigational trees or elements that are selectable to cause display of respective content. The navigational panel 1104 may also include other selectable elements that are selectable to cause navigation to other aspects of the system including, without limitation, calendars, blogs, analytics, user profiles, and other endpoints accessible by the graphical user interface 1100.

In the example of FIG. 11, the graphical user interface 1100 of FIG. 11 includes an additional region referred to herein as a summary region 1110. The summary region 1100 is positioned along the periphery of the graphical user interface 1100 and, in this example, is positioned along a side of the main region 1102 opposite to the navigational region 1104. The summary region 1110 includes multiple sub-regions or predefined areas that may include generative output provided by a generative output engine. In general, the summary region 1110 includes content that is generated based on content displayed in the main panel 1102 using content extracted from the electronic document or page being viewed or edited in the main panel 1102.

In accordance with the techniques and examples provided herein, content may be extracted from the corresponding document or page content and may be used to generate one or more prompts. The one or more prompts may include predefined query prompt text that is selected in accordance with a content type of the particular page, a role of the user, or other context data associated with the current session. For example, the one or more prompts may include predefined query prompt text that is adapted for one or more of: a project content type, a knowledge base or knowledge base documentation content type, a user or product profile content type, a blog or journal content type, a meeting notes content type, a code summary or code documentation content type, or other content type. The content type of the particular or current page or document may be determined in advance and the content may include one or more tags or document metadata that indicates the content type. In other implementations, the content type may be determined based on a semantic analysis or other natural language processing analysis of the page or document content subsequent to the page or document being loaded into the graphical user interface for display. In some cases, the content type is based on pages or documents that are proximate to the current page or document in the hierarchical navigational tree of elements 1106.

Similarly, the predefined query prompt text may be based on a user role or other aspect of the user profile. For example, the type of summary, tone of the summary, technical character of the summary may vary depending in accordance with a predicted use of the authenticated user. Specifically, an authenticated user having a role that is more technical (e.g., engineer or software developer) may be provided with content that is more technical or detailed as compared to an authenticated user having a role that is less technical. In this way, the content of the summary region 1110 may change in accordance with the authenticated user accessing the page or document. Similarly, the predefined query prompt text may also vary in accordance with other context data including, for example, other applications being concurrently used, user view history of user event logs from a current or recent session, other content or objects being concurrently viewed or edited or having been viewed or edited in a recent session. For example, the system may detect a concurrent use of a messaging platform or issue tracking platform indicating that the current user is providing assistance in accordance with an information technology system management (ITSM) role or session. As a result, the predefined query prompt text may be selected in order to extract steps or a procedure outline from the currently viewed content. When the same user views the current page or document during another session (not associated with an ITSM role or session), the predefined query prompt may be selected in order to provide a more general content summary or other information to the user. Thus, the content provided in the summary region 1110 may vary for a particular user in accordance with a change in context data.

As described previously, a prompt, including the predefined query prompt text and content extracted from the current page or document, may be provided to a generative output engine. The generative output engine may produce a generative output or generative response, which is used to generate or render the content in the summary panel 1110. In one example implementation, the summary panel includes multiple generative content that may be generated in response to a single composite prompt or in response to multiple prompts that are provided to the generative output engine. In the example of FIG. 11, the summary panel 1110 includes a content summary that is based on content extracted from the current page or document. In some cases, the content summary includes content that is extracted from pages or documents that are proximate to the current page or document in the hierarchical navigational tree of elements 1106. In some cases, the content summary also includes content that was extracted from pages associated with the current user or with a project associated with the current user. In the summary panel 1110 of FIG. 11, the generative response may also include a list of task summary items generated by the generative output engine using the page or document content and predefined query prompt text. As described herein, the predefined query prompt text may be formulated to cause the generative output engine to identify action items or task summaries in a portion of provided content.

The summary panel 1110 may also include link objects or other selectable objects that correspond to other content items that are related to the current page or document. In some cases, one or more additional prompts are provided to the generative output engine, which is used to provide summaries, brief titles, or other generative content based on content extracted from each respective linked content item. The summary panel 1110 may include other content including related user accounts, related projects, or other information derived from the currently displayed content and/or the current user session.

Task Extraction, Decision Points, & Summaries

FIGS. 12A-13B depict examples of how a generative output engine can be used to provide a task or action item summary for content of a collaboration platform. For example, a generative output engine can be used to identify a set of tasks or predicted action items in either an entire document or in a set of selected text. The tasks or action items may be inserted into the content or they may be used to automatically generate a set of issues or tasks in an issue tracking platform or system.

Figure 12A:
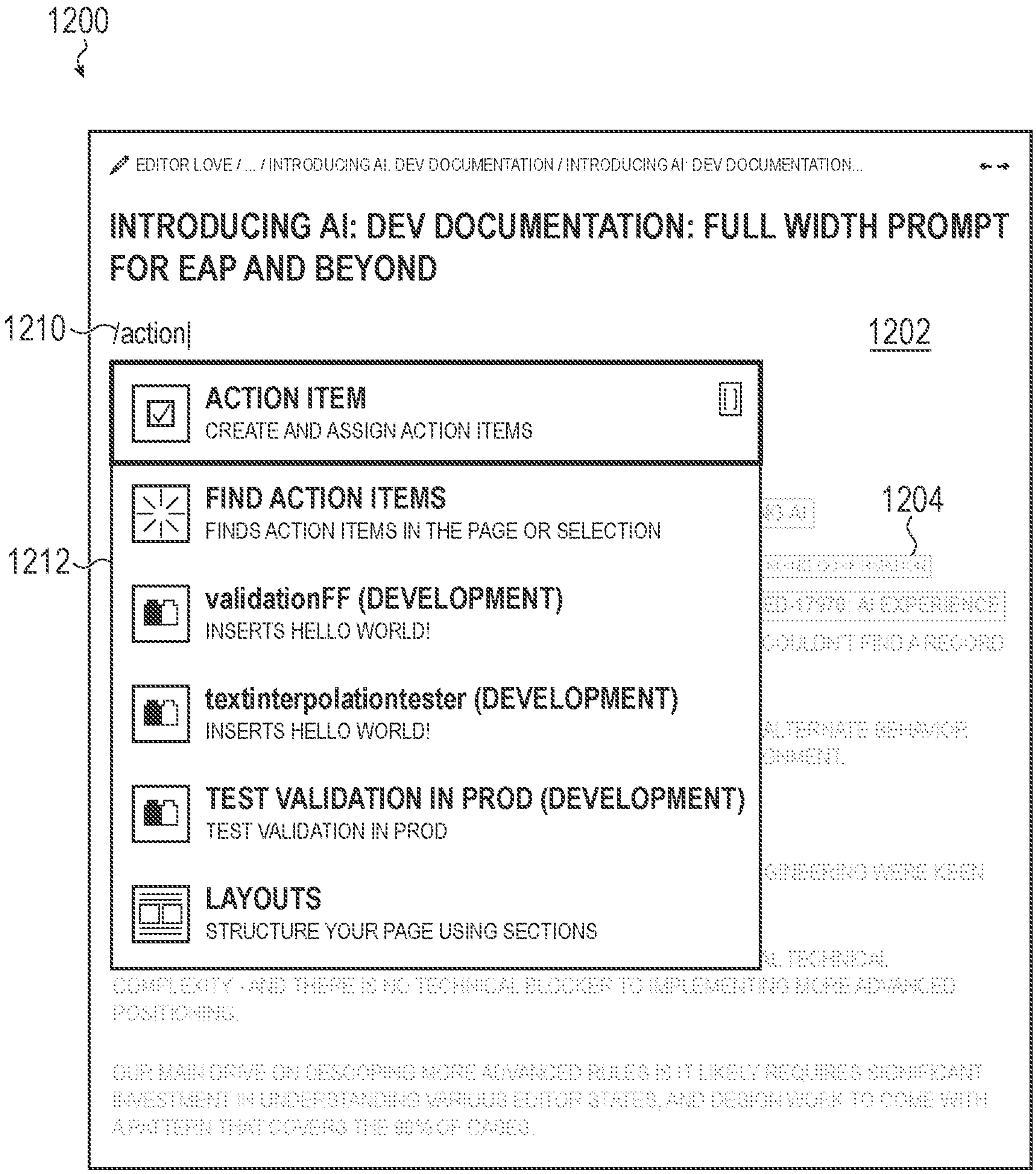

FIG. 12A depicts an example result of invocation of the editor assistant service that can be used as a list of tasks or action items in an editor region of a graphical user interface. Similar to preview examples, the editor assistant service may be invoked using a designated character or character sequence (e.g., a slash command of FIG. 5) or make be invoked using another control or user interface element. In the present example, a designated character or character sequence 1210 is entered into an editor region 1202 of a graphical user interface 1200.

In response to a user input comprising the designated character 1210, a command selection interface window 1210 may be displayed including a list of command controls 1212, also referred to herein as content-assistant controls. Each command control 1212 or at least some of the command controls, are associated with a content modification action, which may be partially described or indicated in the respective command controls 1212. In some cases, the command controls 1212 include functions or operations that do not necessarily invoke the editor assistant service or the use of the generative output engine.

In response to a user selection of the action item command control 1212, the editor assistant service may cause display of a command prompt interface 1220 as shown in FIG. 12B. The command prompt interface 1220, may replace an in-line command character or character sequence entered into the editor region 1202. As shown in FIG. 12B, the command prompt interface 1220 includes a user input region 1222 which is configured to receive user input. The user input region 1222 may receive user-entered text, which may specify a content modification action, prompt text, or source of content to be analyzed or modified. In the present example, the user input includes a graphical object 1224 corresponding to an action to "find action items," which was inserted as a result of the selection of the command control 1212.

Similar to other examples provided herein, the user may provide further user input that may be used to supplement or replace the action indicated by the graphical object 1224. For example, the additional user input may specify a format for the output or a further instruction (e.g., generate in a table format, sort results chronologically). The user may also specify an object to be acted on or to be a subject of the action. The additional user input may include a text string to be analyzed or a pointer or link to content to be used as part of the proposed action. In this example, the system renders an object selection interface 1230. The object selection interface 1230 includes an input region 1232 for receiving user search terms or other input that may be used to identify content items.

The object selection interface 1230 also includes a results region 1234, which may display a list of selectable elements, each element associated with a content item that was identified using user input provided to the input region 1232. In some cases, the results region 1234 displays recently selected, recently viewed content items, or another curated list of content items predicted to be relevant to the object link creation process. Similar to previous examples, the object selection interface 1230 also includes other regions 1236 and controls that may be used to configure how the object is to be displayed or used. In some implementations, multiple tabs or other selectable area may be used to toggle between different content providers. The list of content providers may be determined by a registry of validated content providers that have registered with the service and are able to provide access to remotely hosted content items based on a user credential, token, or other authenticating element, which may be authenticated in advance of the object search process using a single-sign-on or other authentication scheme. In response to a user selection of a particular element displayed in the results region 1234, a link object may be created and positioned within the user input region 1222.

In response to selecting an item in the results region 1234 of the object selection interface 1230, link object 1226 is positioned in the user input region 1222 of the command prompt interface 1220. In the present example, the link object 1226 includes a link or path designating a location or endpoint at which the electronic document can be accessed. Similar to previous examples, the link object 1226 includes a graphical element or icon that represents the type of object that is linked and a text descriptor, which may be obtained from the linked object or may be expressly entered using the object selection interface 1230.

In response to a user input indicating that the user input region is complete, the editor assistant service creates a prompt including predefined query prompt text having an action-request instruction set and content extracted from the linked object. In some implementations, the content extracted from the linked object is a text-formatted version of the content extracted from the linked object. The action-request instruction set may include instructions for generating a list of items that require an action, a list of tasks to be completed, a request for ordering the list, and a format request for the resulting list. In some cases, the action-request instruction set is adapted in accordance with a user profile of the requesting user. In particular, the action-request instruction set may be adapted to include role-focused tasks. For example, in accordance with a determination that the requesting user has a role consistent with a technical position, the action-request instruction set may be adapted to request engineering or technical tasks to be performed. Similarly, in accordance with a determination that the requesting user has a role consistent with a business or marketing position, the action request instruction set may be adapted to request strategic or marketing related tasks. In some instances, a user graph or project graph generated by the system may be used to adapt the action-request instruction set. In some cases, user event logs or user creation history is used to adapt the action-request instruction set.

Figure 12C:
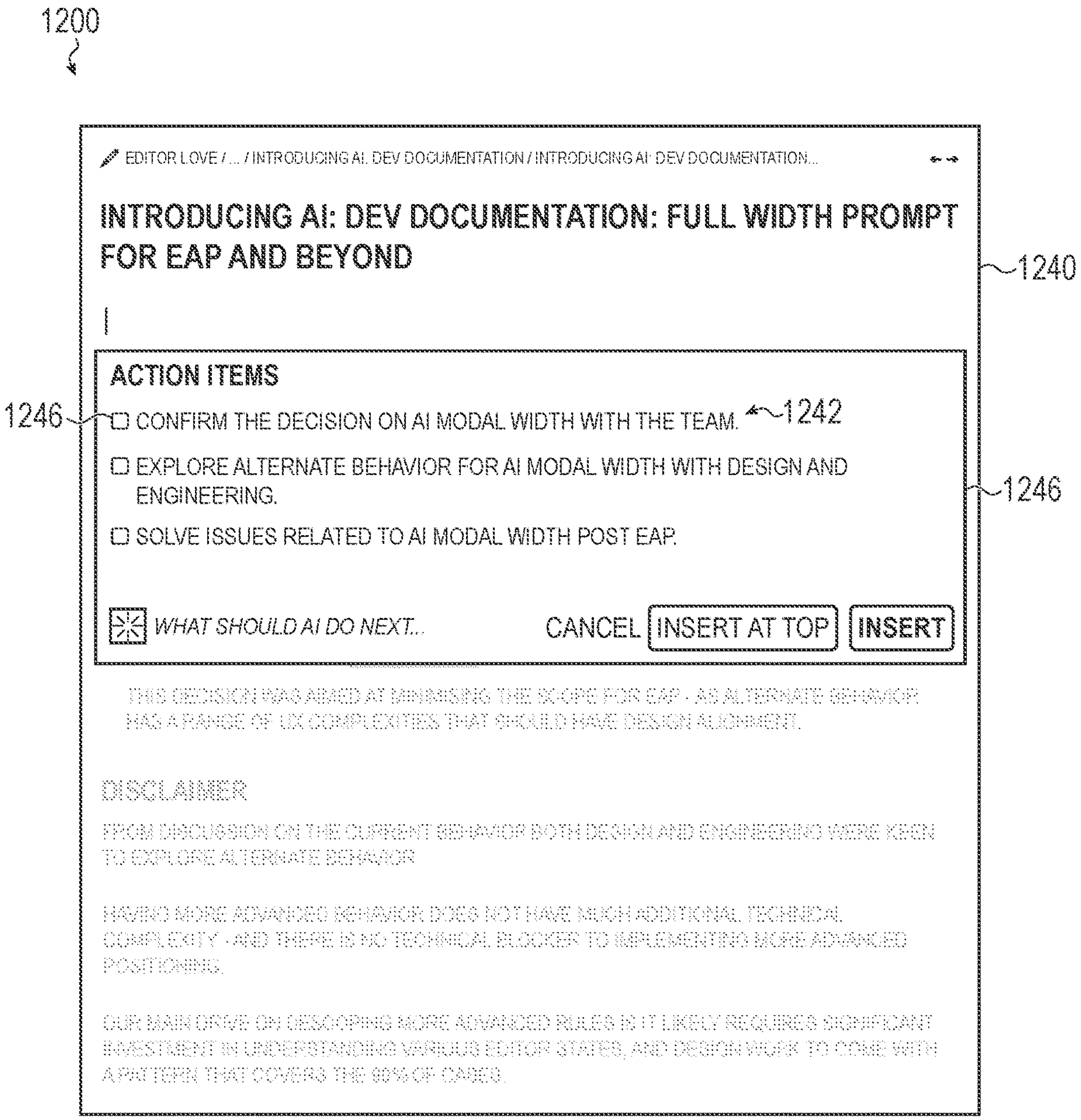

Similar to other examples described herein, once the prompt has been constructed, the prompt may be transmitted or communicated to a generative output engine, which generates a generative output or generative response. FIG. 12C depicts an example generative result 1242 rendered in a preview window 1240. The generative result 1242 includes a list of action items or tasks that were derived from the content of the selected object and are formatted in an editor-specific format to include icons 1246, which are selectable in order to indicate completion of a task or action item. In some cases, the generative result received from the generative output engine is transformed into format of the result 1242, as shown in FIG. 12C. In other instances, the formatting may be generated by the generative output engine based on example input-output pairs demonstrating the desired formatting and schema requirements.

Similar to previous examples, the preview window 1240 includes one or more controls 1246 for directing the insertion of the response 1242 into a particular location within the document content, copying the response 1242 to a clipboard, or performing other actions with respect to the response 1242. FIG. 12D depicts the resulting document or page that is generated in result to a user selection of "insert at top" (from control 1246). As shown in the editor region 1202 of FIG. 12D, the results are generated as content 1250 near the top of the document and under the title and other possible header content.

In the event that only one or no tasks or action items are identified, an alternative message or communication may be displayed in the graphical user interface 1200. For example, if a threshold number of tasks or action items are not returned in the generative response, the system may cause display of a message that an insufficient number of results were found or that no results were found. In some cases, the threshold number of tasks or action items is one. In some cases, the threshold number is zero such that even if one result is found, it will be rendered in the preview window 1240. In other cases, the threshold number is greater than one. In some cases, the user can set the threshold number by adjusting a setting or configuration of the service.

Figure 13B:
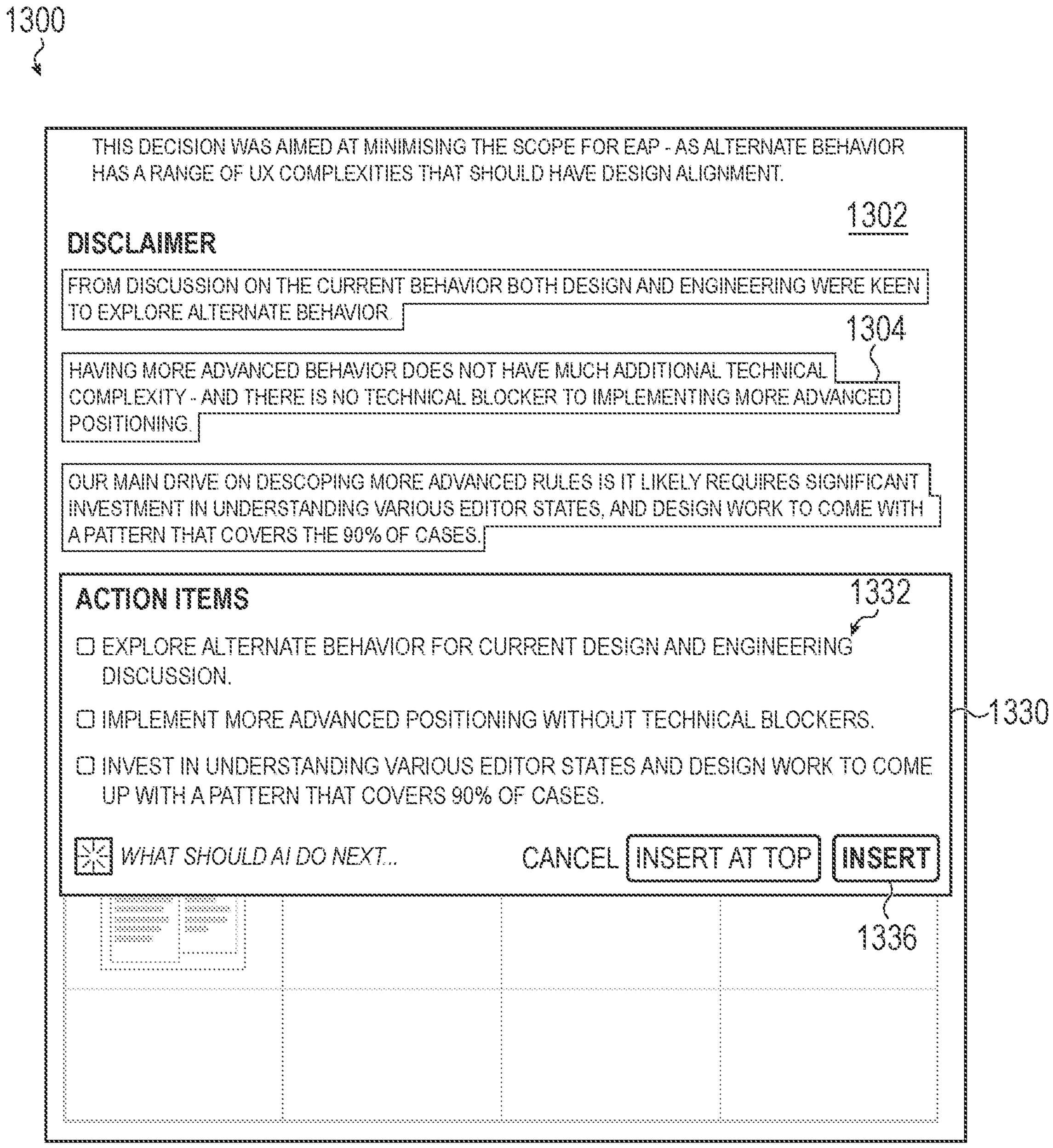

FIGS. 13A-13B depict another example sequence for generating a list of tasks or action items but using a user-selected content snippet or portion of a current document or pages. As shown in FIG. 13A, subsequent to a user selecting a portion of content 1304 displayed in an editor or content region 1302, a user may select a control or provide an input invoking the editor assistant service. As a result, a command prompt interface 1310 including a user input region 1312 may be rendered overlapping the or overlaying some portion of the content displayed in the editor or content region 1302. Similar to previous examples, a command selection interface window 1320 may be displayed including a list of command controls 1322, also referred to herein as content-assistant controls. Each command control 1322, or at least some of the command controls, are associated with a content modification action, which may be partially described or indicated in the respective command controls 1322. Generally, the command controls 1322 that are rendered in the command selection interface window 1320 may be selected based on the previous user action (e.g., the selection of the portion of the text 1304) and may be limited to actions that can be performed or are likely to be most applicable to selected portion 1304 of the content.

In response to a user selection of a particular command control (e.g., "find action items"), the editor assistant service may generate a prompt and communicate the prompt to a generative output engine, as described with respect to the previous example of FIGS. 12A-12D. Also similar to the previous example, the generated response 1332 (or transformed or formatted version of the generated response) is rendered in the preview window 1330. The response 1332 may be inserted into the content, saved to a clipboard, or otherwise directed as provided by controls 1336, similar to other examples described herein.

Content Contextualization & Specialized Summaries

A generative output engine may be used to assist other aspects of a collaboration platform. FIGS. 14-18 depict example implementations in which a generative output engine can be used to provide explanatory interface elements on request of a user viewing content provided by the collaboration system. As described in more detail below, the explanatory interface elements may include content obtained from a directory platform or other separate platform and include content that has been generated by the generative output engine. In some many internal documentation and project planning documents, code names, project names, and acronyms are used extensively as shorthand for various projects or initiatives within a company. While use of these words may improve efficiency in communication by eliminating the need to explain the context in a redundant fashion, the terms may not have meaning outside of a project or team. It may also be difficult to determine the meaning of the words or phrases without conducting independent research, which may involve multiple page access events, navigational interactions, and, in some cases, cross-product interactions. The system and functionality described with respect to FIGS. 14-18 can be used to provide supplemental content with respect to selected words or phrases that can help explain the use a meaning of internally coined terms, without having to navigate away from the current interface or platform.

Figure 14:
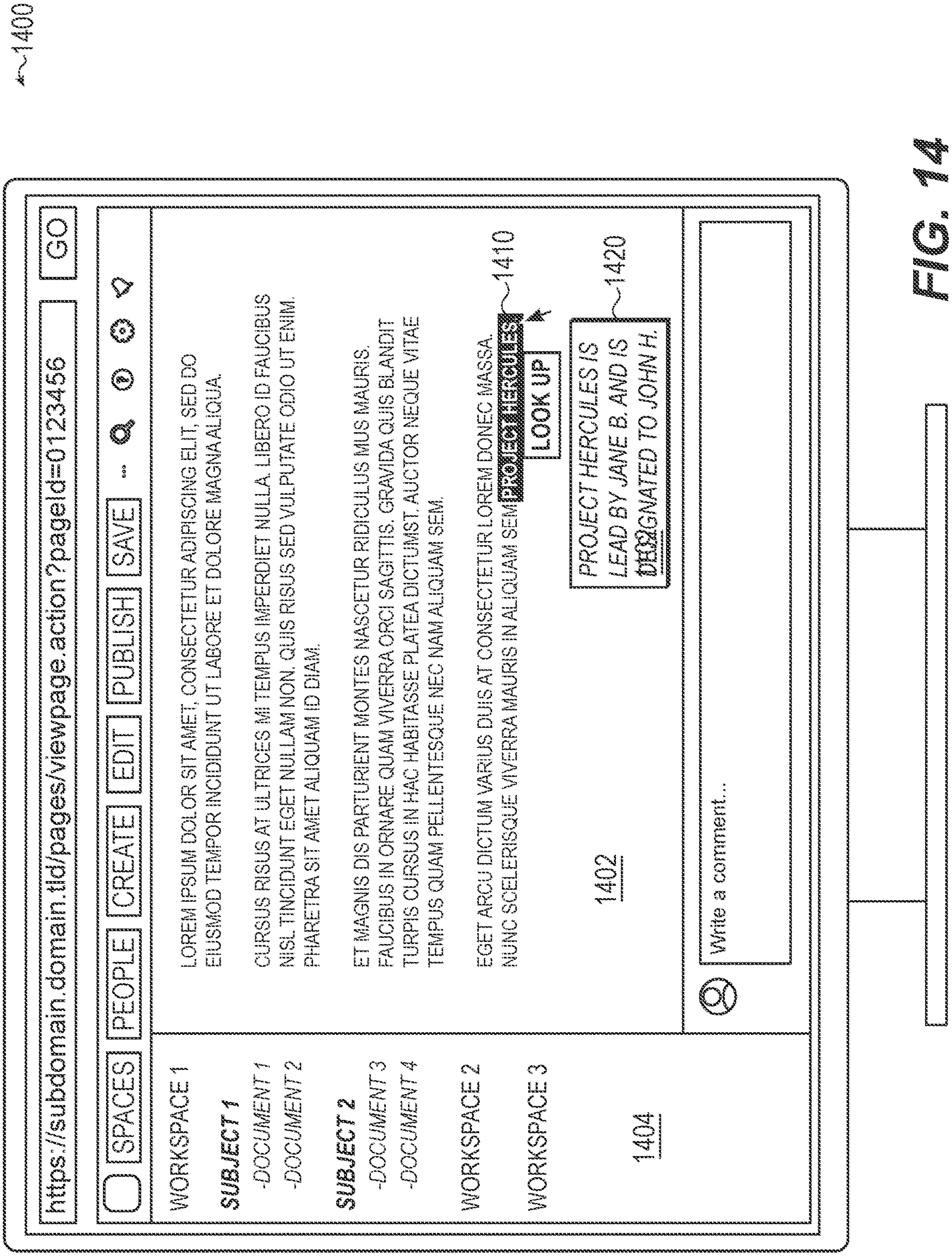
FIG. 14 depicts an example graphical user interface of a collaboration platform that includes supplemental content provided by a generative output engine.

FIG. 14 depicts an example graphical user interface 1400 of a collaboration platform that includes supplemental content provided by a generative output engine. In particular, the graphical user interface 1400 includes a tool or service that allows the system to provide supplemental explanatory content for selected words or phrases 1410 in the page or document content. As shown in FIG. 14, the graphical user interface 1400 is configured to render a supplemental content window 1420 (e.g., a window interface element) including content obtained from a separate platform or from content within the current collaboration platform. In the simplified example of FIG. 14, the supplemental content window 1420 includes a summary generated by a generative output engine in response to a prompt created, in part, using content extracted from a separate directory platform. A more detailed explanation of the generative creation process and the features of the content window 1420 are provided below with respect to FIGS. 15A-18.

Similar to previous examples, the graphical user interface 1400 includes multiple regions including a main or central region 1402, which may operate as a content viewing region or a content editor region, depending on the selected mode of the graphical user interface 1400. Further, similar to previous examples, the graphical user interface 1400 also includes a navigation region 1404 and other controls and graphical objects, previously described. While the following examples are provided with respect to a documentation platform, similar or the same functionality may be used in other collaboration platforms including issue tracking platforms, code management platforms, ITSM platforms, or other software applications.

FIGS. 15A-18 provide further example implementations of supplemental content that can be provided by a generative output engine. Each of the examples depicts how different information may be extracted from a separate platform in order to provide a generative response, that is used to render a supplemental content window, also referred to as a window interface element. Some of the context details or surrounding features of the graphical user interfaces have been omitted from some of the figures to reduce redundancy and focus the description on highlighted functionality.

Figure 15A:
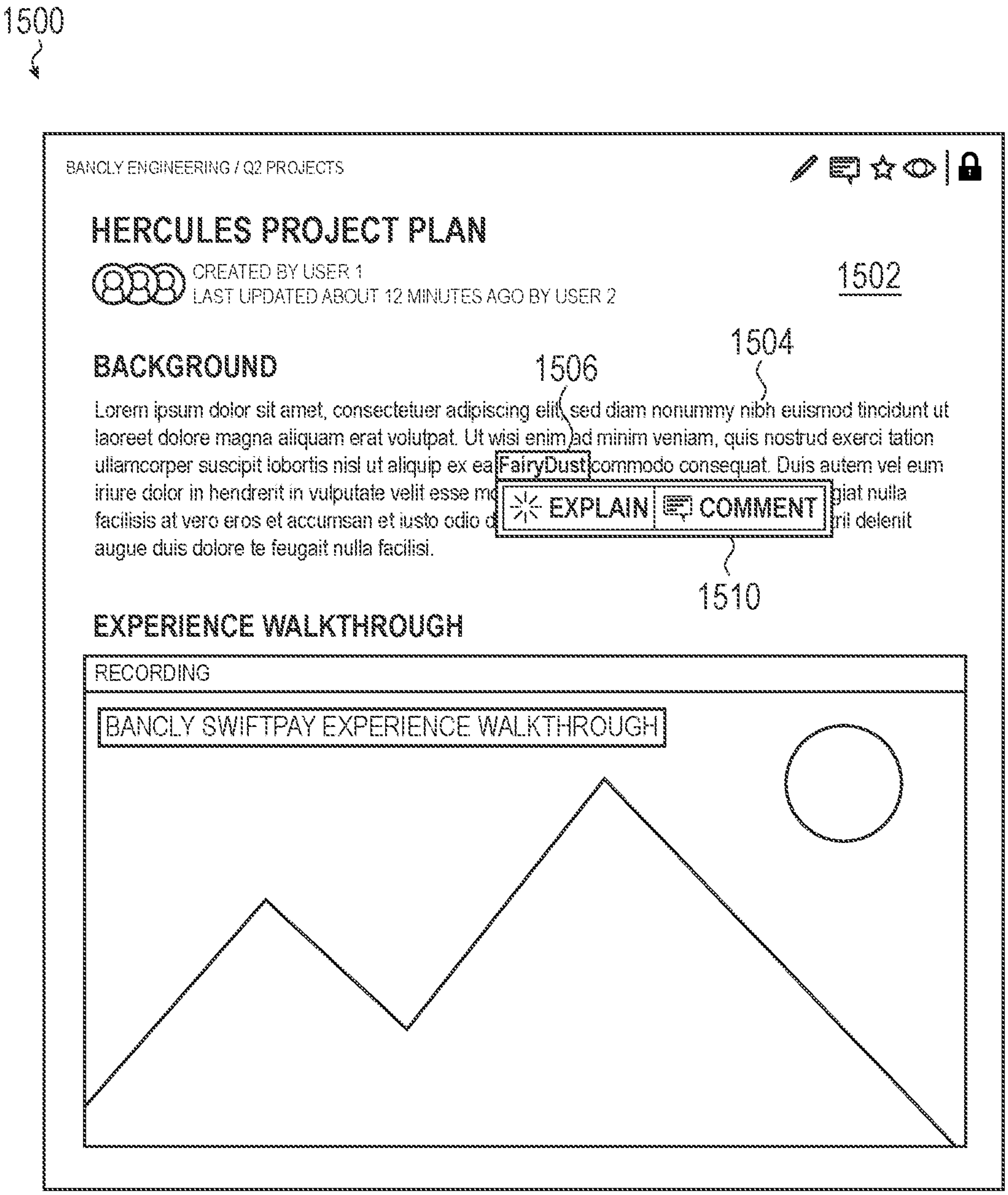

FIGS. 15A-15B depict an example graphical user interface 1500 of a collaboration platform in which supplemental content may be provided using a generative output engine. In particular, the graphical user interface 1500 includes a content region 1502 including content 1504. In response to a user input provided with respect to a word 1506 or phrase, a control 1510 may be rendered over the content 1504. In this example, the control 1510 includes multiple selectable elements, each element providing different functionality. One of the selectable elements is an "explain" function which, when selected, causes the system to generate supplemental content to provide context and meaning for the selected word 1506.

Figure 16:
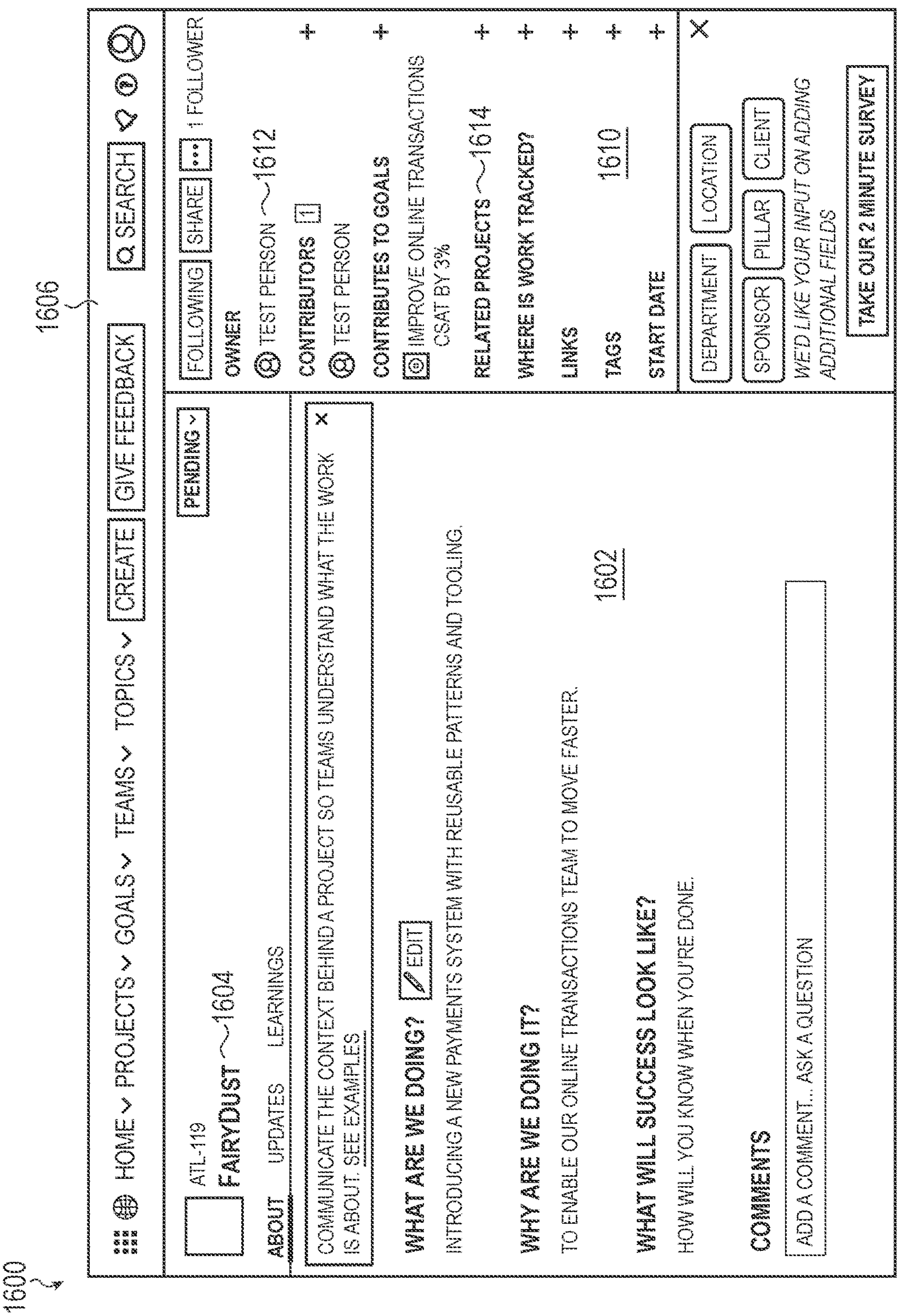
FIG. 16 depicts an example directory platform having a graphical user interface including a home page for an entry.

FIG. 15B depicts an example supplemental content window 1520, which may be displayed in response to a user selection of control 1510. The supplemental content window 1520 may include content summaries 1524 and other content that is produced using a generative output engine, as described herein. In particular, in response to a user selection of a word 1506 or phrase, the system may access a directory platform, conduct a keyword search, or perform other content searching activities to obtain one or more pages or document related to the selected word 1506. In this example, the system conducts a search on a separate directory platform to identify a home page or entry associated with the selected word 1506. FIG. 16 depicts an example directory platform having a graphical user interface 1600 including a home page for an entry associated with the selected word "FairyDust" as indicated by the title or label 1604. In response to user selection of the corresponding word 1506, the system may access the entry 1602 depicted in the graphical user interface 1600 of FIG. 16, and extract content from the entry 1602 and use the extracted content to generate a prompt to be transmitted to the generative output engine. In some implementations, content from the description in the entry and other descriptive text may be extracted and used to generate the prompt. Other information that may be used to generate the prompt include user accounts or related users 1612, content from related projects 1614 or other information that may be associated with the entry 1602, as indicated in the region 1610 of the example graphical user interface 1600.

In other example implementations, a search of the current collaboration platform or another type of platform may be conducted using the selected word 1506. In response to identifying content that is predicted to contain descriptive content related to the selected word 1506, content from that item may be extracted and used to generate the prompt. In some cases, the system may use labels, tags, metadata, or other content in order to identify descriptive content related to the selected word 1506. In some implementations, the system may also use project graphs, user graphs, or other object graphs constructed using the content of one or more collaboration platforms to identify descriptive content.

An output or response from the generative output engine may be used to populate the supplemental content window. Turning to the example of FIG. 15B, the output or response may be used to generate the description summary 1524 rendered in the supplemental content window 1520. The supplemental content window 1520 also includes an edit control 1536, which may transition the supplemental content window into a content editor and allow the user to modify or edit the generated summary 1524. In some instances, a modified summary is saved on the system and used for subsequent request for supplemental content. In this way, the generative output engine can be used to provide an initial summary or context, which may be checked, modified, and verified by system users. As shown in the example supplemental content window 1520, users may confirm or verify a summary by selecting feedback controls 1532. An indication of the number of verifications may be provided in region 1534. In some cases, verifications are only shown for user accounts that are related to the original descriptive content used to generate the content summary. For example, users that are associated with the entry (e.g., entry 1604) may verify the content. In some cases, associated users are shown in the region 1534.

Once a content summary or supplemental feedback has been edited and/or verified in an amount that meets a criteria, some or all of the content of the supplemental content window 1520 may be saved on the system. In response to a subsequent selection of the word (e.g., word 1506) by another user or the same user, the system may check for a cached or saved copy and, if one does not exist, the system may generate new content in accordance with the technique outlined above. Further, in some cases, new content is generated in accordance with a predicted or actual age of a saved or cached item in order to ensure that the description summary or other content is current and reflects up-to-date information.

As shown in FIG. 15B, the supplemental content window 1520 includes additional information or content items. In this example, the window 1520 includes link objects 1526, which are selectable to cause redirection to the respective content items and platforms. The selectable link objects 1526 may include embedded graphics and extracted item data in accordance with other examples described herein. The link objects 1526 may be obtained from the entry (e.g. entry 1602) or may be generated in response to a content search performed using the data summary or a search query generated by the generative output engine. In some cases, the generative output engine is also used to generate brief summaries of the content contained in each of the link objects 1526 and the summaries are rendered in the window 1520.

The supplemental content window 1520 may also include other content including team identifiers, user identifiers, and other content 1528 that is related to the selected word 1506. This content 1528 may also be generated using the directory entry (e.g., entry 1602) or may be obtained from a user graph, project graph, or other object graph generated using system data. The window 1520 may also include various other controls 1530 for copying the content, inserting the content into the current page or document, sharing the content, or directing the content to another aspect of the platform or system. In the current example, the title 1522 is selectable to cause the user interface to be redirected to the graphical user interface of the corresponding entry (e.g., the graphical user interface 1600 of the entry 1602). The window 1520 also includes an entry type or word classifier 1523, which indicates whether the word is a "project." "service," "team," "epic," "initiative," or other item managed by the directory platform, other type of platform, or used within an organization in accordance with the word classifier 1523. In some cases, the word classifier 1523 is also selectable to cause display of other uses of that word in the platform or organization in a similar context.

Figure 17:
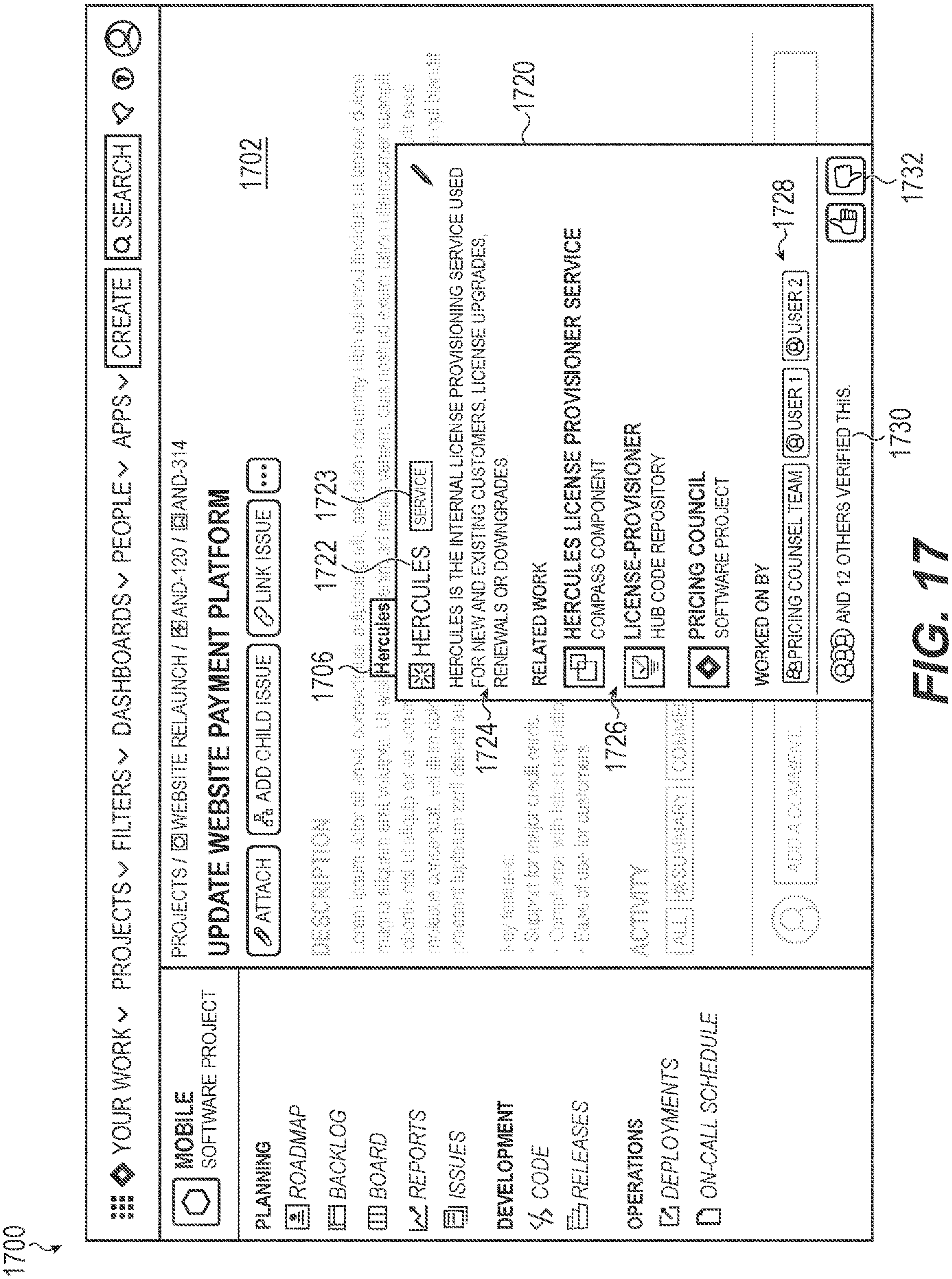
FIG. 17 depicts an example graphical user interface of an issue tracking platform and an example supplemental content window.
Figure 18:
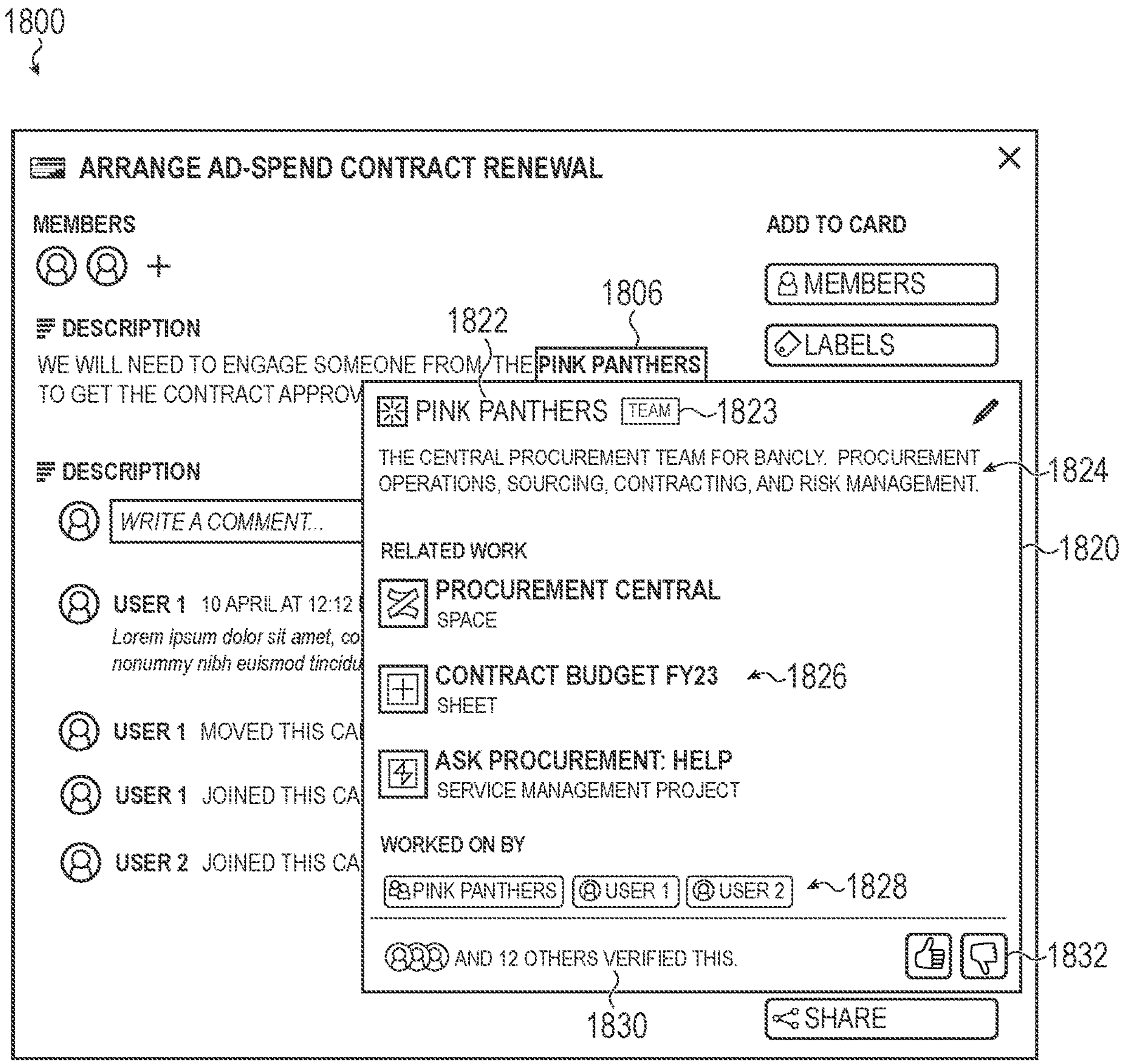
FIG. 18 depicts an example graphical user interface of an example supplemental content window in a project management platform.

FIGS. 17 and 18 provide additional examples of a supplemental content window rendered in a graphical user interface of a platform. FIG. 17 depicts an example graphical user interface 1700 of an issue tracking platform (also referred to as an issue tracking system or "ITS"). Similar to the previous examples, the supplemental content window 1720 is displayed in response to a user selection of a word 1706 within a content region 1702. The window 1720 includes a content summary 1724 that may be produced using a generative output engine, in accordance with the previous examples described herein. The window 1720 also includes link objects 1726 and related entities 1728, which may be generated in fashion similar to as described above. The window 1720 also includes feedback controls 1732 and verification indicia within region 1730 indicating the amount and users who have verified the content. In the example of FIG. 17, the word classifier 1723 indicates that the word is classified as a "service."

FIG. 18 depicts an example graphical user interface 1800 of a task card or tile in a project management platform. Similar to the previous examples, the supplemental content window 1820 is displayed in response to a user selection of a word 1806 within a content region 1802. The window 1820 includes a content summary 1824 that may be produced using a generative output engine, in accordance with the previous examples described herein. The window 1820 also includes link objects 1826 and related entities 1828, which may be generated in fashion similar to as described above. The window 1820 also includes feedback controls 1832 and verification indicia within region 1830 indicating the amount and users who have verified the content. In the example of FIG. 18, the word classifier 1823 indicates that the word is classified as a "team."

Natural Language to Custom Structured Query Language(s)

In addition to content editing assistance, a generative output engine can also be used to perform tasks for a variety of aspects of a collaboration platform. In particular, a generative output engine may be used to assist with specialized queries of an issue tracking platform. FIGS. 19A-22, described below, provide illustrative examples of how a generative output engine can be used in conjunction with a graphical user interface to perform sophisticated structured queries of a database or data store of issues. Some issue tracking platforms enable structured queries but only using a query schema that has been adapted for a particular issue tracking platform. Casual users may not have the experience or detailed knowledge of the specialized schema in order to perform advanced searching on such platforms. The techniques and systems described herein can be used to assist a user in the construction and use of specialized query terms and clauses. The interface described herein can also be used to help train users on the construction of custom queries by providing visual mapping tools and explanations for machine-generated queries. Many of the features previously described with respect to other examples, herein, are not repeated with respect to the present examples to reduce redundancy. However, many of the generative output engine assisted functions described within the present disclosure may be applied to the following examples as well.

Figure 19A:
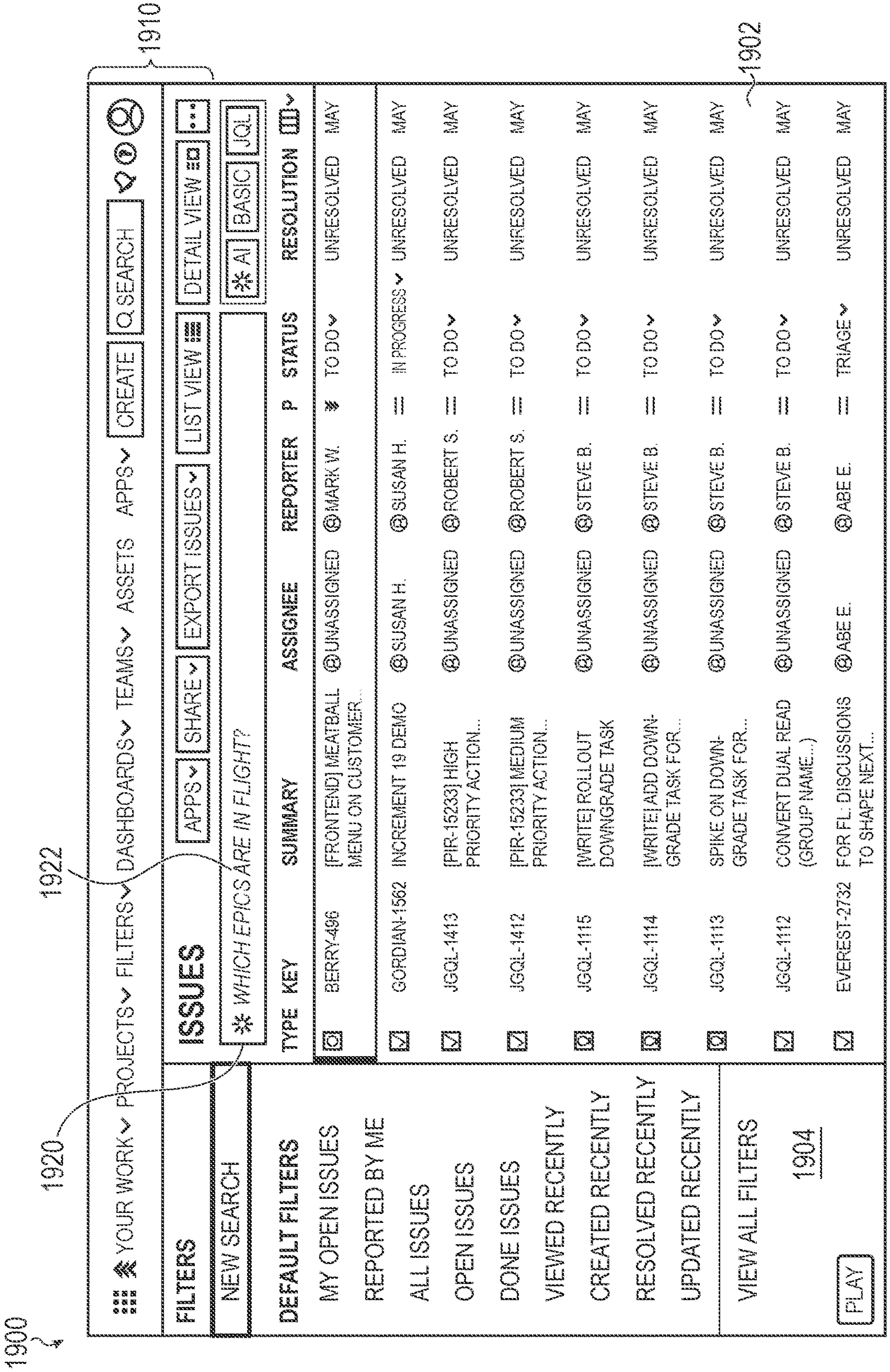

FIGS. 19A-19B depict an example graphical user interface 1900 of an issue tracking platform, also referred to as an issue tracking system. As described herein, an issue tracking platform is a system that manages user-generated issues or tickets in accordance with an issue or ticket workflow. Typically, each issue or ticket represents a task or a portion of a project that is assigned to a person or team (assignee). As the task or project progresses, the issue or ticket may transition through a series of predefined states in accordance with an issue workflow or process. Issue tracking platforms are also an essential tool for information technology management systems (ITSM) designed to handle technical issues or tickets submitted on behalf of employees or customers seeking technical assistance. Over time, the issue tracking platform may manage a large number of issues or tickets, which can be difficult to navigate without the help of sophisticated search and query tools. The graphical user interface 1900 of FIGS. 19A-19B can be used to obtain an overview of open issues for a project, issues assigned to a particular user, or issues satisfying a particular criteria defined by a search query.

FIG. 19A-19B depict list of issues 1940 displayed in an issue listing region 1902. Each of the items displayed in the list may be selectable and, in response to a user selection of a respective item, the graphical user interface may be redirected to an issue view of an issue corresponding to the selected item. The graphical user interface 1900 may also allow for bulk actions (e.g., bulk state changes, bulk assignments, bulk deletions) using the various controls provided in the graphical user interface 1900. In the present example, the graphical user interface includes a main panel or issue listing region 1902, a navigational region 1904 and a toolbar or controls region 1910. The user can navigate to various issue views and issue lists of the issue tracking platform by selecting a corresponding entry in the navigational region 1904. The user can also navigate to various projects, dashboards, teams, and other aspects of the issue tracking platform using corresponding controls in the toolbar 1910.

In order to conduct a new search or issue query, the graphical user interface provides a user input region 1920 which can be used to initiate a search or query. In the present example, the user input region 1920 is configured to receive a natural language search string. That is, a formal or structured query is not required as input to initiate a search. However complete, or partial structured search terms or clauses may also be provided to the user input region 1920. As shown in FIG. 19A, the user input region 1920 may be a special region adapted to work with the generative services available on the platform, as indicated with the star icon. In other implementations, the user input region 1920 may be a general purpose input region and the generative services may be invoked or initiated in response to another input or control.

In response to a natural language input 1922 provided to the user input region 1920, the system may generate or construct a prompt to be communicated to a generative output model. The prompt may include both predetermined query prompt text and at least a portion of the natural language input. The predetermined query prompt text may include instructions and/or examples that are configured to generate a response from the generative output engine that is compatible with a query schema used by the issue tracking platform.

FIG. 19C includes an example prompt 1950 of predetermined query prompt text that can be used to cause the generative output engine to produce a particular schema response. In this particular example, the predetermined prompt text includes a list of permitted commands 1952 for a Jira Query Language (JQL) query schema. This designates an open set of commands that are available for use in the construction of the structured query. The structured query is not necessarily limited to the open set of permitted commands 1952 but the open set may include commonly used terms or phrases. The prompt 1950 also includes prohibited terms 1954, which may specify which clauses or terms are restricted from the output. The prohibited terms 1954 may eliminate terms or phrases that may provide functionality that is beyond the scope of a tailored query or may result in an unintended modification of system data. The prompt 1950 also includes a set of structured query examples 1958 that provide demonstrative input-output pairs. Specifically, the input-output pairs include an example natural language input or prompt paired with an example schema-formatted output. The set of structured query examples 1958 are not exhaustive but may include common or representative queries that demonstrate typical search functions.

A prompt including the predetermined query prompt text and at least a portion of the natural language input is transmitted to or otherwise communicated to the generative output engine. As described with respect to previous examples, the prompt may be provided as part of an API call to an external generative output engine. The prompt text may be formatted as a JSON or other similar data format. In response, the generative output engine produces a generative output or response that includes a proposed structured query having a format consistent with the schema compatible to the particular issue tracking platform.

The generative result or output produced by the generative output engine may be displayed in a query region or field 1930. As shown in FIG. 19B, the result is a structured query 1932 that is formatted in accordance with the issue query schema examples provided in the prompt. A list of results 1910 may be updated or generated on execution of the structured query 1932. Each result of the list of results 1910 may be selectable to cause redirection of the graphical user interface 1900 to an issue view or project view associated with the selected result or item. In some implementations, the generative result or output is not displayed and the list of results 1910 is generated automatically in response to entry of the natural language user input.

In the present embodiment, the structured query 1932 is user editable and may be modified before or subsequent to the structured query 1932 being executed with respect to the database or data store of the issue tracking platform. In some cases, the list of results 1910 may be automatically and dynamically updated in response to modifications to the structured query 1932. This may allow the user to adapt the machine-generated query on the fly to achieve the results that are desired. As shown in FIG. 19B, the query region 1930 also includes controls 1934 including feedback controls that can be used to provide positive or negative feedback with respect to a particular result. The feedback may be used to automatically adapt the predetermined query prompt text by adding example pairs that have received a threshold amount of positive feedback or remove example pairs that have received a threshold amount of negative feedback.

The current example, the natural language prompt 1922 includes terms that may not directly translate into query terms. For example, the natural language user input that indicates a reference to a user (e.g., "my," "me," "my team," "our project,") may be modified by the system to replace references to a user with an application call that is configured to extract a user id, user name or other data item that is used by the issue tracking platform. Similarly, natural language user input that indicates reference to a project, team, initiative, site, or other similar reference may be modified by the system to replace references to these items with an application call that is configured to extract a team id, project name, site, or other data item that is used by the issue tracking platform. The system calls may be substituted for the more colloquial words before the natural language input is added to the prompt. In other cases, the system calls may be substituted after the structured query is produced by the generative output engine.

In some cases, potentially personally identifiable information (PII) may be identified by analyzing the natural language user input. Any predicted or potential PII may be extracted from the natural language user input before the user input is added to the prompt. PII may be identified by a generative output engine operating in a zero retention mode or in some cases, may be detected by a business rules engine or regular expression set.

This may provide additional protection against exposing PII outside of the platform, particularly if the generative output engine is provided by a third-party. While many third-party systems do not save received prompts and generative results, extraction of potential PII provides additional security and may be required by some customer operating requirements. The potential PII that was extracted may be added back to the structured query after generation but the generative output engine.

In some implementations, the accuracy or quality of the generative response may be improved by breaking down the natural language user input into smaller more discrete subparts or portions that relate more directly to a structured query clause or part. Thus, in some implementations, the natural language user input is divided into multiple sub-parts or portions, each portion used to generate a separate prompt. The respective results from the prompts can then be recombined or formulated to generate a complete structured query that is executed with respect to the issue tracking platform. In some cases, natural language processing is performed on the user input to identify potentially divisible requests that may be serviced using separate prompts. In some cases, the multiple requests or prompts are dependent such that the result of one prompt is used to generate another prompt. In the scenario of a series of dependent prompts, the results generated by the last prompt may be determined to be the complete structured query.

Figure 20:
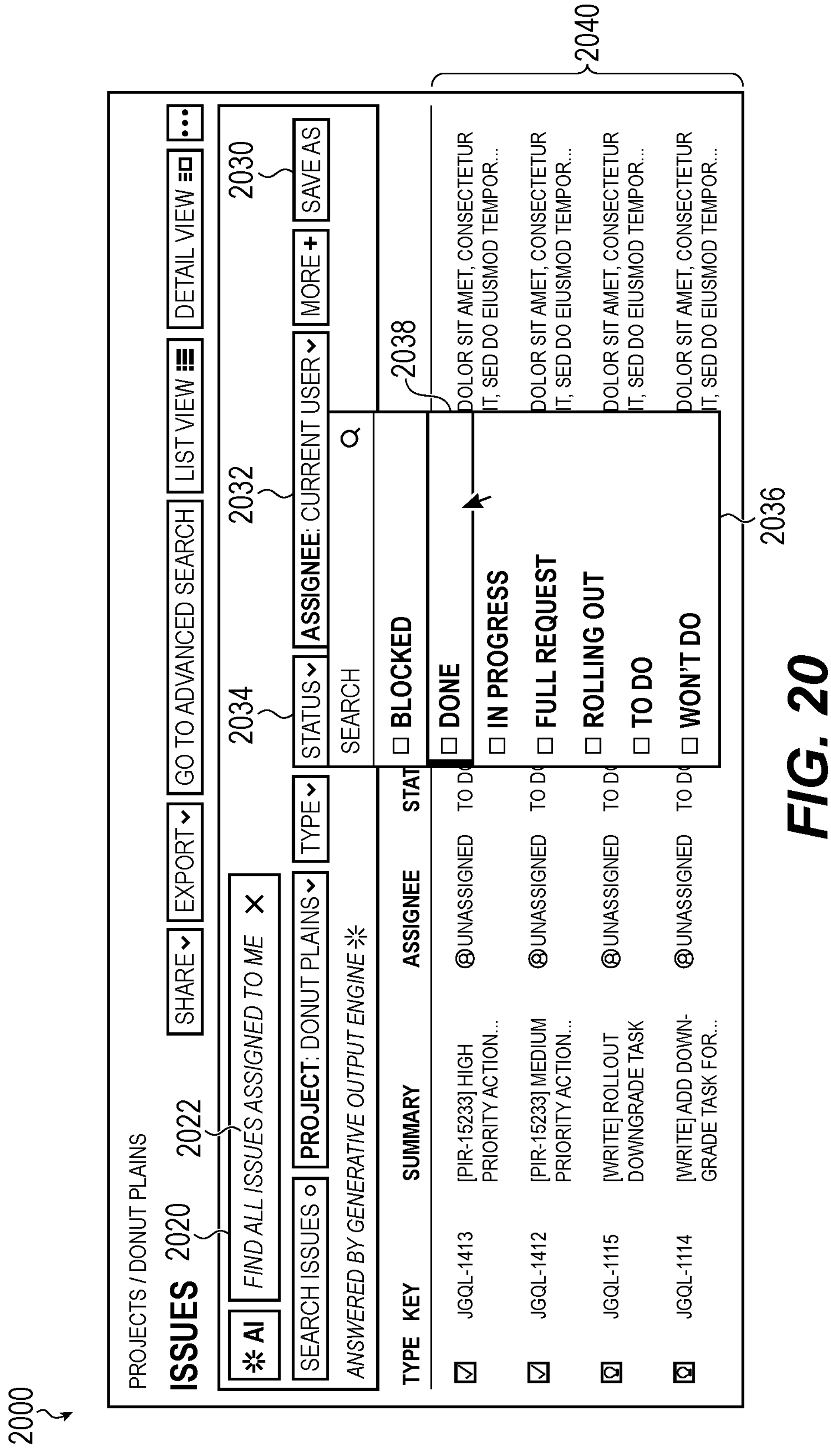
FIG. 20 depicts a set of user interface blocks, which can be generated using a generative output engine and used to execute searches in an issue tracking platform.

FIG. 20 depicts an alternative graphical user interface 2000 that may be used to generate a list of results 2040. Specifically, the graphical user interface 2000 of FIG. 20 includes a set of user interface blocks 2030, which can be generated using a generative output engine and used to execute searches in the issue tracking platform. The set of user interface blocks 2030 can be used as a visual guide or replacement to the structured query described in the previous example. Each of the user interface blocks 2030 is selectable to cause a display of a set of search term options 2036, the set of which are unique to that particular user interface block. By selecting different search term options 2036 for each user interface block, a complete search can be constructed using the settings selected in all of the user interface blocks 2030, in the aggregate.

In the present example, a structured query or other generative response may be obtained in response to a natural language prompt 2022 provided to a user input region or field 2020. Specifically, the system is configured to generate a prompt using at least a portion of the natural language user input. Similar to the previous example, the prompt includes predetermined query prompt text that specifies an issue query schema using one or more of permitted command examples, prohibited command examples, example input-output pairs, or other schema signaling language. The schema signaling language may specify a platform specific or issue tracking-specific schema that is compatible with the current platform. In response, the generative output engine generates a response including a structured query formatted in accordance with the schema query signaling language contained in the prompt.

In the example of FIG. 20, the system may be configured to map elements of the structured query to a set of user interface blocks. Each block may represent a corresponding portion or clause of the structured query. In some cases, the blocks may be configured such that the result of one block is used as input to a dependent or subsequent block. By way of specific example, the natural language input may include the phrase "find all issues assigned to me." In response, the system may substitute a system call for the term "me" so that the search can be executed on data used by the issue tracking platform. Before or after the generation of the prompt, the system may substitute the term "me" with the system call "current_user." The resulting structured query will then include the system call and is used to select a user interface block 2032 corresponding to an "assignee" term and having a "current user" selected as a search term option for the corresponding block 2032.

Once the mapping of blocks has been performed, the mapped blocks may be rendered as the set of user interface blocks 2030 depicted in FIG. 20. In response to rendering the set of user interface blocks 2030, a list of results 2040 (e.g., corresponding issues) may be automatically displayed in the results region. In some cases, the user may confirm or initiate the execution of the query before the list of results 2040 are displayed. The list of results 2040 may also be dynamically updated. For example, as a user modifies the selected search term options or adds or removes blocks 2030, the list of results 2040 may be updated automatically. As shown in FIG. 20, additional blocks can be added by selecting a corresponding control "more+" and the search can be saved using the control "save as." In some cases, the query region (see region 1930 of FIG. 19A-19B) is displayed at the same time as the user interface blocks 2030. An edit to a structured query depicted in the query region may result in a corresponding change to the user interface blocks 2030 and, conversely, a change to the user interface blocks may result on a corresponding change to the displayed structured query. Further, a change to the natural language user input may change the user interface blocks 230 and the list of results 2040.

Figure 21:
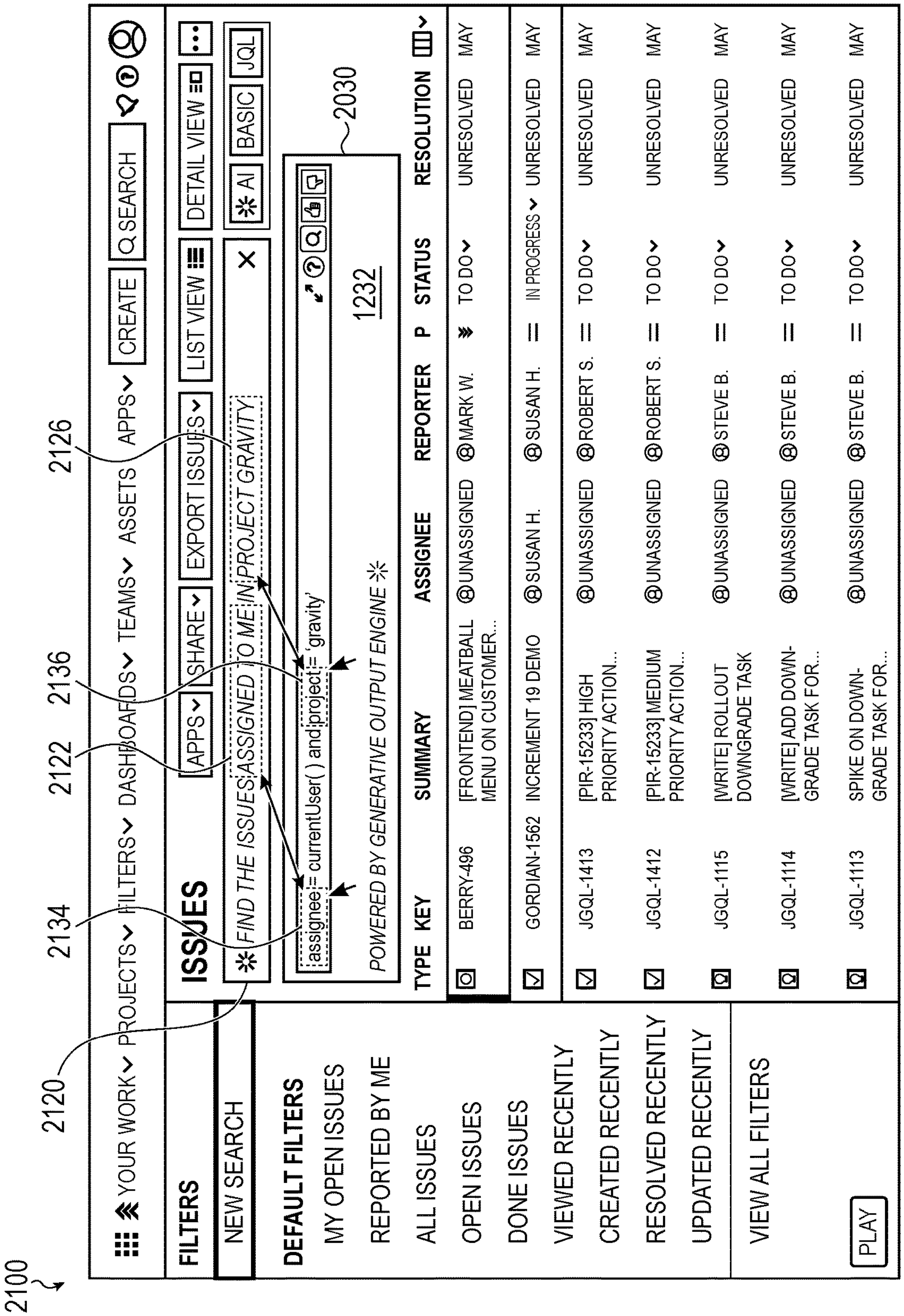

FIG. 21 depicts an example visualization tool for tracking a source of a query term or clause of a generative structured query. As mentioned previously, the graphical user interface 2100 can be used to assist users in constructing their own structured query or modifying a machine-generated query. As shown in FIG. 21, the graphical user interface 2100 includes a user input region 2120 which includes a natural language user input 2122. As described with respect to the previous examples, the natural language user input 2122 can be used to automatically generate a structured query 1232 displayed in a query region 2030. In this example, users can provide a user input with respect to a portion 2134 of the structured query 2132 of the query region 2130 (e.g., a user selection or a hover input), which may result in a display of a visual indicia to a corresponding portion 2124 of the natural language user input. Similarly, a user input provided with respect to another portion 2136 of the structured query 1232 will result in a display of a visual indicia corresponding to another portion 2126 of the of natural language user input. The visual indica may be highlighted, underlined, bolded, or any other visual effect added to the text. The visual indicia may be a display of a framing border, change in color of a local background region, or other indicia that indicates the relative location of the respective portion or portions. Similarly, the respective portions 2134, 2136 may be displayed with a visual indicia in response to the user input. Conversely, a user input to a respective portion (2124, 2126) may cause a respective portion (2134, 2136) to be displayed with a visual indicia. This allows the user to identify which portions of the input result in corresponding portions of the query and allows the user to understand how the query was constructed.

The mapping may be generated as a result of the prompt construction. In one embodiment, the prompt may request that different portions of the query be identified using a special character or other designation, which can be used to construct a map between the input and the query portions. In another embodiment, multiple prompts may be constructed, as described earlier, each prompt corresponding to a different portion of the natural language input. The mapping between the different portions of the input and the resulting portions of the completed query may be maintained by the system and used to provide the visual indicia of FIG. 21. In another embodiment, the mappings between the input and the resulting query may be constructed explicitly either using a special prompt to the generative output engine or using a language processing tool or model.

FIG. 22 depicts another example visualization tool for explaining terms or clauses of a generative structured query. As shown in the graphical user interface 2200 of FIG. 22, in response to a user input provided to a portion 2234 of a structured query 2232 displayed in a query region 2230, an explanation 2242 of a function or operation of the respective portion 2232 may be displayed in a window 2240. The user input may be a user selection input, a hover input, or a selection of an assistance control 2210. The explanation 2242 may be generated in response to a prompt provided to the generative output engine. The prompt may include an extracted portion of the structured query 2232 and additional context provided from the query 2232 or the current session. In some embodiments, the explanations 2242 are prepared in advance and stored for recall in response to a user request.

Dynamically-Generated Content for Task Management Boards

In general, a generative output engine or a similar generative service can be used to generate content for a new project or set of new tasks or issues. FIGS. 23-27B are directed to a graphical user interface examples and techniques for generating a new task management board, generating new tasks or issues, and generating or modifying content for existing tasks or issues of a collaboration system. While the following examples are provided with respect to a particular card-based task or issue management system, the same or similar techniques can be applied to a broad range of collaboration systems. Many of the features previously described with respect to other examples, herein, are not repeated with respect to the present examples to reduce redundancy. However, many of the generative output engine assisted functions described within the present disclosure may be applied to the following examples, as well.

Figure 23:
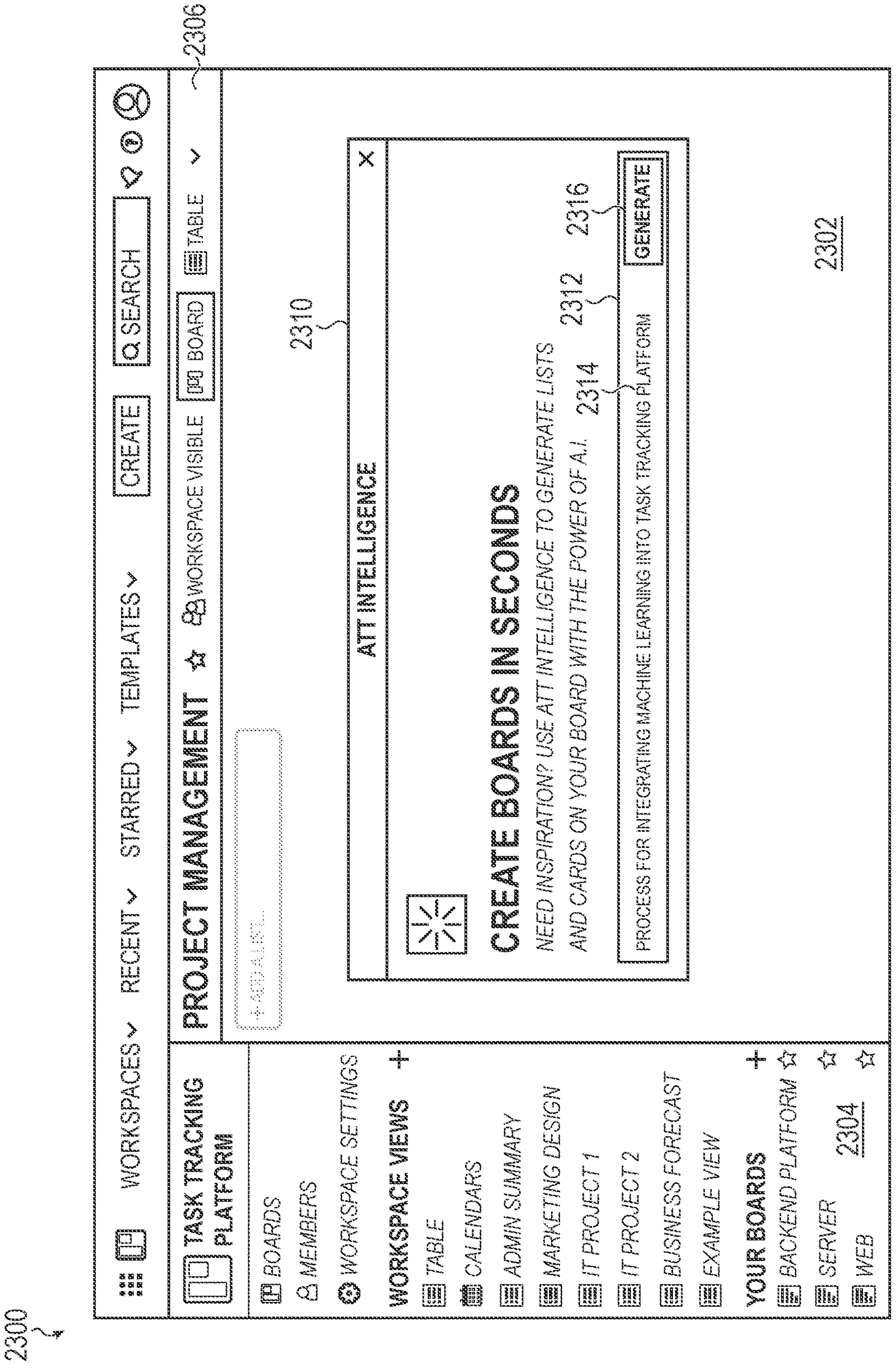
FIG. 23 depicts an example graphical user interface for creating a new task management board.
Figure 24:
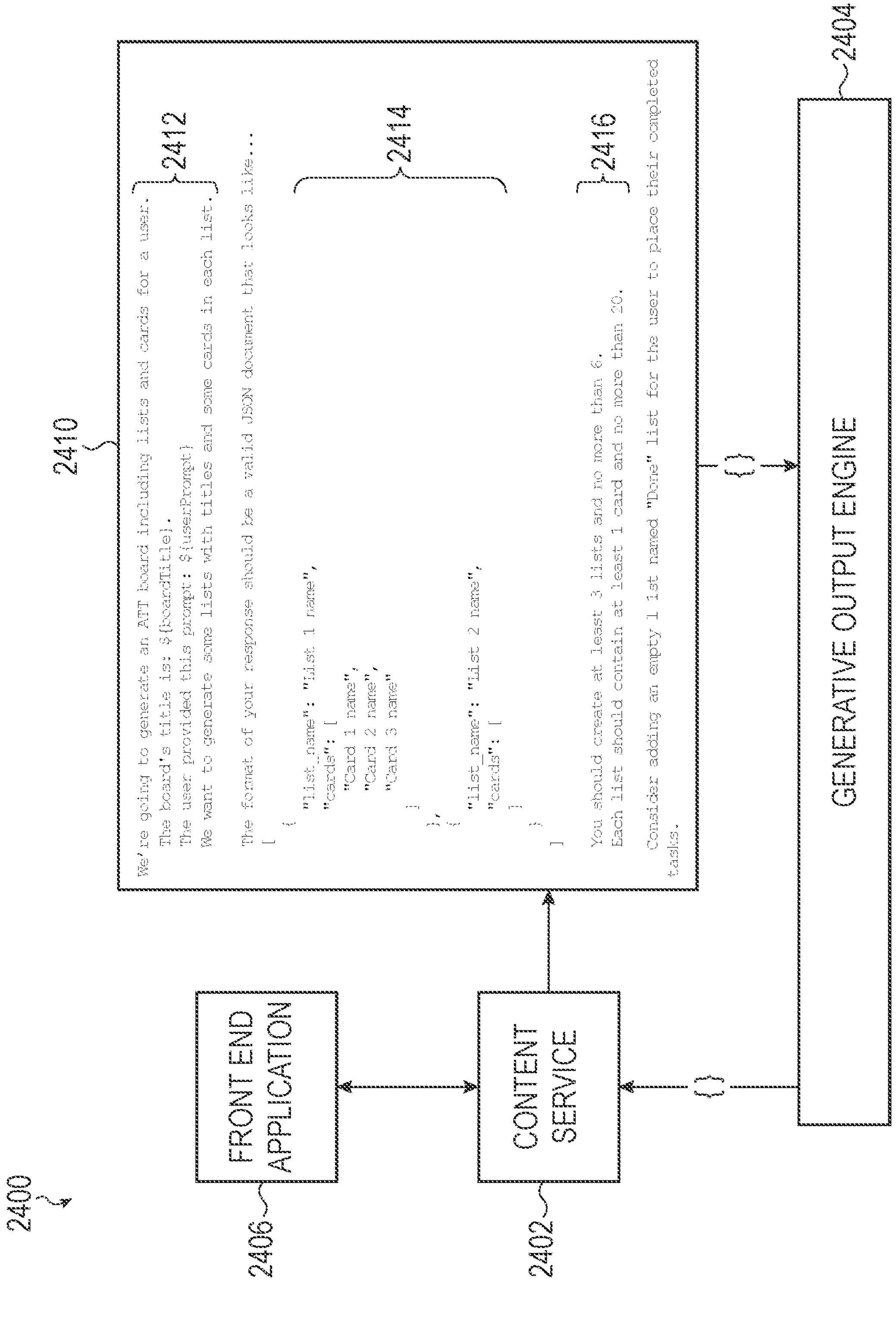
FIG. 24 depicts an example system diagram prompt that can be used to generate a new task management board.

FIGS. 23-24 depict an example user interface sequence for generating a new task management board in a collaboration system. More specifically, the examples provided below are directed to a task or issue tracking platform (example collaboration platform). The example process can be used to generate a wide variety of task management boards using partially-preconfigured prompts provided to a generative output engine. As outlined below, prior user activity and context information extracted from the system may also be used to adapt the creation of a new task management board to the needs of user request.

As shown in FIG. 23, the process may begin when a user provides a natural language input 2314 to a prompt or user input region 2312 of a frontend of the collaboration platform. The user input may specify a topic, a range of example topics, an intended purpose or use case, or other input indicating content, format, or general parameters of a new task management board. As shown in the example graphical user interface 2300 of FIG. 23, the frontend may include an editor or main content region 2302, a navigational region 2304, and a control region or toolbar 2306. The content region 2302 may be used to create new tasks or issues, arrange tasks or issues in accordance with column categories or states, view issue content, or perform other tasks with respect to a task management board. Similar to previous examples, the navigational region 2304 may be used to select different task management boards, projects, teams, or other aspects of the task or issue tracking platform. Also similar to previous examples, the graphical user interface 2300 also includes a toolbar or control panel 2306, which includes various controls for generating objects, publishing content, navigating document spaces, and creating new task management boards.

In the present example, the prompt or user input region 2312 is rendered in a floating window 2310, which may be displayed in response to a selection of a control on the toolbar 2306 or generated in response to a command-line input (e.g., use of a designated character or string) provided to an editor or user input field of the frontend. The floating window 2310 may overlap or overlay content displayed within the content region 2302. The user input region 2312 is configured to receive text input, as well as other forms of input described herein including input generated in response to menu selection or link objects selected using a similar object selection interface, as described herein with respect to other examples.

In response to a user selection of the "generate" control 2316, a new board creation procedure may be initiated. In some cases, portions or all of the user input provided to the user input region 2312 may be extracted for use in generating a board-creation prompt. In addition to the user input, the system may also gather context data extracted from a user profile of the requesting user including, user role, user permissions, application usage, and other user profile information. Additionally, the system may gather other data including data extracted from user event logs indicating system usage and documents edited and/or created. In some cases, the system may also reference user graphs, project or team graphs, or other object graphs to obtain data or content that is used to select predetermined board-creation prompt text. The user input, alone or in combination with any of these other data sources may be used to construct a prompt that is predicted to align with the user's intent indicated in the user prompt and, optionally, also conform with prior system use and other content generated by the same user or another user predicted to be similar to the user for purposes of content creation.

FIG. 24 depicts a simple system schematic 2400 representing creation and use of a prompt in order to generate or modify content in the content collaboration system. In general and similar to other examples described herein, a content service 2402 or other similar service may be used to extract the user input and gather other data used in the selection of preconfigured prompt language or for adapting prompt language for use by the system. As shown in FIG. 24, the prompt 2410, once generated by the content service 2402, may be transmitted or otherwise communicated to a generative output engine 2404. As described previously, the prompt 2410 may be transmitted as part of an application programing interface call and the content of the prompt may be transmitted as a JSON file or other serialized data scheme. In response, the generative output engine 2404 may generate a generative output or generative response that is provided to the content service 2402 as a response to the API including another serialized data component or multiple components. The response or generative output may be adapted by the content service 2402 or other module of the collaboration platform in order to produce the desired content. In this case the desired content is a new task management board. The generated content is provided to the frontend application 2406 in order to render the content in a graphical user interface, as described herein. Specifically, the serialized content of the response may be converted into graphical objects and other native elements of the collaboration platform so that the newly created task management board operates in a fashion that is identical or very similar to a manually created board.

FIG. 24 also depicts an example prompt that can be used to generate a new task management board, as described herein. Specifically, the prompt 2410 includes predetermined query prompt text that may be selected in accordance with context data obtained with the natural language user input or in response to a determination that the user input is directed to particular type or class of board creation prompt. For example, a first prompt with respective predetermined text may be selected in accordance with a determination that the board to be created should be a product development type board. A second prompt with different respective predetermined text may be selected in accordance with a determination that the board to be created should be a Kanban type board, a marketing type board, a business strategy type board, a small project type board, a company initiative or strategic planning type board, a brainstorming type of board, or other type of board predicted to correspond to the user input and other context data. Furthermore, in some instances, each team or individual may adapt their own prompt or set of prompts that have been configured to produce a particular result. All or portions of the natural language prompt is added to the predetermined query prompt text before the prompt 2410 is transmitted or otherwise communicated to the generative output engine 2404.

In the present example of FIG. 24, the prompt 2410 may include multiple types of predetermined query prompt text. Specifically, the prompt 2410 may include a query or request portion 2412, which provides the overall context for the request and general parameters of what should be returned by the generative output engine 2404. As shown in this example, portions of the natural language input text may be incorporated through use of variable placeholders or system calls that may be populated with values from the natural language input text before the prompt is communicated. The prompt 2410 also includes an example text-based schema 2414 defining the preferred schema for the output or response of the generative output engine 2404. In this example, the schema example 2414 specifies a proposed structure for providing a set of multiple task lists and associated card topics for each respective task list. The schema provides example punctuation and syntax, which the content service 2402 is able to interpret and convert into the native objects handled by the collaboration platform. The prompt 2410 also includes other rules and instructions 2416 that specify permitted results and prohibited results in order to further guide the generative output engine 2404. Similar to other previous examples, prompt 2410 may also include example input-output pairs that provide further guidance for expected output in response to specified example input.

Figure 25:
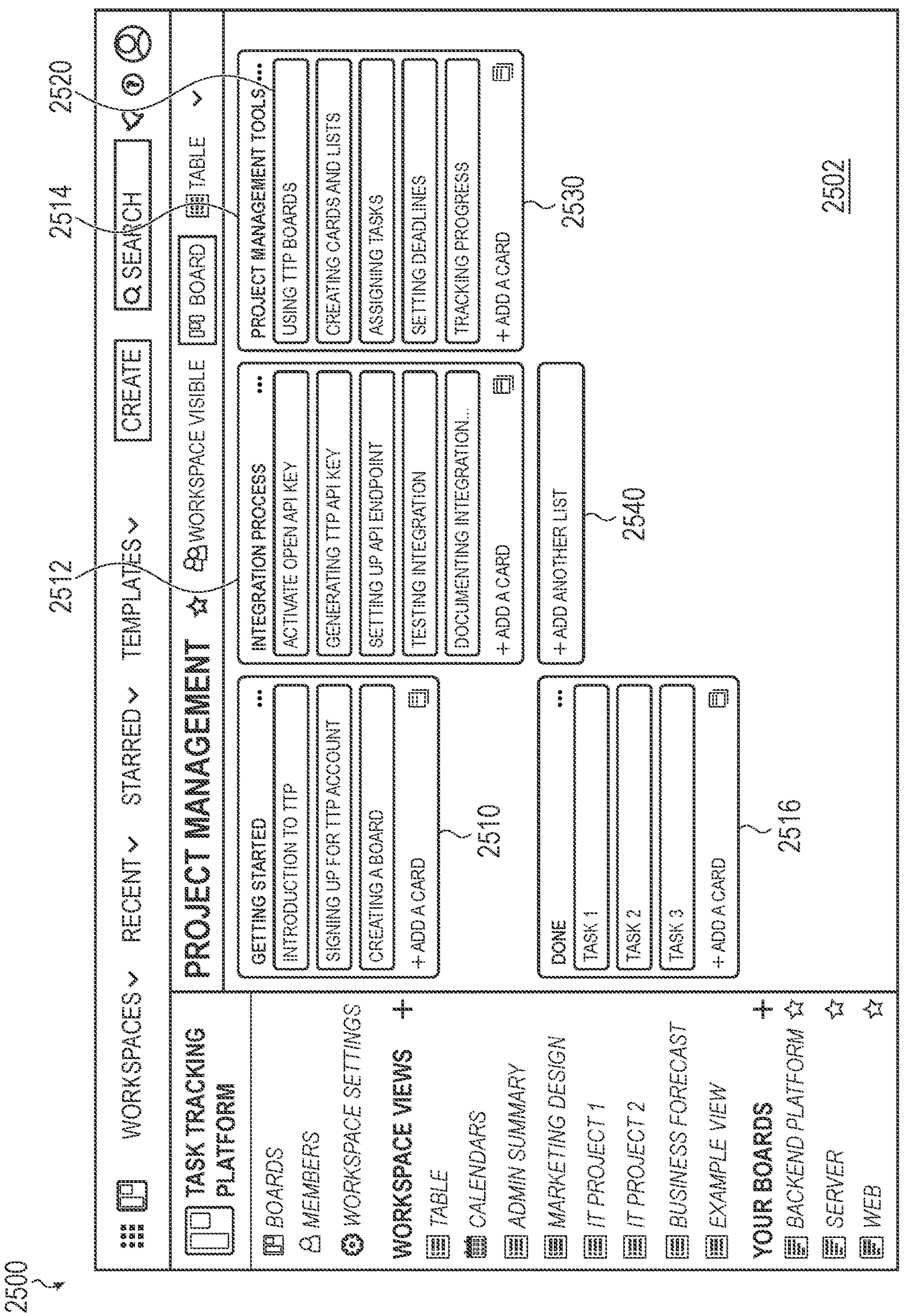
FIG. 25 depicts an example graphical user interface including a new task management board.

FIG. 25 depicts an example graphical user interface 2500 including a new task management board that may be created using the techniques described above. In particular, using a generative response or generative output produced by a generative output engine, the content service may generate the task management board having a set of multiple task stacks 2510, 2512, 2514, 2516 (also referred to herein as task groups, task columns, or task blocks). Each of the task stacks corresponds to a respective list of a set of multiple lists generated by the generative output engine. Each of the task stacks includes multiple task cards 2520 arranged with respect to a respective task stack. Each task card corresponds to a respective card topic of a set of card topic generated by the generative output engine.

Once each of the objects is created using the content service (e.g., 2402) or another respective service, the new task management board may provide the functions of a manually created task management board including the ability to add lists using control 2540 and the ability to add cards using control 2530. Additionally, cards may be repositioned or moved between different task stacks or columns defined by the task stacks using a select-and-drag input or other similar user input. In response to a user moving a particular task card from one task column to a second, different, task column, a state of the task may be transitioned from a first state to a second state. For example, each task column may represent a different stage or state of the task (e.g., unassigned, in progress, under review, complete) and in accordance with a task card being moved through the board, the state of the task card may change within the task or issue tracking platform. As described with respect to other examples described herein, task or issue status can be used to identify what work a particular user is expected to perform and what work has been accomplished.

In some instances, the task management board may be used in an agile software development environment and used to track the pcreatrogress of individuals or groups during multiple sprints or iterations. The task management board may be arranged in accordance with a Kanban or standup board in which the various task stacks, groups, or columns are used to track progress of each task card in accordance with a predetermined workflow or series of states. The current example depicts an illustrative example of a software project development plan in which each of the task stacks, groups, or columns defines a different category of work or phase of the project. Other example task management boards are also able to be generated using the techniques described herein.

Figure 26A:
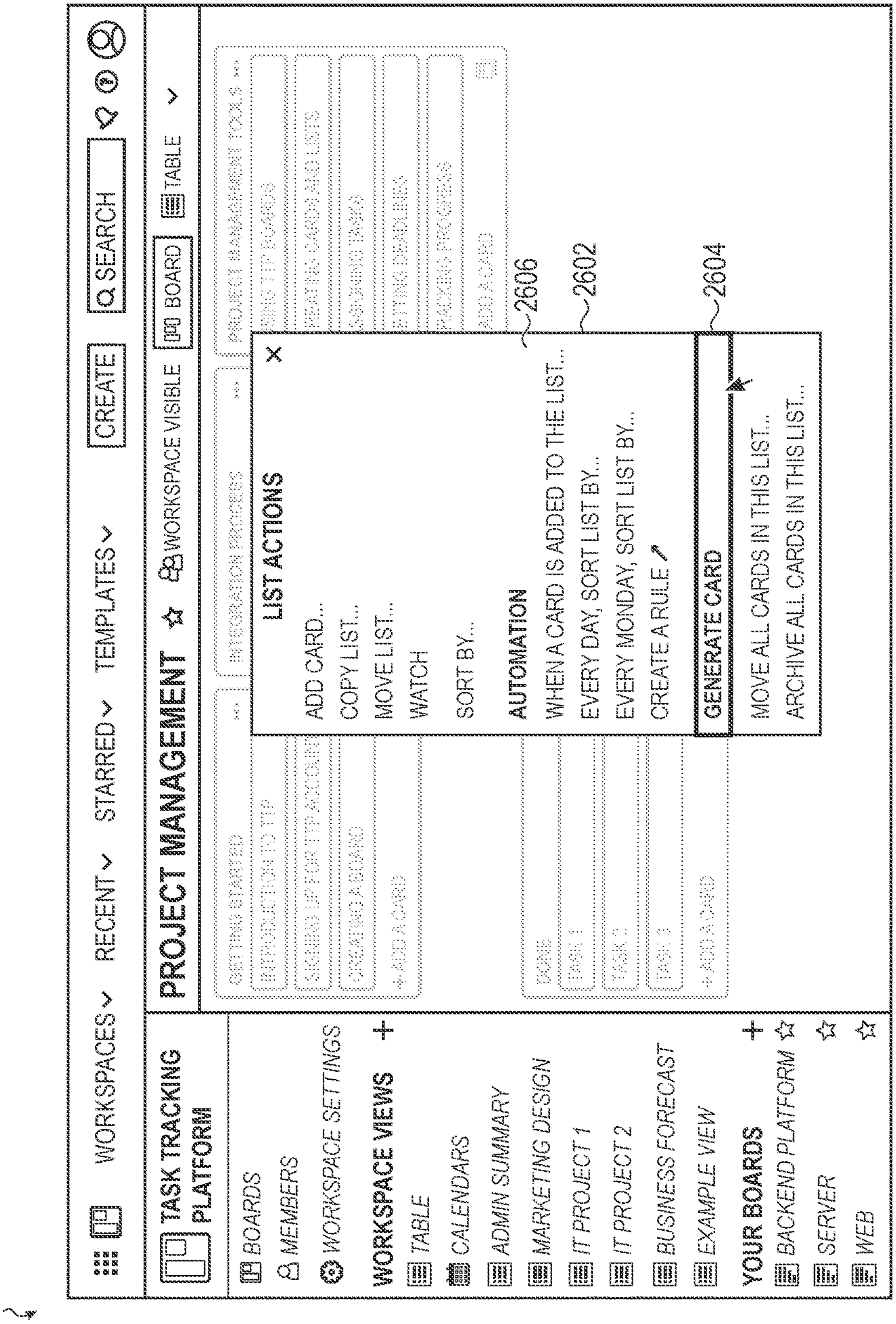
FIG. 26A depicts a graphical user interface including an action window which including a set of selectable options or controls that may be used to initiate the creation of various types of content.
Figure 26B:
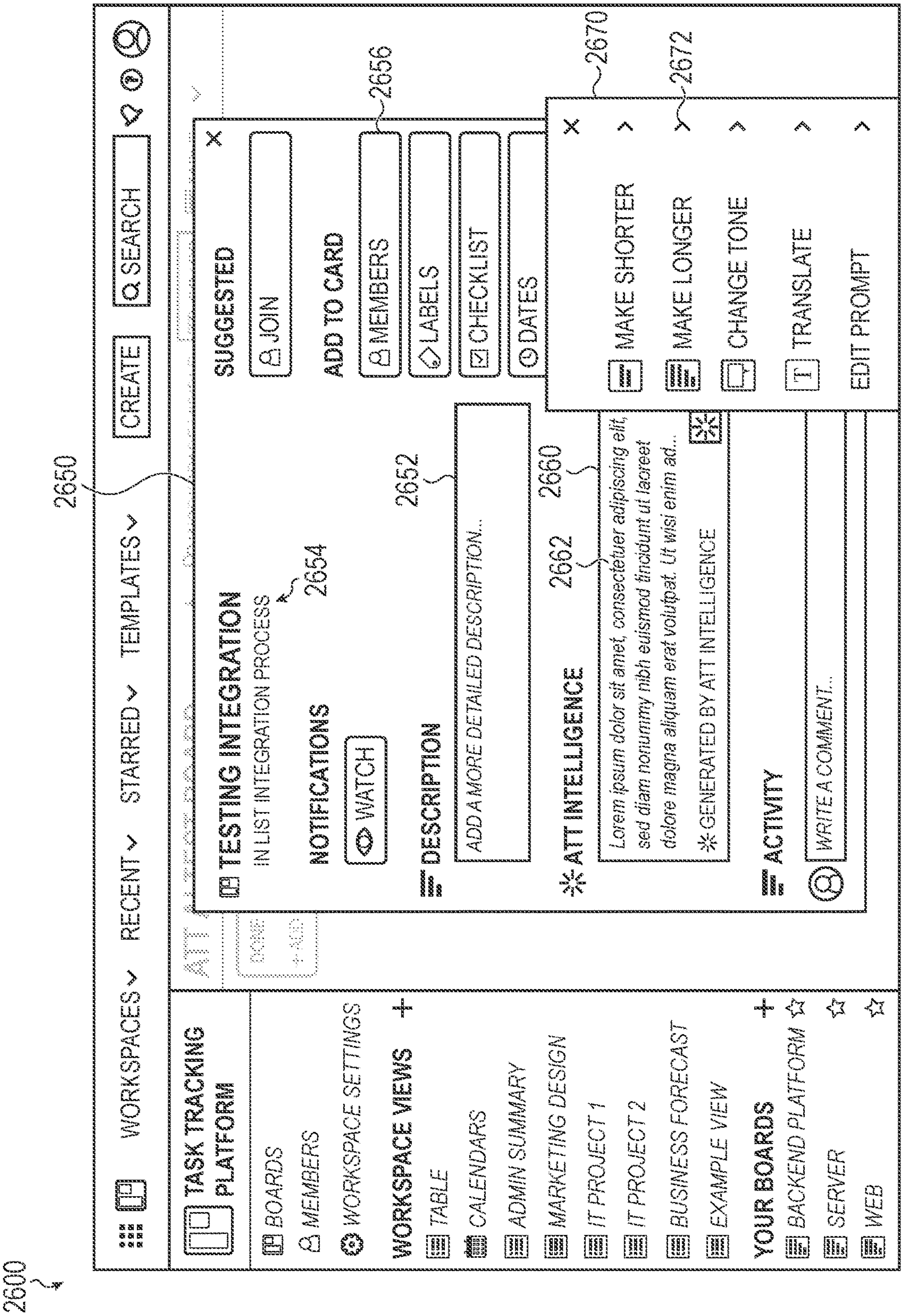
FIG. 26B depicts an example card detail interface and an interface for invoking generative commands.

FIGS. 26A-26B depict an example user interface sequence associated with content creation within an existing task management board. In particular, the example user interface 2600 depicts how a new card may be created using a generative output engine. The graphical user interface 2600 also depicts how a generative output engine can be used to create, edit, or modify content of an existing task card.

As shown in FIG. 26A, in response to a user input or selection of a corresponding control, the graphical user interface may include an action window 2602 which may include a set of selectable options or controls 2604 that may be used to initiate the creation of various types of content. The selectable controls 2604 also define other actions that can be taken with respect to content or objects of a task management board. As shown in the example of FIG. 26A, there may be a separate list of controls 2604 that are associated with automation or machine-assisted content generation (see, e.g., automation designation 2606). The action window 2602 is associated with a list or task stack option. Other similar action windows may be used for other types of objects of the collaboration platform.

In response to a user selection of the "generate card" control 2604, the system may automatically generate a new task card using a generative output engine and the process outlined with respect to FIG. 24. For example, in response to a user selection of control 2604, the system may automatically generate a prompt configured to define a new task card. FIG. 27A depicts an example prompt 2700 that includes predetermined query prompt text 2710 that can be used to generate a new task card that is in accordance with the respective task stack or column and other, previously defined task cards. As shown in the example of FIG. 27A, the prompt 2700 may include variable placeholders that may be populated with data extracted from the task stack or other elements of the task management board prior to communicating the prompt to the generative output engine. Providing the prompt 2700 to the generative output engine results in a generative output that can be converted into a native object, task card by the content service or other aspect of the collaboration platform. In this example, no additional user input is required in order to automatically generate the new task card. However, in other implementation, an interface prompt may be displayed and used to receive natural language user input from the user, which may be added to the prompt to assist in the automatic generation of the new task card. FIG. 23 depicts an example interface prompt having an input region configured to receive user input. The discussion with respect to FIG. 23 can be applied to the present example and a description of the use of input regions and natural language input is not repeated to reduce redundant description. Further, while the present example is provided with respect to the creation of a new task card, a similar technique can be used to generate a new task stack or list, a new group of tasks, or a variety of other objects of the collaboration platform.

FIG. 26B depicts an example card detail interface 2650 that may be displayed in response to the creation of a new task card or in response to a user selection of an existing task card. As shown in the graphical user interface 2600 of FIG. 26B, the card detail interface 2650 includes various regions and elements. Specifically, the interface 2650 includes a card title 2654, a card description region 2652 for displaying a card description, and other regions 2656, which may specify users, teams, projects, software code, features, and other items or objects associated with the task card. Many of the regions, including the task description region, are user editable.

In the example of FIG. 26B, the card detail interface 2650 also includes a generative content region 2660 that may include generative content 2662 produced using a generative output engine in accordance with the techniques described herein. Specifically, in response to a user input, a command selection interface window 2670 may be displayed having a set of selectable command controls 2672. Similar to other examples described herein, the command controls may correspond to content modification or content creation actions including, but not limited to, a description generation action, a title generation action, a length modification action, a tone modification action, a content summary action, a translate action, and other actions described or suggested herein. In response to a user selection of a particular command control 2672, the system may generate a prompt, which is communicated to a generative output engine, which provides the generative content 2662. FIG. 27B depicts an example prompt 2750 including predetermined query prompt text 2760 that can be used to automatically generate a description for the respective task card. As shown in the example of FIG. 27B, the prompt 2750 may include variable placeholders that may be populated with data extracted from the task card or other elements of the task management board prior to communicating the prompt to the generative output engine. Similar to previous examples described herein, the generative content may be used to replace content in the graphical user interface, append to existing content, or may be directed to a clipboard for insertion elsewhere in the platform. While this example is provided with respect to a description of a task card, a similar technique can be applied to obtain generative content for a wide range of content types and elements of the board or platform. Specifically, in some implementations, the same or similar techniques can be used to generate or suggest card titles, task lists, task summaries, and other content.

Virtual Agents and Automated Chat Services

FIGS. 28-33*b* describe systems and techniques that utilize a generative output engine to provide content for an online messaging platform. The following examples can be used to provide technical assistance to users that may submit an inquiry or request for assistance using a request message submitted to a chat interface of a messaging platform. As discussed in the various examples below, a generative output engine and other trained models may be used to identify and generate content that is tailored to the user's inquiry and reduce content searching and access events that may result from traditional technical assistance interactions. The systems and techniques also provide a more efficient user interface for providing access to extensive resources without requiring a user to selectively open and browse individual content items.

Figure 28:
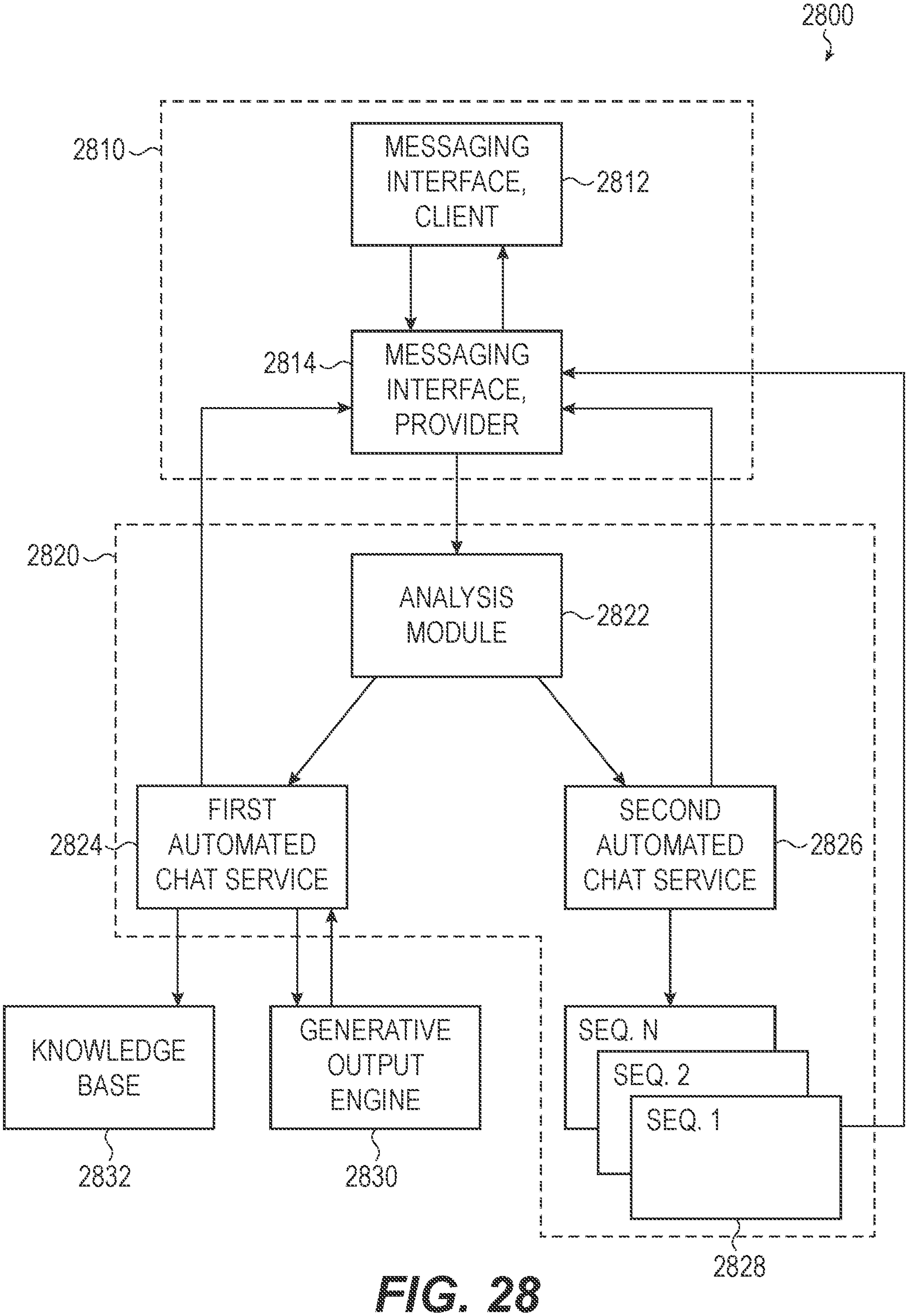
FIG. 28 depicts a schematic of an example system for providing generative content to a user during a chat or messaging session using a messaging platform.

FIG. 28 depicts a schematic of an example system 2800 for providing generative content to a user during a chat or messaging session using a messaging platform. In particular, FIG. 28 includes a messaging platform 2810 that is configured to provide messaging services to a group of users operating a frontend of the messaging platform 2810. Examples of a graphical user interface provided by a frontend of the messaging platform 2810 are depicted in FIGS. 29-31E and 33A-33B. The backend may be provided by a server operably coupled to the frontend applications via a computer network. As shown in FIG. 28, the messaging platform is used to facilitate communications between a client messaging interface 2812 operating on a first client device operating a first instance of the frontend of the messaging platform 2810 and a provider messaging interface 2814 operating on a second instance of the frontend of the messaging platform 2810 operating on a second client device. In some instances, the first client device is operated by a customer or help requester and the second client device is operated by a service provider or ITSM service. Portions of the communications between the client messaging interface 2812 and the provider messaging interface 2814 may be communicated to a content provider system 2820, as shown in FIG. 28. As described in more detail, below, the content provider system 2820 may operate one or more automated chat services that are configured to provide content for the messaging session between the client messaging interface 2812 and the provider messaging interface 2814. As also shown in FIG. 28, the system 2800 may also include one or more external resources including the knowledge base platform 2832 and may also be operably coupled to other services through the Internet or another computer network.

In the example system 2800, selected portions of the messaging session may be directed to different recipients depending on the content of the message or a triggering message (e.g., a request message). In particular, the system 2800 may include an analysis module 2822 that can be used to analyze natural language user input extracted from the messages and determine a content metric used to route the messages to different recipients. The different recipients may be associated with different automated chat services or may be associated with a human recipient. For the purposes of the following disclosure, the term "recipient" may be used to refer to an entity or element of the system that receives at least a portion of the content of a message or messages extracted from a messaging session and is not necessarily a direct recipient of a message in the context of a conversation or series of messages exchanged using the messaging platform 2810. In many cases, the recipients receive copies or extracted portions of messages and provide responses or outbound message content through a common messaging interface 2814 using an application programming interface or integration with the messaging platform 2810. In this way, responses viewed from the perspective of the client messaging interface 2812 may appear to come from a common source or conversation participant, regardless of which recipient is handling the response, as determined by the content provider system 2820. This reduces confusion and allows the use of existing threading functionality of the messaging platform 2810 by simplifying the number of chat participants in a given messaging session. It may also allow for a human operator or different automated chat services to insert messages into the conversation in a more natural or seamless fashion.

In the current example the analysis module 2822 may direct the message content to one of multiple recipients based on a content metric. Specifically, the analysis module 2822 may determine an intent metric for a given natural language user input. The intent metric may be determined using a semantic analysis of the user input and may indicate a conformity or a correlation of a natural language user input with respect to a request type of multiple request types handled by a particular automated chat service. For example, the automated chat service 2826 may be adapted to handle a predefined number of request types using a deterministic or predefined chat sequence that is designed to handle a particular type of issue or technical problem. For each request type, the system may define or obtain a classifying feature set or exemplar request (or set of requests) that can be used to determine a correlation between a particular natural language user input and a request type. In some cases, the analysis module 2822 uses a semantic similarity between the user input and the classifying feature set or one or more exemplar requests to determine the intent metric or score. Other semantic analysis or natural language processing techniques may also be used to determine the intent metric or other content metric used to route the incoming request.

In accordance with the intent metric or other content metric satisfying a first criteria (e.g., meeting or exceeding a threshold), the request message may be forwarded or provided to a particular automated chat service (e.g., the second automated chat service 2826). In response to the intent metric or other content metric failing to satisfy the first criteria, the request message may be forwarded or provided to a different automated chat service (e.g., the first automated chat service 2824). In accordance with the intent metric or other content metric failing to satisfy a second criteria or in response to either of the automated chat services failing to provide a sufficient response, the request message or a portion of the exchange with the first client device may be forwarded or provided to a human operator to conduct a portion or the remainder of the session. Further, even for messages that are handled by one of the automated chat services, response messages may be provided to a human operator before they are transmitted to the client device via the interface provided by the messaging platform.

As shown in FIG. 28, the system 2800 includes at least two different automated chat services 2824 and 2826, which may be configured to handle different types of requests. The system 2800 may also include more than two automated chat services or may include different types of automatic chat services, including any of the embodiments described herein with respect to FIGS. 29-33B. Furthermore, while the system 2800 of FIG. 28 depicts use of a generative output engine 2830, other types of output engines or models may be used in addition to the generative output engine 2830 or instead of the generative output engine 2830.

In the present example, in accordance with the natural language user input correlating to a request type handled by the second automated chat service 2826 (as determined by the analysis module 2822), the request or content from the request may be provided to the second automated chat service 2826. In the present example, the second automated chat service 2826 is configured to provide a deterministic or formulaic response, which may provide a series of predefined responses in response to particular user input or responses to previous prompts provided by the chat service 2826. In this example, the second automated chat service 2826 is configured to select a predefined chat sequence 2828 in accordance with the determined request type. The predefined chat sequence defines a series of response entries that may be selected and presented in accordance with interstitial user input provided via the messaging interface 2812. The chat service 2826 or other aspect of the system 2800 may cause each response entry to be transmitted to the client device via the messaging platform 2810. While each of the predefined chat sequences 2828 have predetermined responses, the sequence of responses and any particular exchange with a client messaging interface may be influenced or modified based on input received from the user. For example, the predefined chat sequences 2828 may correspond to a logical decision sequence in which the next message or entry in a sequence is determined based on a user selection of a set of options or based on a user response to a previous response.

An example predefined chat sequence generated by a chat service is illustrated in the graphical user interface 2900 of FIG. 29. As shown in FIG. 29, the graphical user interface 2900 depicts an example exchange between a client messaging interface and a provider messaging interface, the provider messenger interface operated by an automated chat service similar to the second automated chat sequence 2826 described above with respect to FIG. 28. As shown in the exchange of 2800, the sequence may be initiated in response to an initial request message 2902. In response to an analysis of the natural language user input of the initial request message 2902 and a correlation between the user input and a predetermined request type, the system may select an automated chat service having a series of entries that are predicted to be responsive to an inquiry having the selected request type. In this example, the user input is directed to assistance with a single-sign-on service. The analysis module (e.g., 2822 of FIG. 28) computes or determines an intent metric with respect to a predetermined chat sequence and, as a result, causes response message 2912 to be communicated to the user device via the messaging platform. The response message 2912 may include further questions for the user or selectable options, which may prompt the user for additional user input. The user then provides an example response 2920, selecting an option and/or responding to the prompt. Based on the user input 2920, a next predetermined entry in the sequence is selected to be used as the example response message 2914. The same process continues with additional user input 2972 and the other example messages depicted in the graphical user interface 2900 of FIG. 29. Once the sequence has completed or the user indicates that the issue has been resolved, a feedback feed back-inquiry message 2930 may be displayed, which collects feedback from the user. Based on the feedback, the system may automatically modify the predetermined chat sequence to add or remove entries of flag entries for editing by a user in order to improve the automated chat service for subsequent requests.

Returning to FIG. 28, in response to the intent metric or other content metric (determined by the analysis module 2822) failing to satisfy the criteria, the system may provide the user input to a recipient associated with the first automated chat service 2824. The first automated chat service 2824 may be adapted to provide uniquely generated responses to a user input using a generative output engine 2830 and access to a content data store, such as knowledge base platform 2832. In one example implementation, the first automated chat service 2824 is configured to generate a first prompt comprising first predetermined query prompt text and at least a portion of the natural language user input. The first predetermine query prompt text may include text requesting a keyword search string or formulated query that is adapted to find content items in a content store like the knowledge base platform 2832. In some cases, the predetermined query prompt text includes a sample index or other content associated with the knowledge base platform 2832 in order to help direct the generative output engine 2830. The first prompt is then provided to the generative output engine 2830, which may be operably coupled to the chat service 2824 using an application programming interface or other integration, in accordance with other examples described herein. Similar to other examples described herein, the prompt may be provided to the generative output engine 2830 using a serialized data object, such as a JSON file or other similar object. In response the generative output engine 2830 provides a first response, which includes a set of keywords or a proposed query adapted for use with the content store (e.g., knowledge base platform 2832).

In response to receiving the response from the generative output engine 2830, the first automated chat service 2824 may provide the response as a search query to the knowledge base platform 2832 or other content store. In response the knowledge base platform 2832 or other content store may provide a set of search results, which may include an identifier of a respective set of content items and/or a link to each respective content item. The search results may be provided to the user via the messaging platform 2810 and/or the search results may be further processed by the second automated chat service 2824.

In one example implementation, the second automated chat service 2824 determines a ranking or order of the content items identified in the search results based on, for example, a confidence score, correlation score based on the query, or other similar metric based on a degree of correlation between the query and the respective content item. The ranking or order may also be determined based on the source of the content item, author of the content item, view history of a content item, amount of feedback associated with a content item, or other characteristic if the content item signaling an accuracy of the content. The second automated chat service 2824 may then select a top-ranking subset of content items and perform a semantic analysis of the content of each of the top-ranking subset. In one example, the automated chat service 2824 identifies paragraphs or selected portions of the content that have a semantic similarity or other semantic correlation to the query and/or the natural language user input. In some example implementations, blocks of text or other portions of content are selected based on a semantic similarity satisfying a similarity criteria with respect to the query and/or the natural language user input. These identified paragraphs or portions of the content are then extracted from the respective content item(s) and used to generate a second prompt. The second prompt may include the extracted content along with second predetermined query prompt text, which may include instructions to provide a content summary of the extracted content. The predetermined query prompt text may also include instructions for providing a suggested set of operations or steps that may be described in the extracted content. The second prompt is provided to the generative output engine 2830, which provides a second response summarizing or further processing the extracted content. At least a portion of the second generative response is then provided for transmission to the client device via the messaging platform 2810. The response message generated by the first automated chat service 2824 may also include links to one or more of the top-ranking subsets of content items, content summaries of each respective linked content item, and other content generated using the search results or subsequent prompts provided to the generative output engine 2830.

Figure 30:
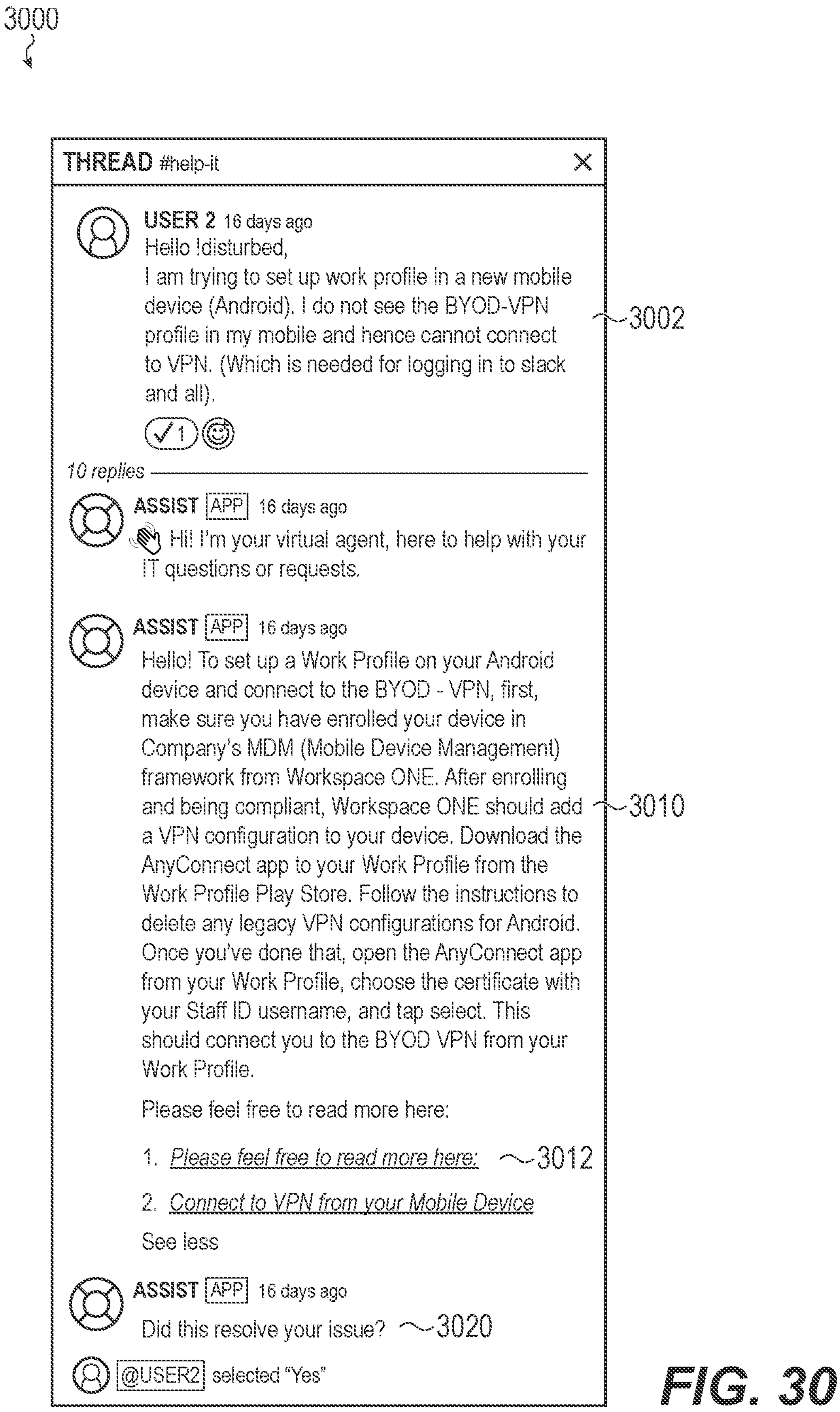
FIG. 30 depicts an example graphical user interface representing an example exchange between a user of a client messaging interface and a provider messaging interface.

FIG. 30 depicts an example graphical user interface 3000 representing an example exchange between a user of a client messaging interface and a provider messaging interface, which is operating a first automated chat service, in accordance with the description provided above. As shown in FIG. 30, the sequence may be initiated by an initial request message 3002 provided by a client device operably coupled to the messaging platform by a client application or frontend. In accordance with an analysis of the natural language input of the request message 3002, an automated chat service may be selected and the request message may be processed as described above with respect to FIG. 28. Specifically, the automated chat service may identify top-ranking content items, extract select content from the top-ranking content items, and generate an aggregate or composite content summary 3010, which is caused to be transmitted to the client device via the messaging platform. As shown in the example output of FIG. 30, the automated response may also include links and other content 3012 and a request for feedback or indication of resolution 3020. The feedback may be used to terminate the automated chat service or may be used to conduct additional exchanges with the user. The feedback may also be used to improve the automated chat service by flagging useful or particularly responsive content or by flagging less useful or less responsive content, which may be taken into account by the system when selecting tap-ranking results in subsequent operations or exchanges with users.

FIGS. 31A-31E depict alternative responses that may be generated using an automated chat service. In particular, the example responses may result from a selection of a particular automated chat service based on an initial analysis of the natural language user input, as described above with respect to FIG. 28 or, alternatively, may flow directly as a result of a user input or request submitted to the system. In one example embodiment, one or more of the user interfaces or generative responses depicted in FIGS. 31A-31E may be generated using aspects of the system 2800 described above with respect to FIG. 28.

Figure 31A:
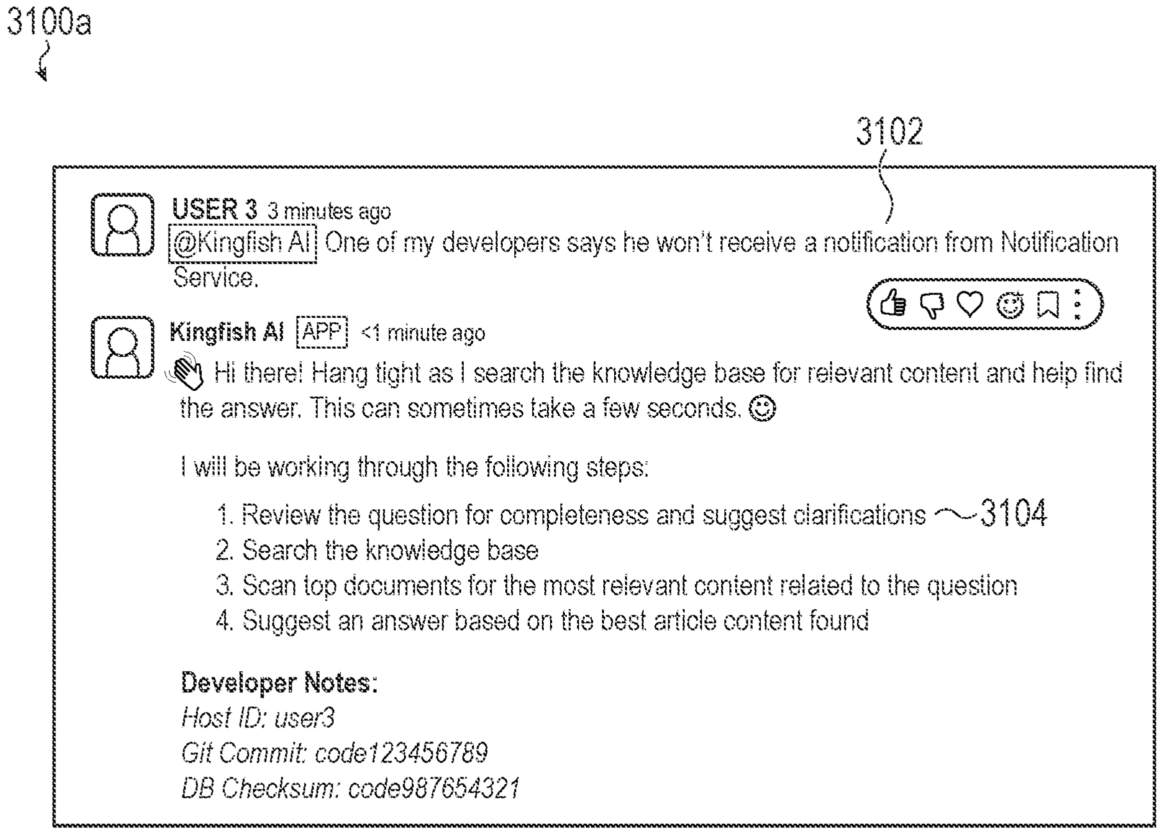

FIG. 31A depicts an example graphical user interface 3100*a* that includes an initial user-generated request message 3102 including a natural language user input provided to a chat interface of a messaging platform. In response, the request message or a portion of the request message may be forward to an automated chat service that provides an initial response 3104, which outlines a series of responses that may be generated using the automated chat service. In some cases, the user may response to the display of the outlined sequence in order to select which responses to see or to request other responses, not included in the outline.

Figure 31B:
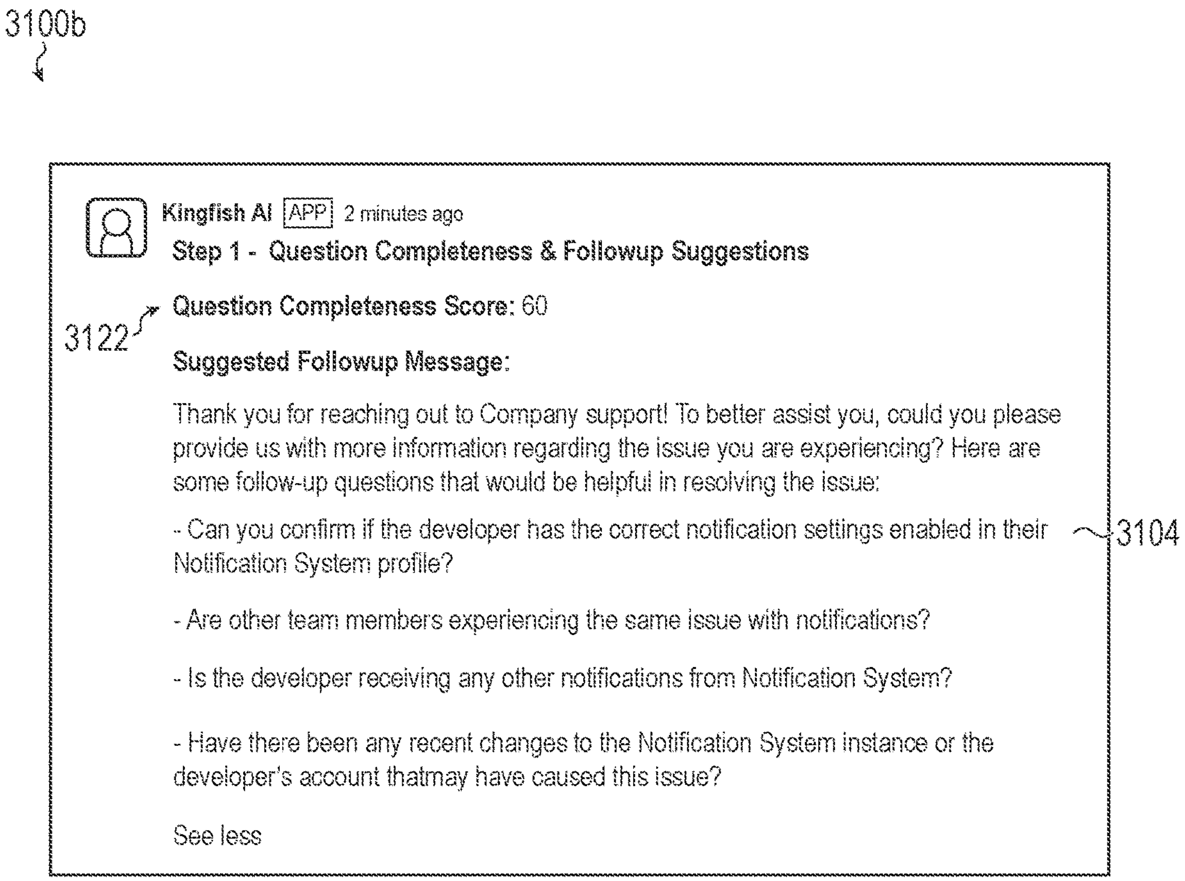

FIG. 31B depicts an example graphical user interface 3100*b* that may be produced in response to the request message 3102 of FIG. 31A. In particular, the interface 3100*b* includes a response 3120 that includes a computed completeness score 3233 based on the user input of the initial request message 3120. The completeness score 3233 may be based on a semantic analysis of the natural language user input and indicate a level of specificity of the inquiry. Similar to the intent metric or content metric described above, the completeness score 3233 may analyze the natural language user input and determine a degree of correlation to an example query or historical set of inquires that have either been determined to be sufficiently detailed or have an amount of detail that corresponds to a particular completeness score. The completeness score may be determined using a trained model, trained on previous user requests and resulting exchanges including the number of follow-up questions required, resolution of the issue, and/or feedback received from a previous user.

In response to the completeness score failing to satisfy a criteria (or satisfying an incompleteness criteria) the automated chat service may generate a prompt to be provided to the generative response engine. The prompt may include predetermined query prompt text and a least a portion of the natural language user input. The predetermined query prompt text may include a request for series of proposed queries that follow from the query described in the natural language user input. This prompt is provided to a generative output engine, as described previously, and the generative response may be used to create the response 3120, which includes a series of suggested questions or proposed queries that can be used to further define the problem experienced by the user. Similar to previous examples, the response 3120 is provided for transmission to the client device using the messaging platform. In response, the user may select one or more of the proposed questions to be added to or to replace the initial request message. If the user modifies the request manually or selecting one or more of the proposed questions, the sequence may be repeated until a satisfactory question completeness score 3122 is achieved. In some embodiments, the system generates the series of suggested questions or proposed queries 3120 regardless of the completeness score such that the user can review additional questions even when the initial request may be predicted to be sufficiently complete to obtain a successful resolution. Also, in some implementations, the completeness score may be computed but not displayed to the user.

Figure 31C:

FIG. 31C depicts an example graphical user interface 3100*c* that may also be produced in response to the request message 3102 of FIG. 31A. Specifically, the automated chat service may conduct a search of a knowledge base or other content store using the original user input or a modified user input resulting from an exchange similar to as described above with respect to FIG. 31B. The automated chat service may obtain a set of results and evaluate each of the results to compute a score or content metric. In this example, the chat service is configured to compute a Euclidian distance between a vector of the user input and a vector of the respective content item. Other content metrics may include a Jaccard similarity, cosine similarity, confidence score or other metric representing an analysis of the user input with respect to content of the identified content item. As shown in the example of 3100*c*, the response also includes links to each of the content items identified in the search along with a descriptive title, which may be extracted from the content item or metadata of the content item. In some implementations, the results are further processed to display only those results having a permissions profile that is consistent with a permissions profile of an authenticated user, as described herein with respect to other examples.

FIG. 31D depicts an example graphical user interface 3100*d* that may also be produced in response to the request message 3102 of FIG. 31A. Similar to previous examples, the automated chat service may execute a search of a knowledge base platform or other content store and identify a list of top-ranking results. In the example of 3100*d*, a link 3142 of each result is included in the response 3140 along with a content summary 3144. The content summary 3144 may be generated using a prompt that includes predefined input query text and content extracted from the respective content item. In some cases, the prompt also includes context data including data corresponding to a role of a user, historical system usage, or data determined from a user profile or team profile. As with previous examples described herein, the prompt may be provided to a generative output engine, which generates a generative response including a content summary in accordance with the predefined input query text. The length of the summaries or detail of the summaries may be adjusted by selecting different predefined input query text or performing subsequent content summary operations.

FIG. 31E depicts an example graphical user interface 3100*e* that may also be produced in response to the request message 3102 of FIG. 31A. Specifically, the automated chat service may generate a response 3150 that includes a proposed answer that is generated using the generative output engine, in accordance with the examples described herein. As shown in 3100*e*, the response 3150 may include a list of proposed actions or tasks that may be generated in response to a specially constructed prompt that includes one or more excerpts from top-ranking content items and predetermined query prompt text that requests a list of proposed steps or actions to be performed based on the provided text excerpts. In some implementations, the automated chat service is configured to determine a set of proposed actions or tasks that present alterative solutions to the user's request message. The sets of proposed actions may be arranged in accordance with a ranking of the respective content items used to generate each set of proposed actions.

Similar to previous examples, the automated chat service may request feedback from the user. The feedback may relate to the overall solution that was provided or may relate to specific content items or content item summaries that were generated. The system may be configured to adapt future responses to account for user feedback. For example, in response to user feedback provided to the messaging platform, the system may promote or demote respective content items within the ranked search results. Similarly, the system may blacklist or exclude content that is determined to be non-responsive or out of date based on user feedback. The system may also whitelist or promote respective content items that receive sufficient positive user feedback or result in a threshold number of successful resolutions.

Figure 32:
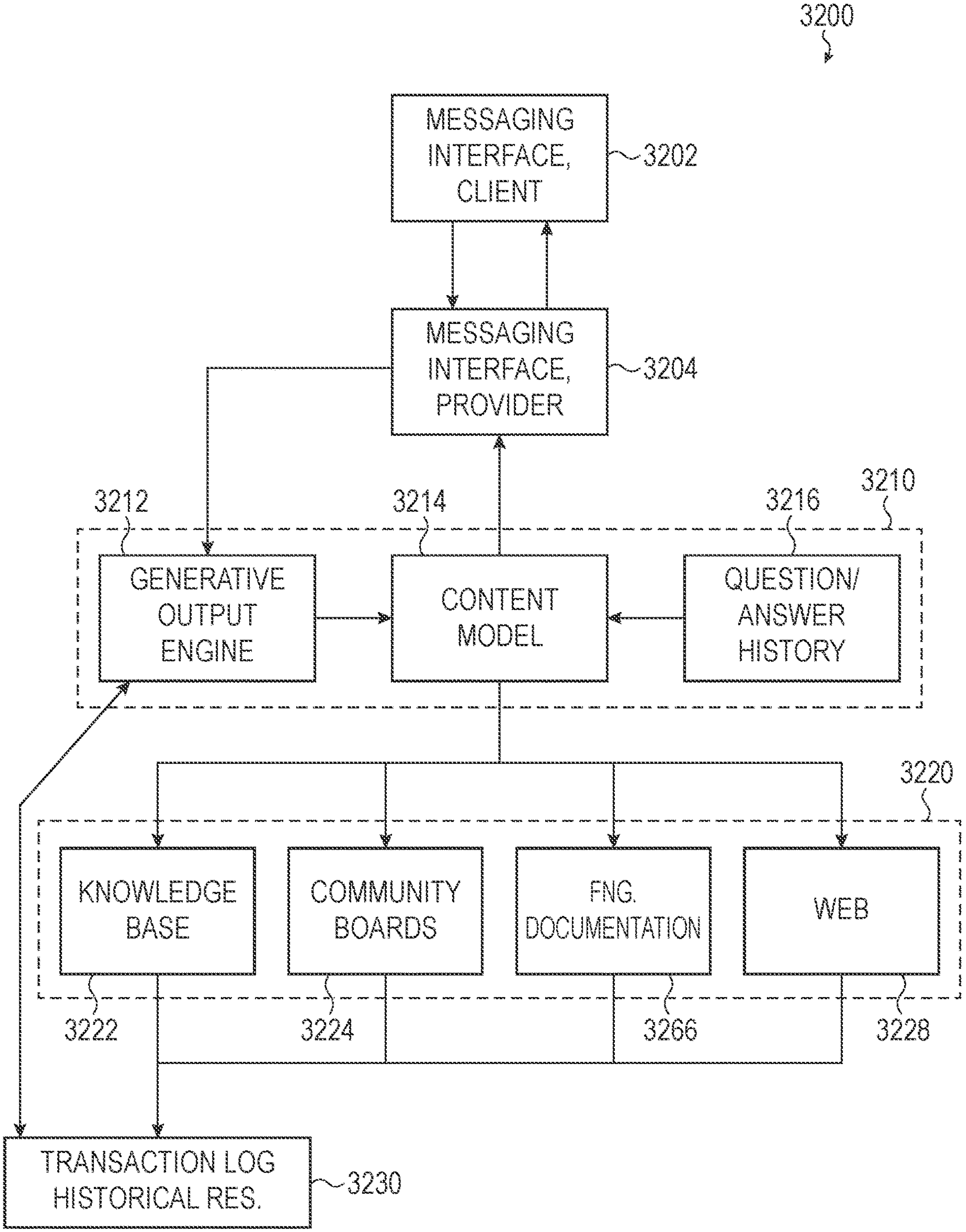
FIG. 32 depicts a simplified system diagram of an automated chat interface of a messaging platform.
Figure 33A:
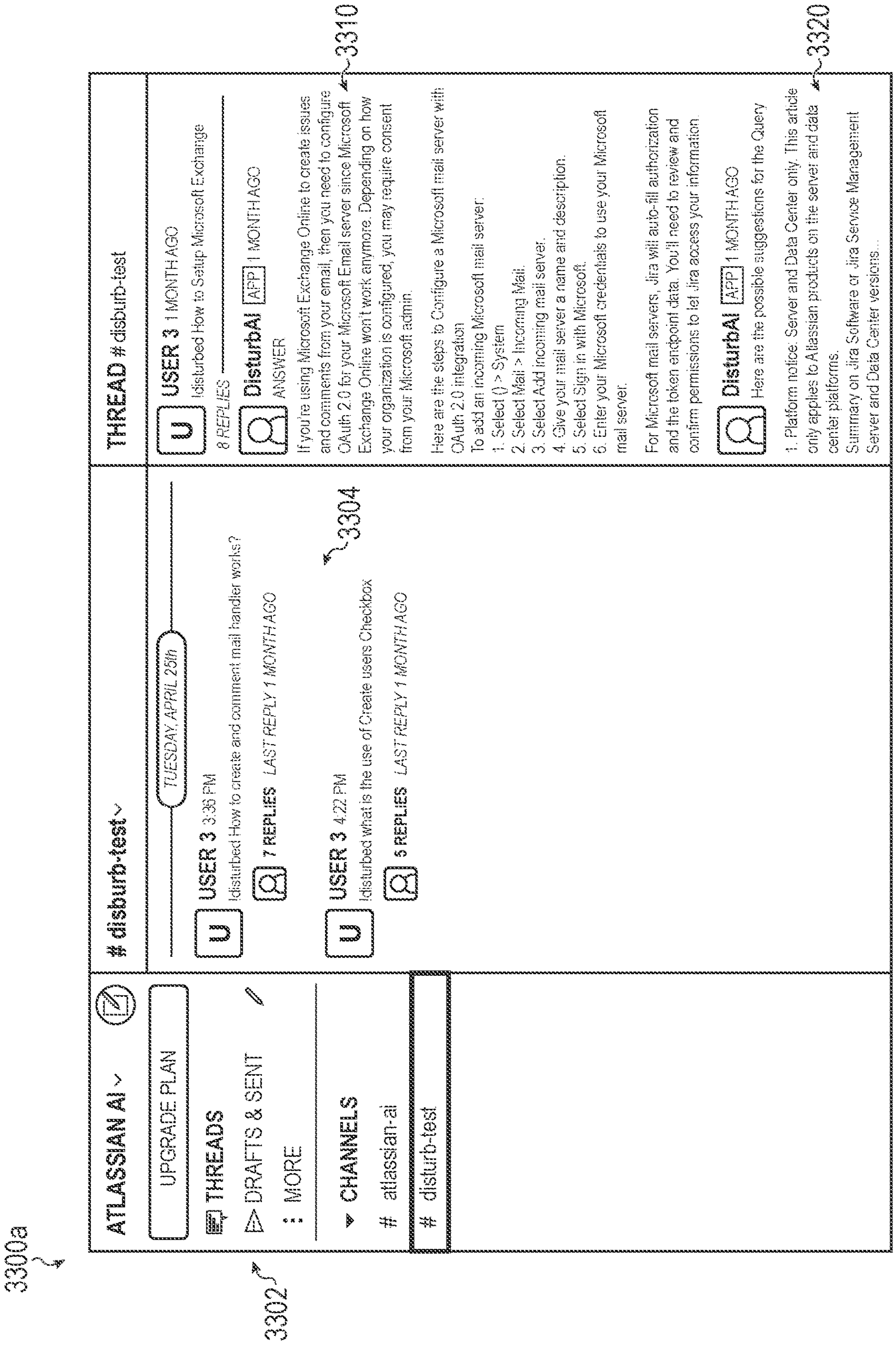
FIGS. 33A-33B depict a graphical user interface rendering a summary of results and a list of links to identified content items.
Figure 33B:
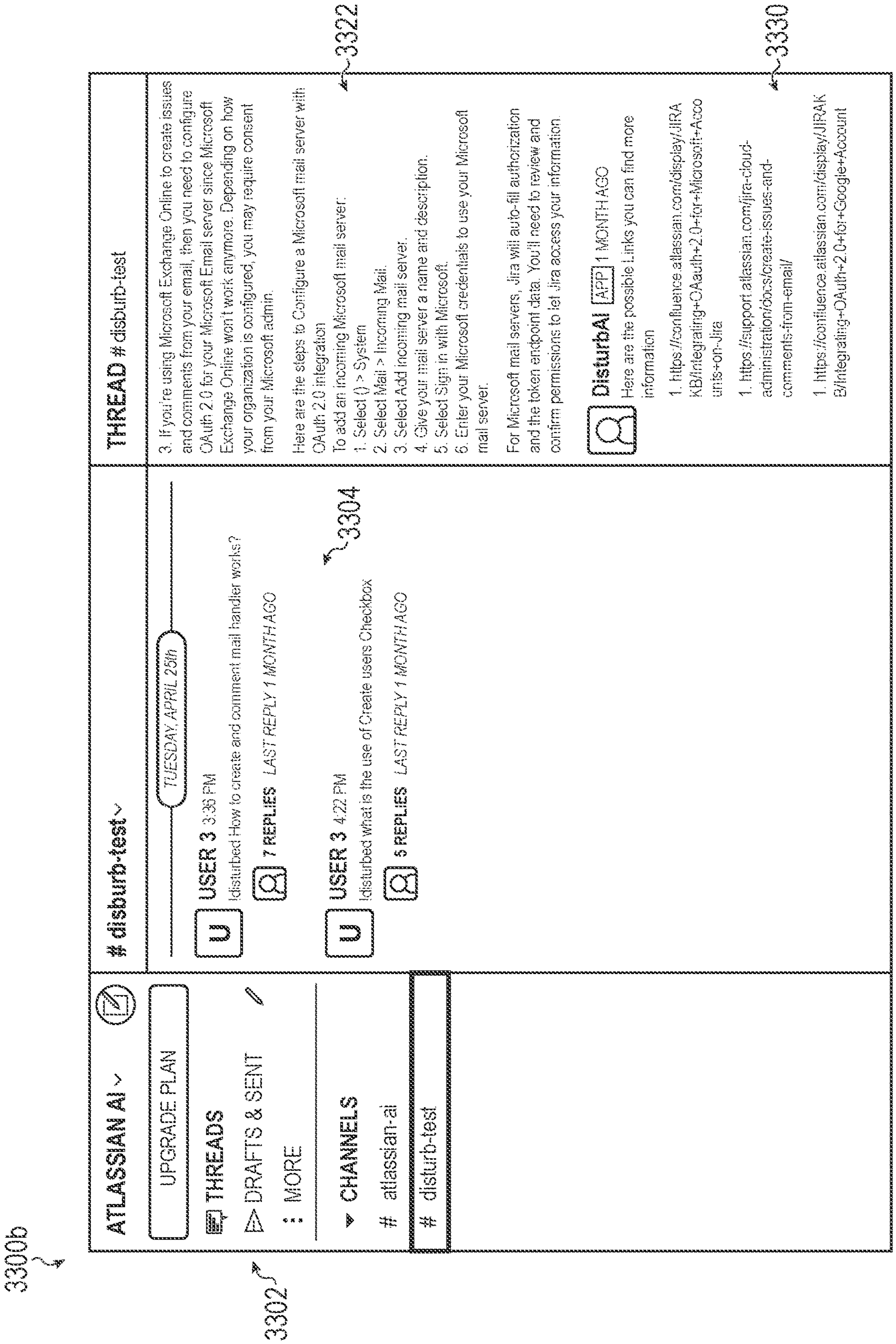

FIGS. 32-33B depict a system 3200 and corresponding graphical user interface 3300*a* and 3300*b* that use another automated chat service for providing content and automated assistance to a user request message. The following examples use multiple models of output engines in order to provide content to the user. Specifically, the system 3200 includes a generative output engine 3212 and also a content model 3214. Each of these models of output engines may be adapted for different purposes and may be trained using different training sets to help adapt each engine or model to perform in accordance with the system 3200.

Similar to the previous examples described above, the system 3200 includes a client messaging interface 3202 and a provider messaging interface 3204, a description of each is not repeated in this example to reduce redundancy. In this example, an automated chat service 3210 is used to provide generated responses in an automated exchange with the client messaging interface 3202. In one example implementation, the automated chat service 3210 uses a first model or engine (e.g., the generative output engine 3212) to produce an initial response or answer overview. The automated chat service 3210 may then use the initial response or answer overview as an input to a second model or engine (e.g., the content model 3214), which may be used to select a curated set of content items that correspond to the initial response or answer overview. Additionally, the first model or engine (or an externally accessed generative output engine) may be used to compute content summaries of each of the identified results, in accordance with other examples provided herein. Last, a final answer or response may be provided including links to the respective content items and other content that may be generated in accordance with the examples described herein.

In the present example, a generative output engine 3212 is used to generate an initial answer overview (see, e.g., the example answer overview 3310 of FIG. 33A). The system 3200 is configured to produce the answer overview using a prompt comprising predetermined query promote text and at least a portion of the natural language user input. The generative output engine 3212 may be an external large language model, as described with respect to other examples. In some cases, the generative output engine 3212 is an integrated service that includes a predictive model trained using data extracted from a set of content sources 3220. In particular, the predictive model may be trained using a transaction log or historical issue resolutions, which may improve correlations or predictive output that corresponds to content that has been successful in previous interactions. The generative output engine 3212 may be adapted to predict a next word, phrase, or other portion of content as the generative output engine 3212 constructs the initial answer overview. As with previous examples, user feedback provided via the messaging platform or through another interface may be used to improve or train the predictive model of the generative output engine 3212. The initial response or answer may be provided for transmission to the client device via the messaging platform, as described herein with respect to other examples.

In one example implementation, the initial answer or response is also provided to a content model 3214, which may include a transformer model that is trained using a set of historical question-answer pairs 3216. The transformer model may include a bidirectional encoder representations from transformers (BERT) model or other similar natural-language processing model. In this example, the content model 3214 is formulated to select content items from a set of content source 3220 based on a provided answer (e.g., the initial answer generated by the generative output engine 3212). By training the transformer model using historical question-answer pairs developed by the same or a similar ITSM service, the selected content items are likely to have an improved relevance and accuracy as compared to some other traditional search methodologies (e.g., using a standard keyword search or web-based search technique). The top-ranking content items may be provided for transmission to the client device via the messaging platform, as described herein with respect to other examples. Example responses 3320 and 3322 of FIGS. 33A and 33B, respectively, illustrate example responses that may be generated by the content model 3214. Similar to as described above with respect to other examples, a summary for each of the respective content items may be generated using the generative output engine 3212 or a different generative output engine (e.g., a separate external generative output engine). Links to the content items and the summaries may be provide for transmission to the client device in a response message or series of response messages.

In the example of FIG. 32, the set of content items 3220 may include multiple content sources including, without limitation, a knowledge base 3222 including a content store of knowledge base content items, community boards 3224 including messages, postings, and other content extracted from community message boards and forums, engineering documentation 3266 including product descriptions, engineering specifications, and other product documentation, and publicly available content 3228 available from the web or other publicly accessible source.

In some implementations, the system 3200 of FIG. 32 may be used in conjunction with the system 2800 of FIG. 28 to provide an automated response to a request message. Specifically, the automated chat service 3210 may be selected as a result of an analysis of the natural language input of the request message. Specifically, the request message or a portion of the message may be provided to a recipient operated by the automated chat service 3210 in response to an intent metric or other content metric satisfying a criteria. In some cases, the criteria includes a series of thresholds or rules that are used to direct the request message to a respective automated chat service, of a set of available services or direct the request message to a human operator.

FIGS. 33A-33B depict example interfaces 3300*a* and 3300*b* that may be produced using the system 3200 described above with respect to FIG. 32. Specifically, interface 3300*a* includes a navigational region 3302, a main thread or message region including one or more request messages 3304 and a thread-specific region including one or more machine-generated responses 3310, 3320. As described above with respect to FIG. 32, the system 3200 may generate an initial answer 3310 in response to a particular request message 3304 using a generative output engine and the above-described techniques. The system 3200 may also generate one or more response messages 3320 of FIG. 33A and 3322 of FIG. 33B using a content model and the above-described techniques. The response messages 3320 and 3322 may include content excerpts, content summaries, and content links for top-ranked or a curated set of content items identified using the content model. Also, as shown in FIG. 33B, the system may generate a final answer or response 3330, which may include a summary of the results and a list of links to the identified content items.

As shown in FIGS. 33A-33B, the automated response system may be initiated using a designated character or string (e.g., "!disturbed"), which may designate a channel, recipient, or integrated service provided by the messaging platform. The system may include multiple designated characters or strings that may invoke different services that are adapted to provide different types of responses. For example, the system may also provide a look-up service that returns project names, user names, and/or, other resources in response to a command character. In one specific example, a designated phrase "/whoowns" is used to initiate the use of a classification model that is adapted to return corresponding user names, teams, or project codes that correspond to an input string following the designated phrase.

The techniques describe above with respect to FIGS. 28-32A may be combined in a variety of ways in order to construct a system that is adapted for use by a particular customer or tenant and are not limited to the specific examples and sequences, described above. Furthermore, other techniques described above for identifying relevant issues and generating content summaries, task lists, decisions and other items may also be incorporated into the automated chat services, described with respect to FIGS. 28-32A.

Figure 34:
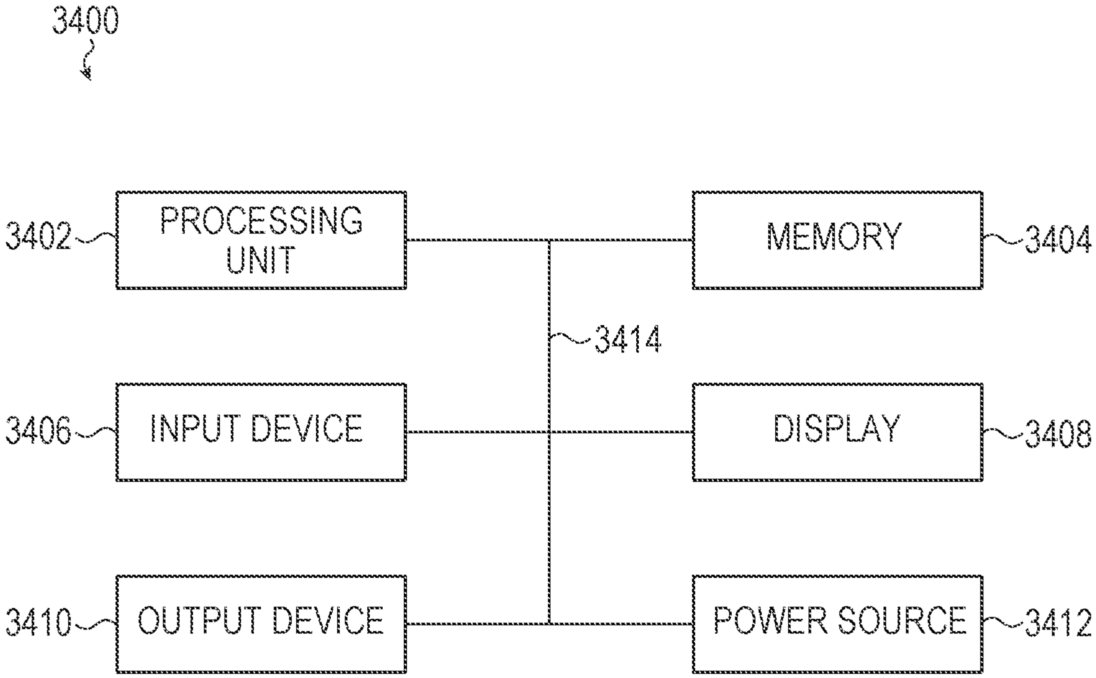
FIG. 34 shows a sample electrical block diagram of an electronic device that may perform the operations described herein.

FIG. 34 shows a sample electrical block diagram of an electronic device 3400 that may perform the operations described herein. The electronic device 3400 may in some cases take the form of any of the electronic devices described with reference to FIGS. 1, 2A-2E. 3, and 4, including client devices, and/or servers or other computing devices associated with the collaboration system 100. The electronic device 3400 can include one or more of a processing unit 3402, a memory 3404 or storage device, input devices 3406, a display 3408, output devices 3410, and a power source 3412. In some cases, various implementations of the electronic device 3400 may lack some or all of these components and/or include additional or alternative components.

The processing unit 3402 can control some or all of the operations of the electronic device 3400. The processing unit 3402 can communicate, either directly or indirectly, with some or all of the components of the electronic device 3400. For example, a system bus or other communication mechanism 3414 can provide communication between the processing unit 3402, the power source 3412, the memory 3404, the input device(s) 3406, and the output device(s) 3410.

The processing unit 3402 can be implemented as any electronic device capable of processing, receiving, or transmitting data or instructions. For example, the processing unit 3402 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 3400 can be controlled by multiple processing units. For example, select components of the electronic device 3400 (e.g., an input device 3406) may be controlled by a first processing unit and other components of the electronic device 3400 (e.g., the display 3408) may be controlled by a second processing unit, where the first and second processing units may or may not be in communication with each other.

The power source 3412 can be implemented with any device capable of providing energy to the electronic device 3400. For example, the power source 3412 may be one or more batteries or rechargeable batteries. Additionally, or alternatively, the power source 3412 can be a power connector or power cord that connects the electronic device 3400 to another power source, such as a wall outlet.

The memory 3404 can store electronic data that can be used by the electronic device 3400. For example, the memory 3404 can store electronic data or content such as, for example, audio and video files, documents and applications, device settings and user preferences, timing signals, control signals, and data structures or databases. The memory 3404 can be configured as any type of memory. By way of example only, the memory 3404 can be implemented as random access memory, read-only memory, flash memory, removable memory, other types of storage elements, or combinations of such devices.

In various embodiments, the display 3408 provides a graphical output, for example associated with an operating system, user interface, and/or applications of the electronic device 3400 (e.g., a chat user interface, an issue-tracking user interface, an issue-discovery user interface, etc.). In one embodiment, the display 3408 includes one or more sensors and is configured as a touch-sensitive (e.g., single-touch, multi-touch) and/or force-sensitive display to receive inputs from a user. For example, the display 3408 may be integrated with a touch sensor (e.g., a capacitive touch sensor) and/or a force sensor to provide a touch- and/or force-sensitive display. The display 3408 is operably coupled to the processing unit 3402 of the electronic device 3400.

The display 3408 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 3408 is positioned beneath and viewable through a cover that forms at least a portion of an enclosure of the electronic device 3400.

In various embodiments, the input devices 3406 may include any suitable components for detecting inputs. Examples of input devices 3406 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 3406 may be configured to detect one or more particular types of input and provide a signal (e.g., an input signal) corresponding to the detected input. The signal may be provided, for example, to the processing unit 3402.

As discussed above, in some cases, the input device(s) 3406 include a touch sensor (e.g., a capacitive touch sensor) integrated with the display 3408 to provide a touch-sensitive display. Similarly, in some cases, the input device(s) 3406 include a force sensor (e.g., a capacitive force sensor) integrated with the display 3408 to provide a force-sensitive display.

The output devices 3410 may include any suitable components for providing outputs. Examples of output devices 3410 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 3410 may be configured to receive one or more signals (e.g., an output signal provided by the processing unit 3402) and provide an output corresponding to the signal.

In some cases, input devices 3406 and output devices 3410 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 3402 may be operably coupled to the input devices 3406 and the output devices 3410. The processing unit 3402 may be adapted to exchange signals with the input devices 3406 and the output devices 3410. For example, the processing unit 3402 may receive an input signal from an input device 3406 that corresponds to an input detected by the input device 3406. The processing unit 3402 may interpret the received input signal to determine whether to provide and/or change one or more outputs in response to the input signal. The processing unit 3402 may then send an output signal to one or more of the output devices 3410, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for providing supplemental content in a collaboration platform, the method comprising:

causing display of a graphical user interface of a frontend of a collaboration system on a display of a client device, the graphical user interface comprising a content region including user-generated content of an electronic document;

in response to a user input provided with respect to a word displayed within the user-generated content, causing display of a selectable control regarding supplemental content;

in response to a user selection of the selectable control, initiating a query to a directory platform, the query including reference to the word;

in response to the query identifying a directory entry corresponding to the word, extracting description content from the directory entry;

generating a service query content item comprising:

predefined query prompt text designating a proposed action; and at least a portion of the extracted description content from the directory entry;

providing the prompt to an external generative output engine using an application program interface call;

obtaining a generative response from the external generative output engine, the generative response generated in accordance with the proposed action as applied to the extracted description content by the external generative output engine;

causing display of a window interface element proximate to the word in the graphical user interface, the window interface element overlapping at least a portion of the user-generated content of the electronic document; and causing the generative response to be displayed within the window interface element.

2. The computer-implemented method of claim 1, wherein:

the graphical user interface includes an edit control; and the method further comprising:

in response to a user selection of the edit control and in accordance with an authenticated user account having permissions consistent with an edit permission associated with the electronic document, causing the content region to transition to an editor region displaying the user-generated content; and in response to a user input provided to the editor region, adding content to the user-generated content of the electronic document.

3. The computer-implemented method of claim 2, further comprising:

in response to a user designation received with respect to a new word of the added content, tagging the new word as being available for supplemental content within the electronic document; and wherein, subsequent to tagging the new word, a subsequent user input provided with respect to the new word causes display of the selectable control.

4. The computer-implemented method of claim 2, wherein:

the graphical user interface includes a publish control;

the method further comprising, in response to a user selection of the publish control, causing the electronic document to be saved;

subsequent to the user selection of the publish control, the electronic document is able to be viewed by authenticated users having permissions consistent with a view permission associated with the electronic document.

5. The computer-implemented method of claim 1, wherein:

the window interface element further comprises a title corresponding to the word;

in response to a user selection of the title, the graphical user interface is redirected to the directory entry of the directory platform.

6. The computer-implemented method of claim 1, further comprising:

in response to a user input provided to the generative response displayed in the window interface element, causing the generative response to be modified;

subsequent to a modification of the generative response, storing the modified generative response and associating the modified generative response with the word.

7. The computer-implemented method of claim 6, further comprising subsequent to storing the modified generative response and in response to a subsequent user input provided with respect to the word in the content region, causing display of the window interface element and causing display of the modified generative response within the window interface element.

8. The computer-implemented method of claim 1, further comprising:

extracting a user identifier from the directory entry;

extracting a thumbnail image associated with the user identifier from the directory platform; and causing the thumbnail image to be displayed in a floating window interface element.

9. The computer-implemented method of claim 1, wherein the user input provided with respect to the word displayed within the user-generated content includes a cursor hover input.

10. A computer-implemented method for providing supplemental content in a collaboration platform, the method comprising:

causing display of a graphical user interface of a frontend of a collaboration system on a display of a client device, the graphical user interface comprising a content region including user-generated content of an electronic document;

subsequent to a user input provided with respect to a word of the user-generated content, initiating a query to a directory platform, the query including reference to the word;

in response to the query identifying a directory entry corresponding to the word, extracting content from the directory entry;

generating a service query content item comprising:

predefined query prompt text designating a proposed action; and at least a portion of the extracted content from the directory entry;

providing the prompt to a generative output engine;

obtaining a generative response from the generative output engine, the generative response generated in accordance with the proposed action as applied to the extracted content by the generative output engine;

causing display of a window interface element proximate to the word in the graphical user interface; and causing the generative response to be displayed within the window interface element.

11. The computer-implemented method of claim 10, further comprising:

initiating a search of a documentation platform using keywords extracted from the directory entry; and in response to one or more electronic documents being returned by the search of the documentation platform, cause display of a set of links in the window interface element, each link selectable to cause redirection to a respective document of the one or more electronic documents.

12. The computer-implemented method of claim 11, wherein:

the predefined query prompt text further comprises a keyword extraction proposed action; and the generative response includes one or more keywords generated by the generative output engine.

13. The computer-implemented method of claim 10, wherein the proposed action is a request for a summary.

14. The computer-implemented method of claim 10, wherein:

the window interface element further comprises a title corresponding to the word;

in response to a user selection of the title, the graphical user interface is redirected to the directory entry of the directory platform.

15. A system for providing a supplemental content in a collaboration platform, the system comprising:

a server comprising a processing unit and a non-transitory computer readable medium storing instructions to cause instantiation of a backend of the collaboration platform configured to manage a set of content items for a network of client devices, each client device operating a frontend of the collaboration platform, the backend of the collaboration platform configured once instantiated to:

cause display of a graphical user interface of the frontend of the collaboration system on a display of a client device of the network of client devices, the graphical user interface comprising a content region including content of a content item of the set of content items;

subsequent to a user input provided with respect to a word displayed within the content, initiate a query to a second platform, the query including reference to the word;

in response to the query identifying an entry corresponding to the word, extract description content from the entry;

generate a service query content item comprising:

a predefined query prompt text designating a proposed action; and at least a portion of the extracted description content from the entry;

provide the service query content item to an external generative output engine using an application program interface call;

obtain a generative response from the external generative output engine, the generative response generated in accordance with the proposed action as applied to the extracted description content by the external generative output engine;

cause display of a window interface element proximate to the word in the graphical user interface; and cause the generative response to be displayed within the window interface element.

16. The system of claim 15, wherein the backend of the collaboration platform is further configured to:

in response to a user input provided to the window interface element, cause the generative response to be modified by the user input to create a modified generative response; and associate the modified generative response with the word and store the modified generative response on the collaboration platform or the second platform.

17. The system of claim 16, wherein the backend of the collaboration platform is further configured to, subsequent to storing the modified generative response and in response to a subsequent user input provided with respect to the word, cause the modified generative response to be displayed in the window interface element.

18. The system of claim 15, wherein:

the window interface element further comprises a set of links, each link corresponding to the word; and one or more user identifiers, each user identifier associated with a project corresponding to the word.

19. The system of claim 15, wherein the backend of the collaboration platform is further configured to:

in response to the user input provided with respect to the word, cause display of a selectable control regarding the supplemental content; and in response to a user selection of the selectable control, initiate the query to the second platform.

20. The system of claim 15, wherein the user input provided with respect to the word displayed within the content includes a user selection of the word.

* * * * *